United States Patent [19]
Uchiyama et al.

[11] Patent Number: 5,848,307
[45] Date of Patent: Dec. 8, 1998

[54] CAMERA FOR TAKING CONSECUTIVE EXPOSURES

[75] Inventors: Hiroyuki Uchiyama; Ko Aosaki, both of Saitama; Takashi Nishimura, Kanagawa, all of Japan

[73] Assignee: Fuji Photo Film Co., Ltd., Kanagawa, Japan

[21] Appl. No.: 842,226

[22] Filed: Apr. 24, 1997

Related U.S. Application Data

[63] Continuation of Ser. No. 489,285, Jun. 15, 1995, abandoned.

[30] Foreign Application Priority Data

| Jun. 17, 1994 | [JP] | Japan | 6-135876 |
| Jun. 17, 1994 | [JP] | Japan | 6-135877 |
| Mar. 3, 1995 | [JP] | Japan | 7-043700 |

[51] Int. Cl.$^6$ .................................................. G03B 1/00
[52] U.S. Cl. ........................ 396/322; 396/238; 396/335
[58] Field of Search ................................ 396/238, 322, 396/323, 335, 336, 535, 543

[56] References Cited

U.S. PATENT DOCUMENTS

| 4,101,913 | 7/1978 | Gallistel et al. | 354/122 |
| 4,441,801 | 4/1984 | Mashimo et al. | 354/173.11 |
| 4,956,656 | 9/1990 | Yamamoto et al. | 354/173.1 |
| 5,210,557 | 5/1993 | Kameyama et al. | 354/120 |
| 5,264,882 | 11/1993 | Kameyama et al. | 354/120 |
| 5,363,161 | 11/1994 | Kameyama | 354/114 |
| 5,424,792 | 6/1995 | Mikami | 396/335 |

FOREIGN PATENT DOCUMENTS

| 2-105132 | 4/1990 | Japan . |
| 4-269729 | 9/1992 | Japan . |

*Primary Examiner*—Eddie C. Lee
*Attorney, Agent, or Firm*—Young & Thompson

[57] ABSTRACT

A consecutive taking camera has 16 taking lenses (13a–13p). Time-sequential exposures can be taken in 16 sub-frames (74a–74h, 75a–75h) upon shutter releasing at one time, the sub-frames (74a–74h, 75a–75h) arranged on photo film in a direction of transport of the photo film. A stationary plate (26) is disposed behind the taking lenses (13a–13p), and has 16 stationary openings (31a–31p) through which light entered into respective the taking lenses (13a–13p) is passed. Shutter disks (32–39) are disposed behind the taking lenses (13a–13p), have a shutter slit, and are rotatable to move the shutter slit (32a–39a) past the 16 stationary openings (31a–31p). A consecutive mode and a one-shot mode are selectively designated: the former for taking the time-sequential exposures in 2 to 16 sub-frames (74a–74h, 75a–75h) upon the shutter releasing at the one time, and the latter for taking one exposure in one of the sub-frames (74a–74h, 75a–75h) upon shutter releasing. Motors (49, 50) rotate the shutter disks (32–39) in accordance with a designated one of the modes. The motors (49, 50), when the consecutive mode is designated, rotate the shutter disks (32–39) to move the shutter slit (32a–39a) sequentially past the 16 stationary openings (31a–31p). The motors (49, 50), when the one-shot mode is designated, rotate the shutter disks (32–39) at a predetermined angle to move the shutter slit (32a–39a) past one of the 16 stationary openings (31a–31p), and stops the shutter disks (32–39).

16 Claims, 41 Drawing Sheets

F I G. 36
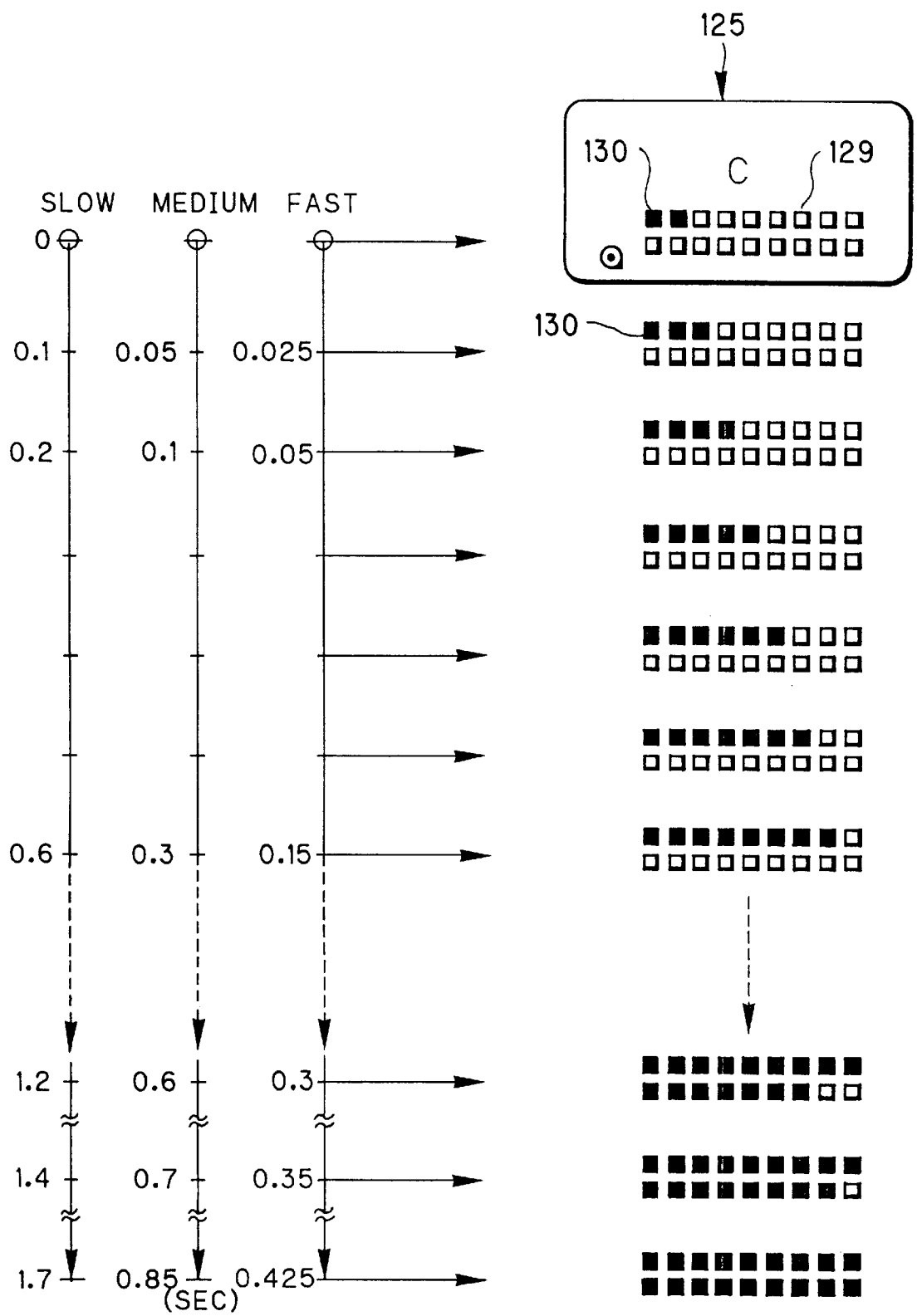

CAMERA FOR TAKING CONSECUTIVE EXPOSURES

This application is a continuation of application Ser. No. 08/489,285, filed Jun. 15, 1995, now abandoned.

BACKGROUND OF THE INVENTION

1. Field of the Invention

The present invention relates to a camera for taking consecutive exposures. More particularly, the present invention relates to a camera for taking consecutive exposures and changeable to a mode of taking a one-shot exposure.

2. Description Related to the Prior Art

There is a known consecutive camera as disclosed in JP-A 4-269729, in which two shutter disks are rotated by a stepping motor simultaneously. Each of the shutter disks has two shutter slits. The shutter slits are passed sequentially behind eight stationary openings formed in horizontal arrangement, to take eight exposures in respective eight sub-frames, which are contained in adjacent two frames of the panoramic size of 13×36 mm. Each sub-frame has a size of approximately 13×8.3 mm, because small portions around the frame are cut off when printed. With the exposed film, each of the frames is printed to produce a panoramic print of 89×254 mm. When two prints obtained from the consecutive exposures are arranged horizontally, a principal object as photographed is observable in eight successive scenes as if his motion were stopped. It is easy with the consecutive taking camera to analyze motions of those who play any sport.

In the camera disclosed in JP-A 4-269729, exposure time during which each shutter slit passes behind one stationary opening is determined ½50 second or longer. A microcomputer controls the stepping motor to rotate the shutter disks so intermittently that the rotational speed during each exposure is different from that between the exposures. The total duration of all the consecutively taken exposures is lengthened. In the same camera, three consecutive taking pitches are preset for the total duration: Slow pitch (2 seconds), Fast pitch (1 second) and Super Fast pitch (0.3 second); which are selectable through an externally operable pitch setting switch. This is for the purpose of adaptation to photography of motion in various sports.

Those who play a common sport are different in motion. Differences between individuals in motion of the sport were experimentally analyzed with an example of golf, in which durations of golf swings were checked from samples of professional golfers, and male and female amateurs, and in a range of the swing, inclusive of take-back, top, impact and finish. The results are illustrated in FIGS. 39 to 41: total durations of the professional golfers' swings are from 1.2 seconds to 1.7 seconds. Durations of the male amateurs' swings are from 0.9 second to 2.6 seconds. Durations of the female amateurs's swings are from 1.3 seconds to 2.6 seconds. There are only small deviations between the professional golfers, although there are great deviations between the amateurs. If an amateur who swings for more than two seconds is photographed, the camera of JP-A 4-269729 cannot photograph his total swing within the longest duration (two seconds) at which the camera can be set for the consecutive exposures. A consecutive photograph of his form only can contain partial motion from the top to the finish without the initial posture, or otherwise from the initial posture to the impact without the finish. Such a photograph will not satisfy either the photographer or the amateur golfer.

A photographer selects one of the three consecutive taking pitches preset in the camera of JP-A 4-269729. However, each consecutive taking pitch has only one sequential set of exposure intervals as predetermined. There is a problem in that an image of an important moment during the motion of a sportsman, for example, an impact in the golfer's swing, might not be photographed in the course of the consecutive exposures, even when the photographer has successfully started the consecutive exposures with timely operation of the shutter releasing. This lack of the important moment is failure of a consecutive photograph.

To analyze the motion of a sportsman, it is preferred to start photographing his form slightly before the start of his motion, for the purpose of checking his initially stopped posture. In golf for example, a golfer's posture where a head of his club is initially the highest should be checked before the take-back. However a photographer cannot find when the sportsman starts the motion, as there occurs no sign of indicating the start of the motion. A shutter device of the camera is obliged to be released later than the start, which cannot be photographed. Should the shutter device be released when the golfer keeps his club head the highest initially, the consecutive exposures might be too early to photograph the take-back, or the golfer stopping his swing might be photographed. Such exposures are failure.

SUMMARY OF THE INVENTION

In view of the foregoing problems, an object of the present invention is to provide a consecutive taking camera with which a photographic object moving slowly can be photographed as acceptably as one moving fast.

Another object of the present invention is to provide a consecutive taking camera in which difficulties are reduced in timely operation of shutter releasing and proper estimation of timing of a sequential set of exposures.

In order to achieve the above and other objects and advantages of this invention, a consecutive taking camera has a stationary plate which is disposed behind taking lenses, and has M stationary openings through which light entered into respective the taking lenses is passed. A shutter disk is disposed behind the taking lenses, and has a shutter slit, the shutter disk rotatable to move the shutter slit past the M stationary openings. An externally operable selector device selectively designates a consecutive mode for taking time-sequential exposures in 2 to M sub-frames of the M sub-frames upon shutter releasing at one time, and a one-shot mode for taking one exposure in one of the sub-frames upon shutter releasing. A drive device is connected to the selector device, for rotating the shutter disk in accordance with a designated one of the modes. The drive device, when the consecutive mode is designated, rotates the shutter disk to move the shutter slit sequentially past the M stationary openings. The drive device, when the one-shot mode is designated, rotates the shutter disk at a predetermined angle to move the shutter slit past one of the M stationary openings, and stops the shutter disk.

With exposures taken according to the present invention, a photographic object moving slowly can be photographed so acceptably as one moving fast.

A result of motion of the sportsman may be photographed: for example, whether a ball struck by a golfer has resulted in out-of-bounds or on fairway, whether a service of a tennis player has resulted in a fault, or whether a ball in a baseball game has been batted to be a home run. However, such scenes can be sufficiently taken by still photography. If a conventional consecutive taking camera for the motion of the sportsman is used also for such results of motion, photo film is wasted. In the present invention, those scenes can be taken in the one-shot mode. It is an advantage that no photo film is wasted even with the consecutive taking camera.

In a preferred embodiment, a display device indicates information externally and visually. An externally operable device is operable to be turned on and off. A controller is connected to the display device and the operable device, for driving the display device in time-sequential fashion simulating the taking of the time-sequential exposures in the sub-frames while the operable device is turned on, to signal intervals of exposing the sub-frames.

With the display device, difficulties in timely operation of shutter releasing and proper estimation of a sequential set of exposures are reduced.

In a camera body are formed 8N exposure chambers, arranged in two, upper and lower, rows, and 4N columns. 8N taking lenses are secured in front of the exposure chambers, respectively in association therewith. There are N groups of shutter disks, each of the N groups having four shutter disks included in the shutter disks and arranged in the two rows and two columns, each of the shutter disks having one shutter slit, the shutter disks incorporated in the camera body, and rotated for passing respectively the one shutter slit behind an adjacent pair of taking lenses among the taking lenses arranged adjacently in the upper or lower row, sequentially to introduce light from the taking lenses to the exposure chambers, to take time-sequential exposures. N motors are disposed above the exposure chambers, each of the N motors associated with one respective group of the groups of the shutter disks, for rotating the four shutter disks of the respective group. There is a battery disposed below the exposure chambers and oriented horizontally in the camera body, for supplying the N motors with power.

In the shutter device is a base section, in which the M exposure chambers are formed. A first gear is mounted in front of the base section, and rotated by the motor. A stationary plate is secured to the base section to cover a front of the first gear, and has M stationary openings through which light from the M taking lenses is introduced respectively to the M exposure chambers. Plural shutter disks are secured to a front of the stationary plate in rotatable fashion, and have plural teeth formed thereabout, adjacent ones of the shutter disks engaged with one another, the shutter disks engaged partially with the first gear on the base section, and rotated simultaneously by the motor, each of the shutter disks having one shutter slit, the one shutter slit moved respectively past an adjacent pair of stationary openings among the stationary openings arranged adjacently in a horizontal direction, sequentially to introduce the light to the exposure chambers. A front plate is secured to the base section to cover a front of the shutter disks, and has M lens openings formed therein, respectively associated with the M stationary openings, for introducing the light from the taking lenses to the shutter disks at the shutter slit.

In a camera body are formed 16 exposure chambers, arranged in two, first and second, rows, and eight columns. 16 taking lenses are secured in front of the exposure chambers, respectively in association therewith. A stationary plate are disposed between the taking lenses and the exposure chambers, and have 16 stationary openings which are formed respectively in association therewith, and through which light entered into respective the taking lenses is passed. First to eighth shutter disks are disposed behind the taking lenses and the exposure chambers in rotatable fashion, each of the shutter disks having one shutter slit, wherein each adjacent pair of stationary openings among the stationary openings arranged adjacently in the first or second row is located in a rotational locus of the shutter slit. The first to fourth shutter disks constitute a first shutter mechanism and are disposed in the two rows and two columns. The fifth to eighth shutter disks constitute a second shutter mechanism and are disposed in the two rows and two columns, and horizontally to the first shutter mechanism. A first changeover plate is disposed in association with the first shutter mechanism in movable fashion between first and second positions, the first changeover plate, when in the first position, rendering effective the first row of the stationary openings, and when in the second position, rendering effective the second row of the stationary openings. A second changeover plate is disposed in association with the second shutter mechanism in movable fashion between third and fourth positions, the second changeover plate, when in the third position, rendering effective the first row of the stationary openings, and when in the second position, rendering effective the second row of the stationary openings. A first drive device drives the first to fourth shutter disks and the second changeover plate, the first to fourth shutter disks caused to make one rotation while the second changeover plate is shifted from either of the third and fourth positions to another thereof. A second drive device drives the fifth to eighth shutter disks and the first changeover plate, the fifth to eighth shutter disks caused to make one rotation while the first changeover plate is shifted from either of the first and second positions to another thereof. A control device is connected to the first and second drive devices, for controlling the drive devices in synchronism. The control device actuates the first drive device while the second drive device is stopped, the first to fourth shutter disks making a first rotation with the first changeover plate stopped in the first position, for taking exposures through the first row of the stationary openings at the first shutter mechanism. The control device next actuates the second drive device while the first drive device is stopped, the fifth to eighth shutter disks making a first rotation with the second changeover plate stopped in the third position, for taking exposures through the first row of the stationary openings at the second shutter mechanism. The control device next actuates the first drive device while the second drive device is stopped, the first to fourth shutter disks making a second rotation with the first changeover plate stopped in the second position, for taking exposures through the second row of the stationary openings at the first shutter mechanism. The control device next actuates the second drive device while the first drive device is stopped, the fifth to eighth shutter disks making a second rotation with the second changeover plate stopped in the fourth position, for taking exposures through the second row of the stationary openings at the second shutter mechanism.

BRIEF DESCRIPTION OF THE DRAWINGS

The above objects and advantages of the present invention will become more apparent from the following detailed description when read in connection with the accompanying drawings, in which:

FIG. 36 is an explanatory view illustrating indication of consecutive exposures;

DETAILED DESCRIPTION OF THE PREFERRED EMBODIMENT(S) OF THE PRESENT INVENTION

Figure 1:
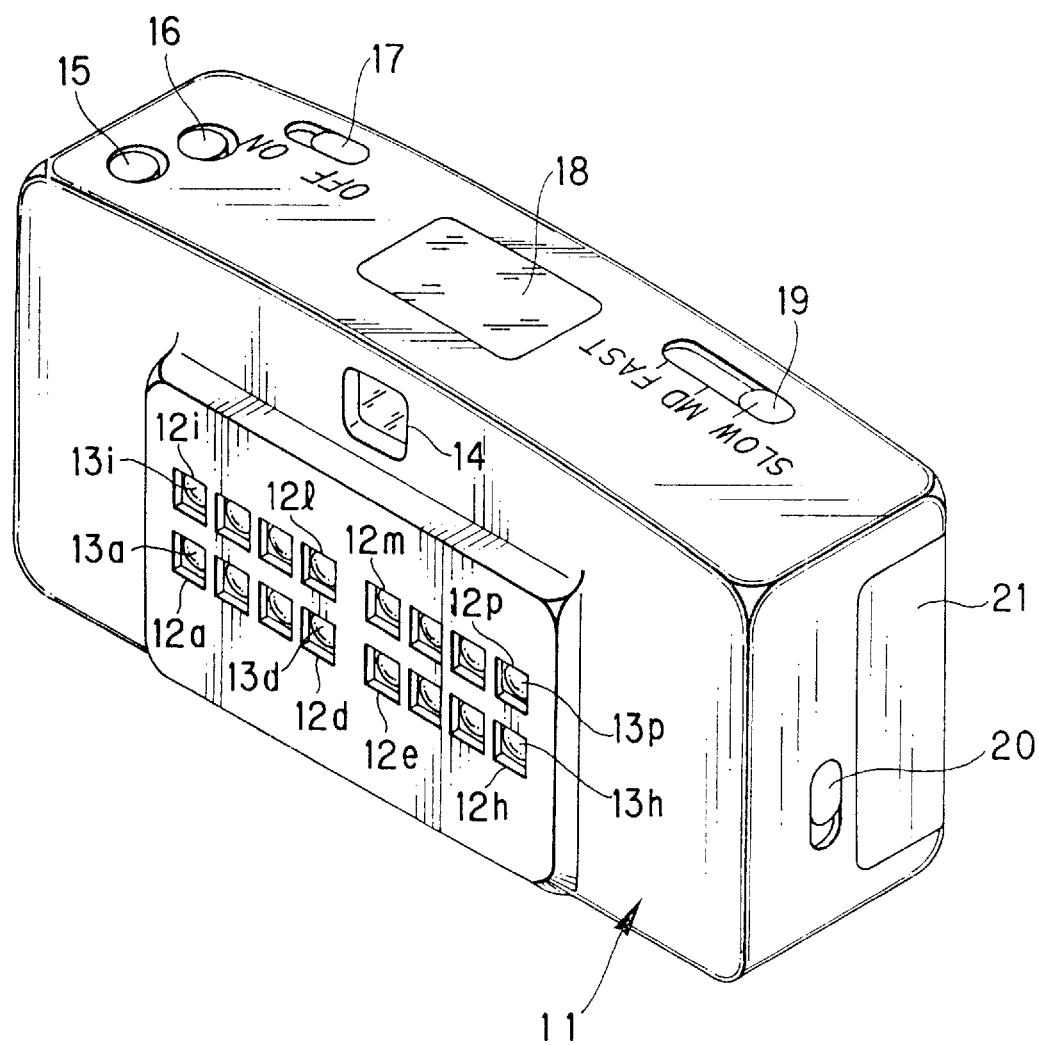
FIG. 1 is a perspective view illustrating a consecutive taking camera of the present invention.

In FIG. 1, a consecutive taking camera 11 has a front in which sixteen openings 12a–12p are formed in a matrix of 2×8. Taking lenses 13a–13p appear through the openings 12a–12p. An objective window 14 of a viewfinder is disposed in a top above the center of arranging the openings 12i–12p of the upper row, with consideration of parallax of the camera. An observable range of the viewfinder has an aspect ratio as great as a single sub-frame, which constitute one of the sixteen sub-frames formed in adjacent two imaging frames on the photo film.

A top face of the consecutive taking camera 11 has a one-shot shutter release button 15, a consecutive taking shutter release button 16, a power source switch 17, a liquid crystal display (LCD) panel 18, and a slide switch 19 for setting a consecutive taking pitch. The one-shot release button 15 and the consecutive release button 16 are both disposed in easy access from an index finger of a user's right hand holding the camera, for facility in their alternate depression. When the one-shot release button 15 is depressed, exposures are taken in a one-shot mode where only one sub-frame is exposed upon one releasing operation. When the consecutive release button 16 is depressed, exposures are taken in a consecutive mode where consecutive plural sub-frames are exposed upon one releasing operation.

By way of the two modes, photographs can be taken in various manners: the shutter device may be released every time to take a one-shot exposure; otherwise two one-shot exposures may be taken in the one-shot mode before fourteen exposures may be sequentially taken in the consecutive mode in the remaining fourteen sub-frames. In the preferred embodiment of camera, the consecutive release button 16 is so constructed that, when depressed, all the remaining available ones of the sixteen sub-frames are exposed in time-sequential fashion. An operation of depressing the consecutive release button 16 following the charging of the shutter device causes sixteen exposures sequentially for all the sub-frames.

The pitch setting switch 19 is operable in the consecutive mode for selecting one of three total durations for consecutive taking sequences, which are started upon a release of the shutter device and ended by an exposure in a final sub-frame. The three durations are Slow pitch (2 seconds), Medium pitch (1 second) and Fast pitch (0.5 second). Reference numeral 20 designates a pushbutton, which is operated to open a back lid 21. The pushbutton 20 is pressed before loading of the photo film.

Figure 2:
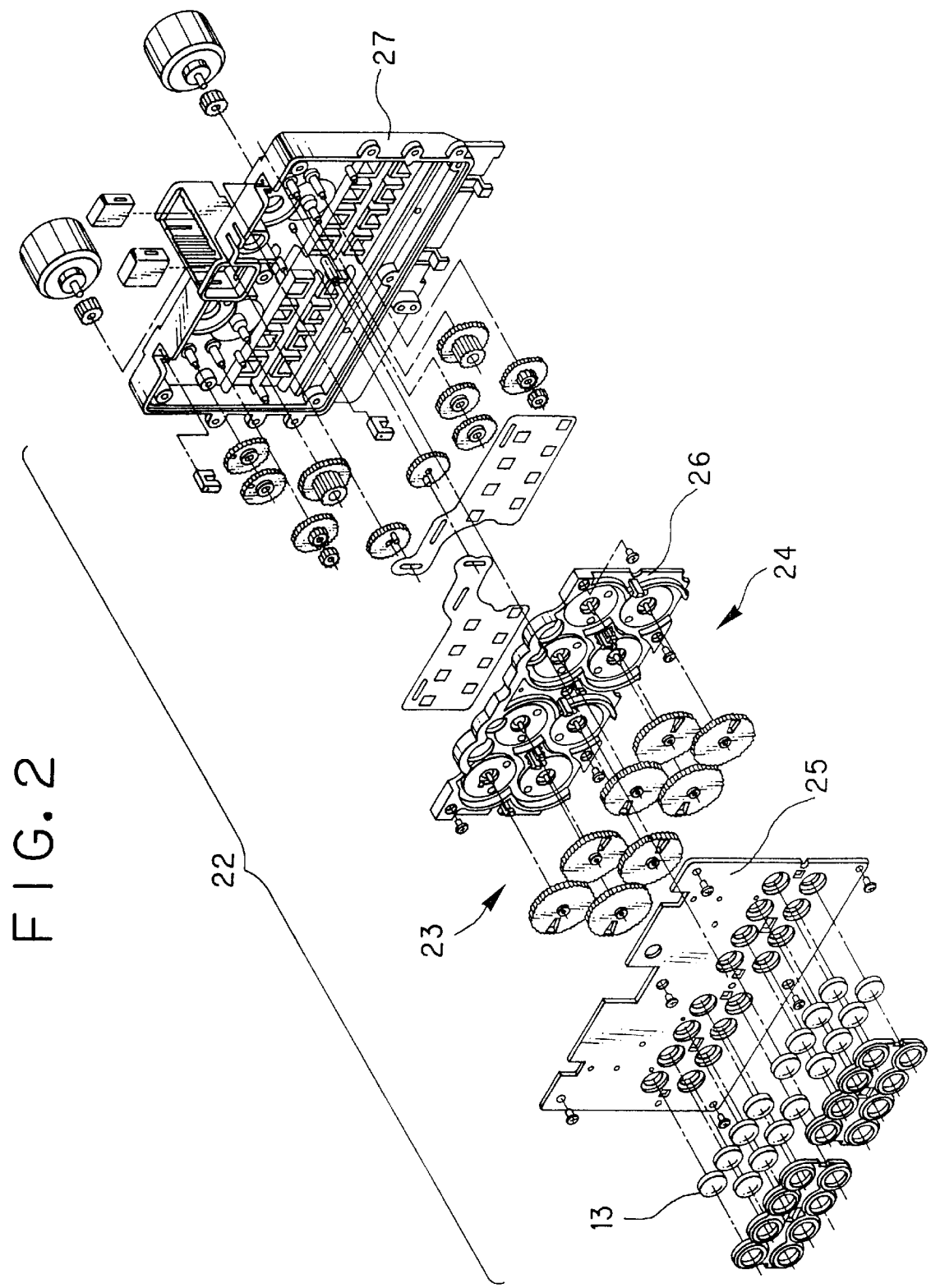
FIG. 2 is an exploded perspective view illustrating a shutter unit of the camera.

A shutter unit 22 of the consecutive taking camera 11 is illustrated in FIG. 2. The shutter unit 22 includes horizontally arranged shutter mechanisms 23 and 24, each of which is adapted to exposures in sub-frames in a 2×4 matrix. The shutter mechanisms 23 and 24 are incorporated in a shutter box, which has a small thickness from front to back, which includes a front lid 25, a stationary plate 26, and a shutter base section 27.

Figure 3:
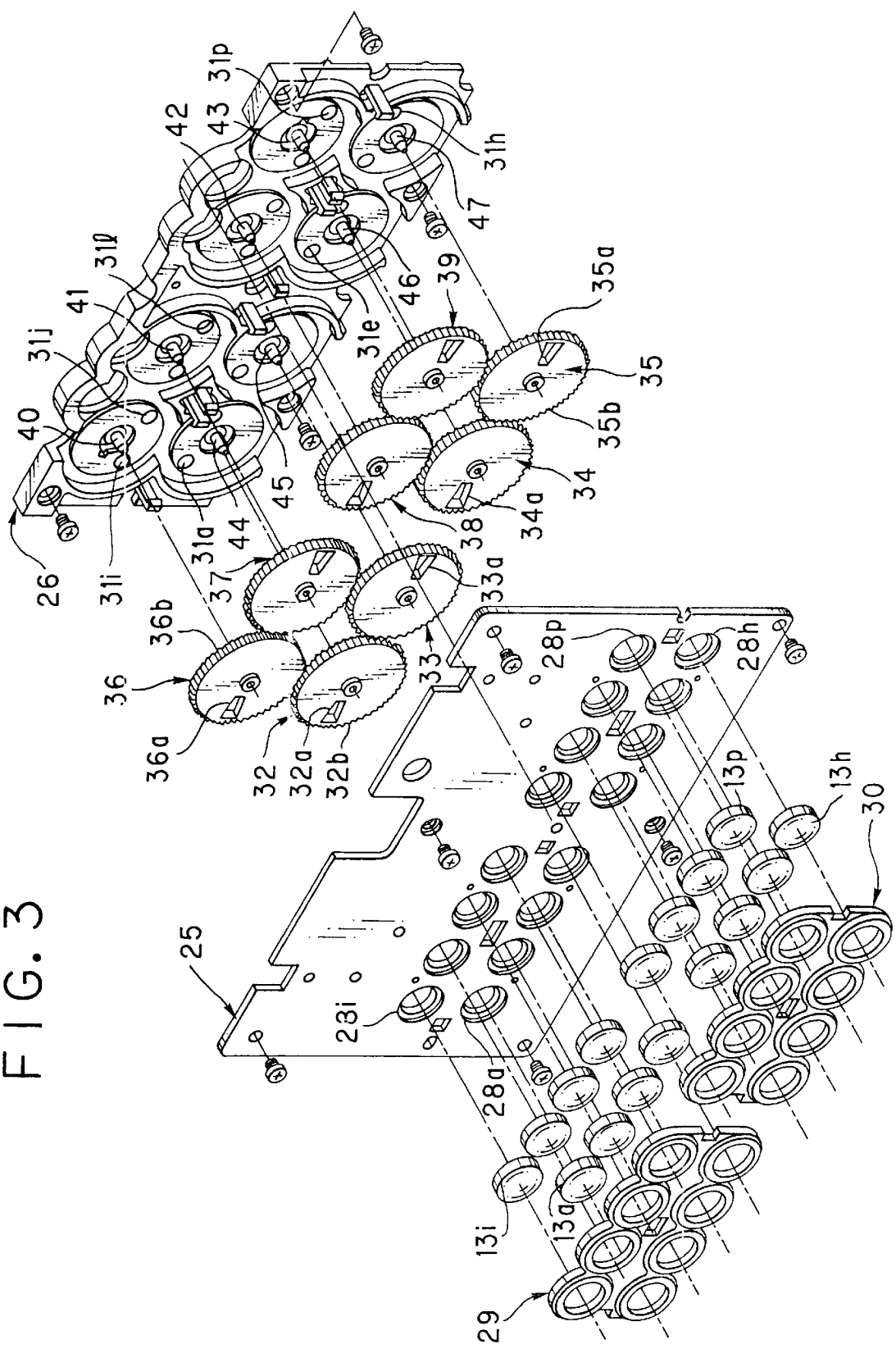
FIG. 3 is an exploded perspective view illustrating taking lenses, shutter disks, and their related parts in the shutter unit.

As illustrated in FIG. 3, the front lid 25 includes sixteen circular openings 28a–28p located on respective optical axes of the lenses 13a–13p. The lenses 13a–13p are fitted in recesses around the front of the lens openings 28a–28p. Two lens holders 29 and 30 are attached to the front lid 25, and retain the lenses 13a–13p fixedly.

In the stationary plate 26 are formed sixteen stationary openings 31a–31p, which respectively lie on optical axes of the lenses 13a–13p. The stationary openings 31a–31p are formed as fixed aperture stops and shutter apertures, and have an equal diameter. The stationary openings 31a–31d and 31i–31l are included in the shutter mechanism 23. The stationary openings 31e–31h and 31m–31p are included in the shutter mechanism 24.

In front of the stationary openings 31a–31p are disposed eight shutter disks 32–39, which have an equal diameter and thickness and supported in rotatable fashion about respective disk shafts 40–47. The disk shaft 40 for the shutter disk 36 is located higher than the stationary openings 31i and 31j, which are equidistant from the disk shaft 40. The disk shafts 41–43 also have such positions relative to the respective pairs of the stationary openings 31k and 31l, 31m and 31n, 31o and 31p. The disk shaft 44 for the shutter disk 32 is located lower then the stationary openings 31a and 31b, which are equidistant from the disk shaft 44. The disk shafts 45–47 also have such positions relative to the respective pairs of the stationary openings 31c and 31d, 31e and 31f, 31g and 31h. The shutter disks 32, 33, 36 and 37 are included in the shutter mechanism 23. The shutter disks 34, 35, 38 and 39 are included in the shutter mechanism 24.

In the shutter disks 32–39, there are respectively formed shutter slits 32a–39a of a sector shape located respectively in nearly equidistant fashion with the stationary openings 31a–31p from the disk shafts 40–47. As viewed in the radial direction of the shutter disks, the shutter slits 32a–39a have a length greater than the diameter of the stationary openings 31a–31p. The periphery of the shutter disks 32–39 is provided with teeth 32b–39b at an equal pitch. The teeth 32b are in mesh with the teeth 36b arranged vertically with the teeth 32b. The teeth 33b are in mesh with the teeth 37b. The teeth 34b are in mesh with the teeth 38b. The teeth 35b are in mesh with the teeth 39b.

Figure 4:
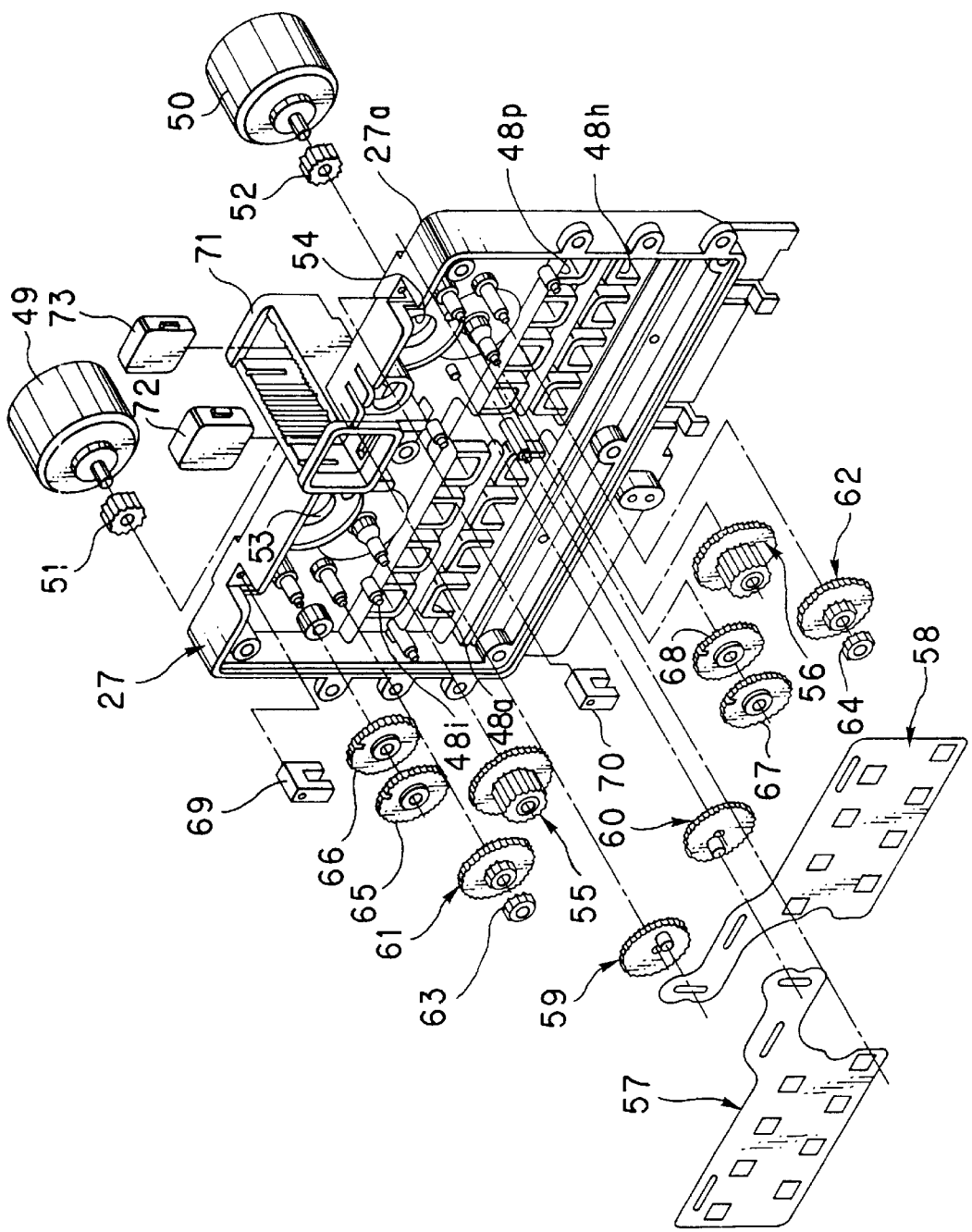
FIG. 4 is an exploded perspective view illustrating changeover plates, stepping motor and their related parts.

A wall 27a of the shutter base section 27, as illustrated in FIG. 4, has rectangular stationary openings 48a–48p located on the respective optical axes of the lenses 13a–13p. There are formed two openings 53 and 54, through which respective motor gears 51 and 52 of stepping motors 49 and 50 are inserted. The stepping motors 49 and 50 are disposed behind the shutter base section 27 and in fixed fashion. On the wall 27a, rotating mechanisms, plate shifting mechanisms and home position detectors are mounted by movement toward the wall 27a in the same backward direction. The rotating mechanisms respectively constitute gear trains for transmitting rotation of the stepping motors 49 and 50 to the shutter disks 32–39, and include the motor gears 51 and 52 for the stepping motors 49 and 50, and double gears 55 and 56. The stepping motors 49 and 50 cause the shutter disks 32–39 to make two rotations during sixteen exposures in the two frames.

The plate shifting mechanisms transmit rotation of the stepping motors 49 and 50 to changeover plates 57 and 58 via a rotating mechanism for slide reciprocation, in order to move the changeover plate 57 and 58 in a horizontal direction back and forth. One of them for the shutter mechanism 23 includes the motor gear 51, a crank gear 59 and the change-over plate 58. The other of them for the shutter mechanism 24 includes the motor gear 52, a crank gear 60 and the changeover plate 57.

The home position detectors are adapted to detecting the end of two rotations of the shutter disks 32–39. The one for the shutter mechanism 23 includes the motor gear 51, a double gear 61, a gear 63, slit gears 65 and 66, and a photo interrupter or PI sensor 69. The detector for the shutter mechanism 24 includes the motor gear 52, a double gear 62, a gear 64, slit gears 67 and 68, and a photo interrupter or PI sensor 70. The shutter base section 27 also has a viewfinder frame 71, in which an objective lens 72 and an eyepiece lens 73 are supported.

Figure 5:
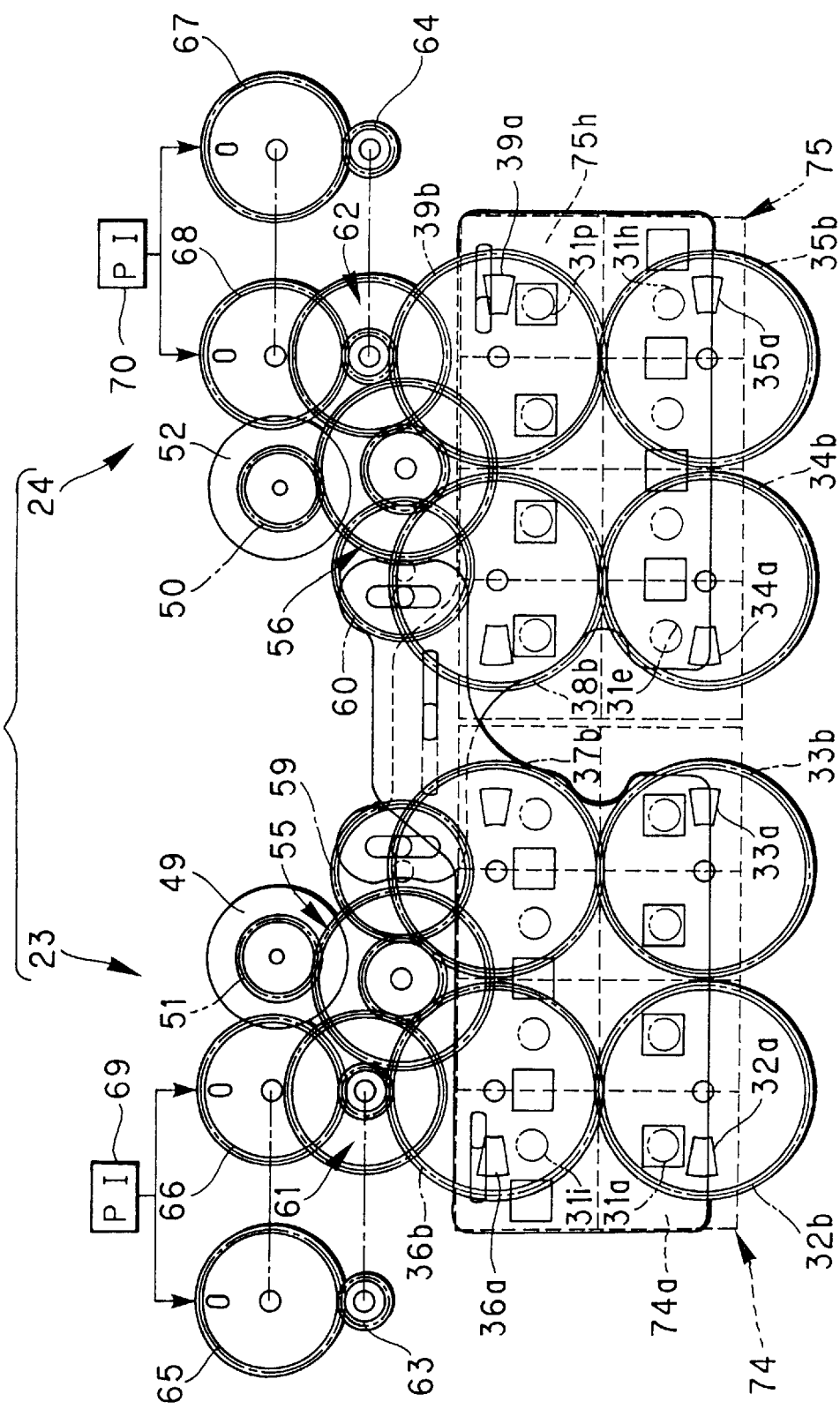
FIG. 5 is an explanatory view illustrating the shutter unit.
Figure 6:
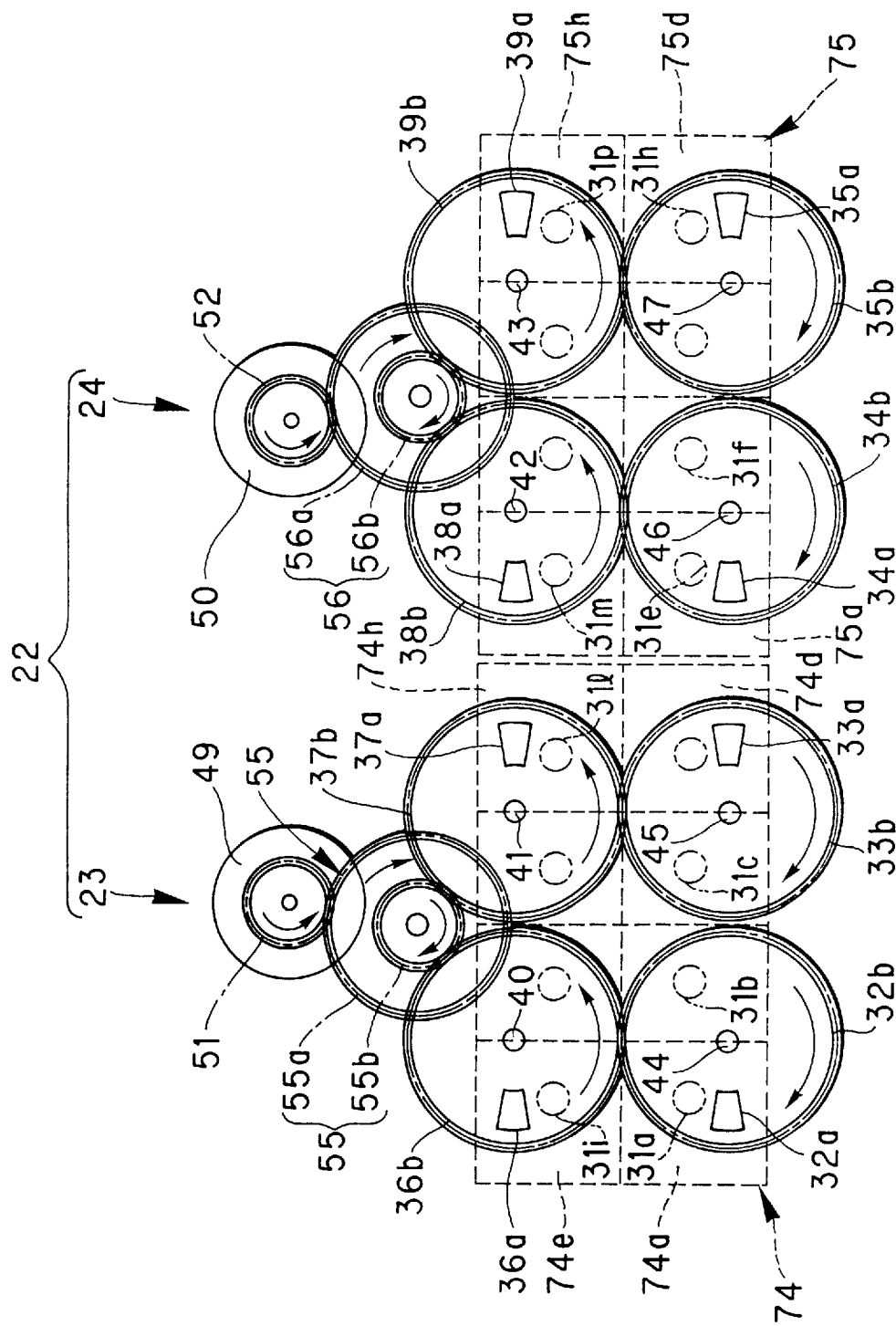
FIG. 6 is an explanatory view illustrating a mechanism for driving the shutter disks.
Figure 7:
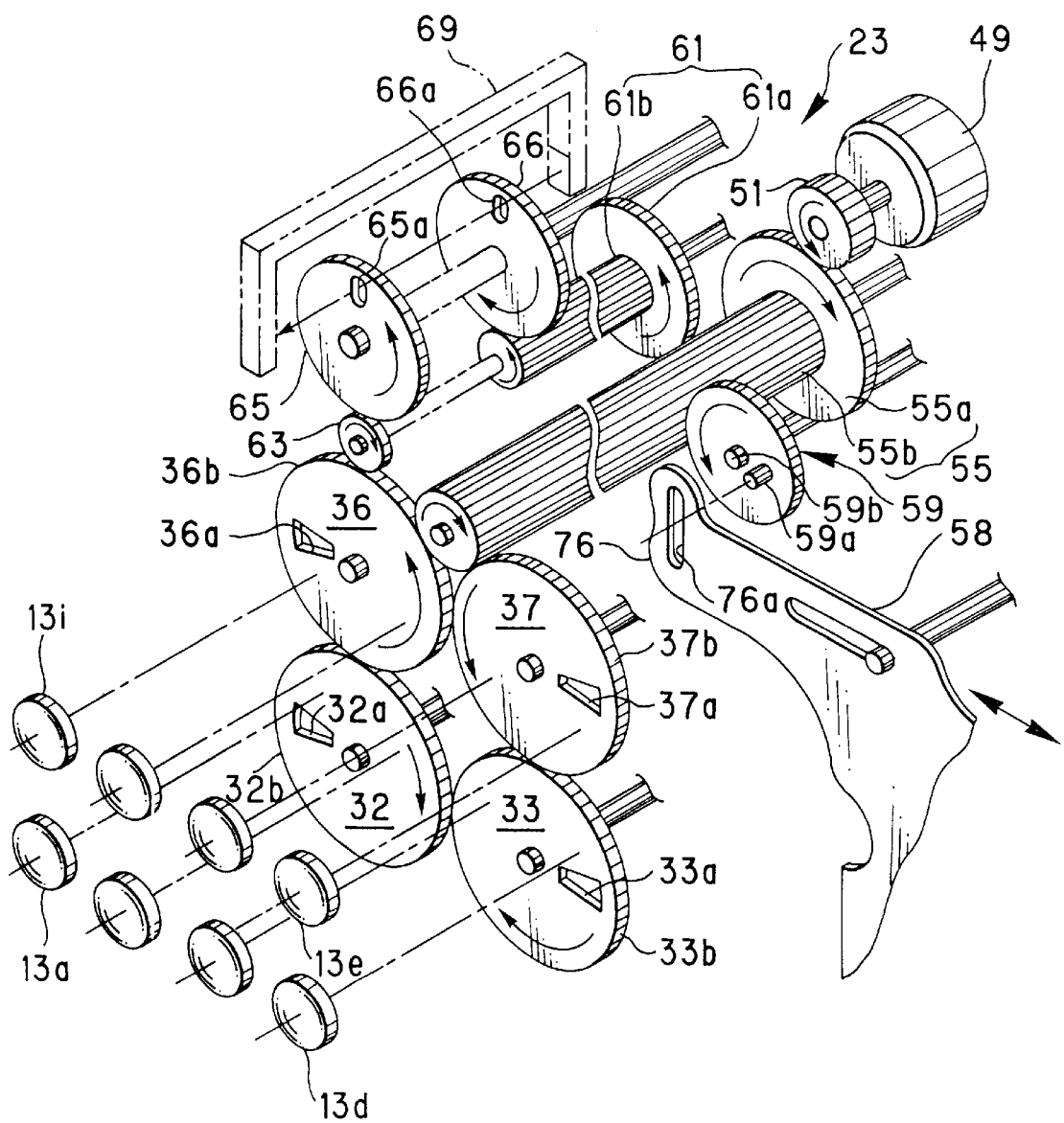
FIG. 7 is a perspective view illustrating the shutter device.

FIG. 5 schematically illustrates arrangement of the rotating mechanisms, the plate shifting mechanisms, and the detectors for the home position. In the rotating mechanism for the shutter mechanism 23 as illustrated in FIGS. 6 and 7 in detail, the motor gear 51 is in mesh with a greater gear portion 55a of the double gear 55. A smaller gear portion 55b of the double gear 55 is in mesh with the teeth 36b and 37b of the shutter disks 36 and 37. Rotation of the stepping motor 49 causes the shutter slits 36a and 37a in the shutter disks 36 and 37 sequentially to pass in front of the stationary openings 31i–31l of the upper row, to take exposures in four sub-frames 74e–74h within an imaging frame 74. At the same time, the shutter slits 32a and 33a in the shutter disks 32 and 33 are sequentially passed in front of the stationary openings 31a14 31d in the lower row, to take exposures in four sub-frames 74a–74d in the frame 74.

The rotating mechanism for the shutter mechanism 24 has such an arrangement that the one for the shutter mechanism 23 is symmetrically inverted in the horizontal direction. Rotation of the stepping motor 50 causes the shutter slits 38a and 39a in the shutter disks 38 and 39 sequentially to pass in front of the stationary openings 31m–31p of the upper row. At the same time, the shutter slits 34a and 35a in the shutter disks 34 and 35 are passed in front of the stationary openings 31e–31h in the lower row. Exposures are taken in eight sub-frames 75a–75h.

Figure 8:
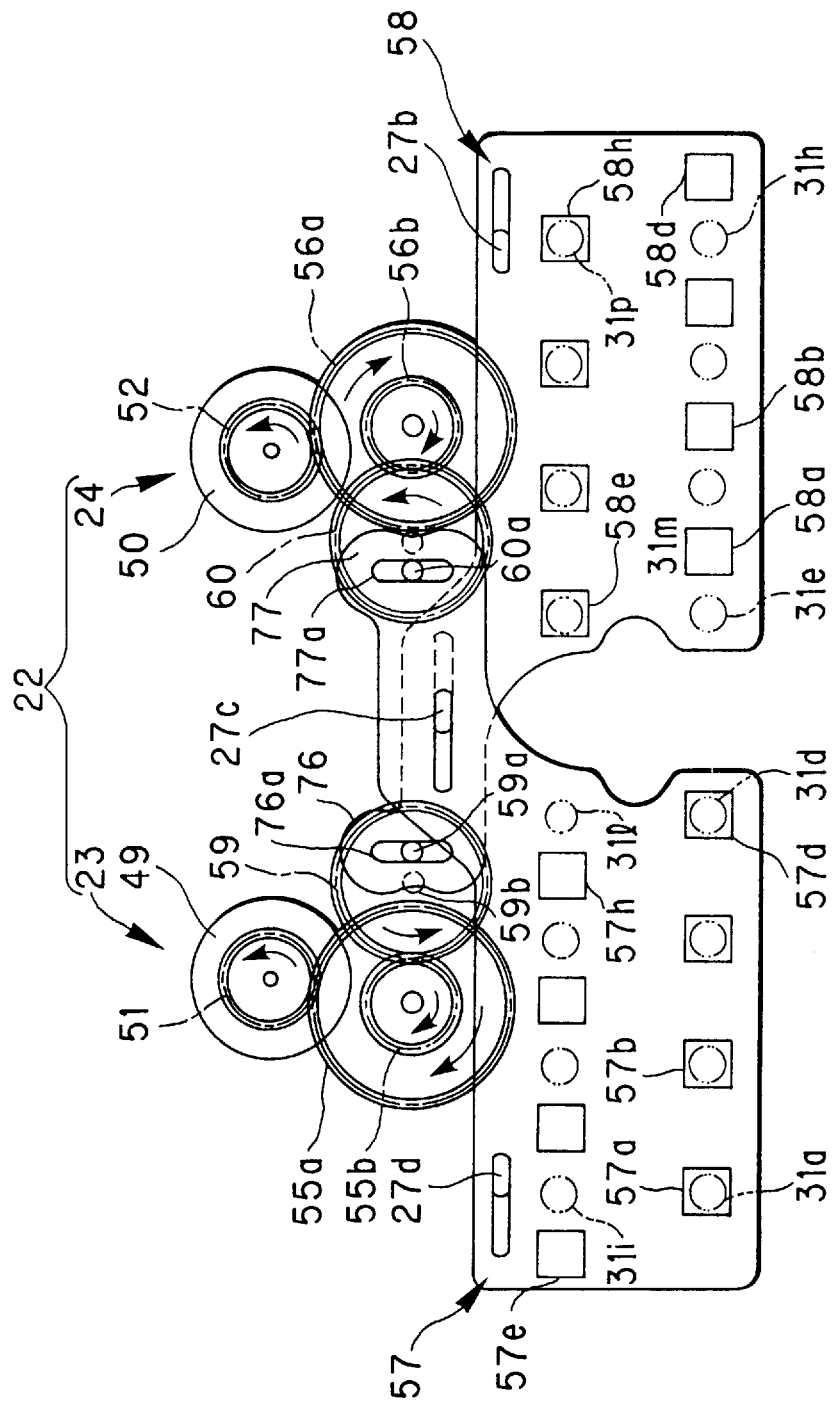
FIG. 8 is an explanatory view illustrating a mechanism for driving the changeover plates.

In the plate shifting mechanism for the shutter mechanism 23 as illustrated in FIGS. 7 and 8, the crank gear 59 is in mesh with the smaller gear portion 55b, and is given a proportional construction to make three rotations while the shutter disks 32–39 make two rotations. The crank gear 59 has a rotational shaft 59b on its front, and a crank pin 59a positioned eccentrically with respect to the crank shaft 59b. The changeover plate 58 for the shutter mechanism 24 is disposed in fashion slidable horizontally and rectilinearly. An arm 76 is formed on the changeover plate 58 and extended toward the left. The distal end of the arm 76 has a slot 76a which is extended in the vertical direction, and receives the crank pin 59a. The range of shifting the changeover plate 58 is determined two times as long as a "crank length", which is the interval between the crank shaft 59b and the crank pin 59a of the crank gear 59.

The changeover plate 58 includes movable openings 58a–58h. The movable openings 58a–58d are adapted to superposition on the stationary openings 31*e*–31*h* of the lower row in the shutter mechanism 24. The movable openings 58*e*–58*h* are adapted to superposition on the stationary openings 31*m*–31*p* of the upper row in the shutter mechanism 24. A horizontal interval between the movable openings 58*a*–58*d* and 58*e*–58*h* is twice as great as the "crank length". The movable openings 58*a*–58*d* are superposed on the stationary openings 31*e*–31*h*, but deviated therefrom in a masked state while the movable openings 58*e*–58*h* are superposed on the stationary openings 31*m*–31*p*, and vice versa. Each half a rotation of the crank gear 59 causes the changeover plate 58 to change over the effectiveness between the stationary openings 31*e*–31*h* and the stationary openings 31*m*–31*p*.

The plate shifting mechanism for the shutter mechanism 24 has such an arrangement that the one for the shutter mechanism 23 is symmetrically inverted in the horizontal direction. An arm 77 of the changeover plate 57 has a slot 77*a*, with which a crank pin 60*a* of the crank gear 60 is engaged. The changeover plate 57 has movable openings 57*a*–57*h*, that is, 57*a*–57*d* in a lower row and 57*e*–57*h* in an upper row. The movable openings 57*a*–57*d* are superposed on the stationary openings 31*a*–31*d*, but deviated therefrom in a masked state while the movable openings 57*e*–57*h* are superposed on the stationary openings 31*i*–31*l*, and vice versa. Each half a rotation of the crank gear 60 causes the changeover plate 57 to change over the effectiveness between the stationary openings 31*a*–31*d* and the stationary openings 31*i*–31*l*.

In the home position detector for the shutter mechanism 23, the slit gears 65 and 66 have respective slits 65*a* and 66*a*. The slit gears 65 and 66 are driven differently in rotational proportion for the purpose of detecting minute angular deviation between the shutter disks 32, 33, 36 and 37. Coincidence between the slit gears 65 and 66 is detected by the PI sensor 69. The slit gear 66 receives transmission of rotation from the smaller gear portion 55*b* via greater and smaller gear portions 61*a* and 61*b* of the double gear 61. The slit gear 66 has such a rotational proportion that it makes one rotation while the shutter disks 32–37 make two rotations. The slit gear 65 receives transmission of rotation from the shutter disk 36 via the gear 63, and has such a rotational proportion that it makes three rotations while the shutter disks 32–37 make two rotations. The slit gears 65 and 66 are rotatably supported in coaxial fashion, and rotate in reverse to one another.

The home position detector for the shutter mechanism 24 has such an arrangement that the one for the shutter mechanism 23 is symmetrically inverted in the horizontal direction. The slit gears 67 and 68 are rotated at a proportion of 3:1. The PI sensor 70 detects the superposition of slits 67*a* and 68*a*, to detect deviation of minute angles of the shutter disks 34, 35, 38 and 39.

Figure 9:
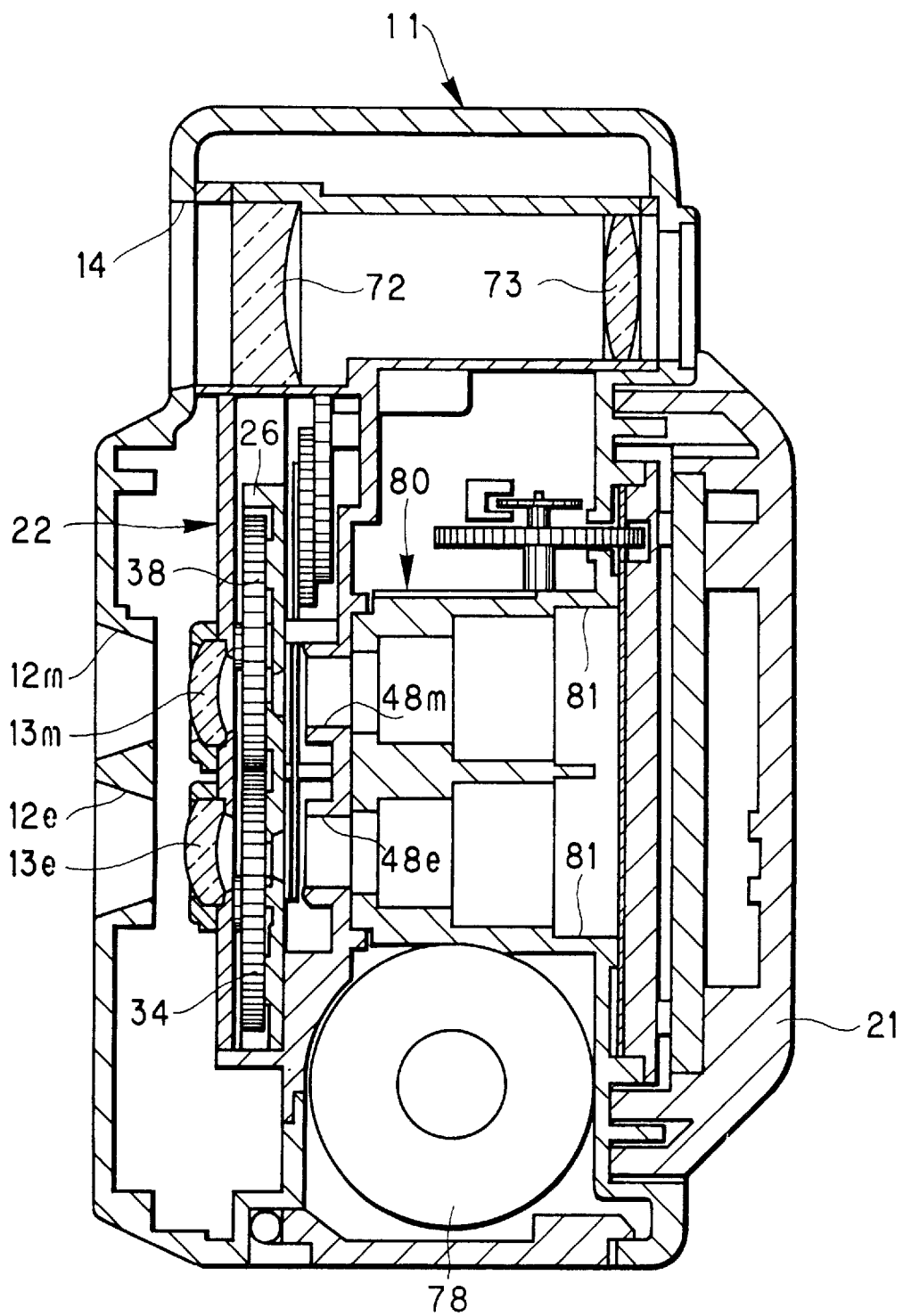
FIG. 9 is a cross section illustrating the camera.

The shutter unit 22 in FIG. 9 is secured to the front of a light-shielded tunnel 80 formed in the consecutive taking camera 11. There are formed sixteen exposure chambers 81 arranged in the light-shielded tunnel 80 in a matrix of 2×8, and defined in association with optical paths from the lenses 13*a*–13*p* and by partitions. Four columns among the eight constitute the one imaging frame 74, 75. Each of the exposure apertures behind the exposure chambers 81 has a size of approximately 10×8.3 mm. Each one imaging frame 74, 75 inclusive of eight sub-frames has a size of 20×36 mm, because small portions around the frame are cut off when printed. The size 20×36 mm is called a wide-vision size, which has an aspect ratio used with the high-definition television system commonly.

Figure 10:
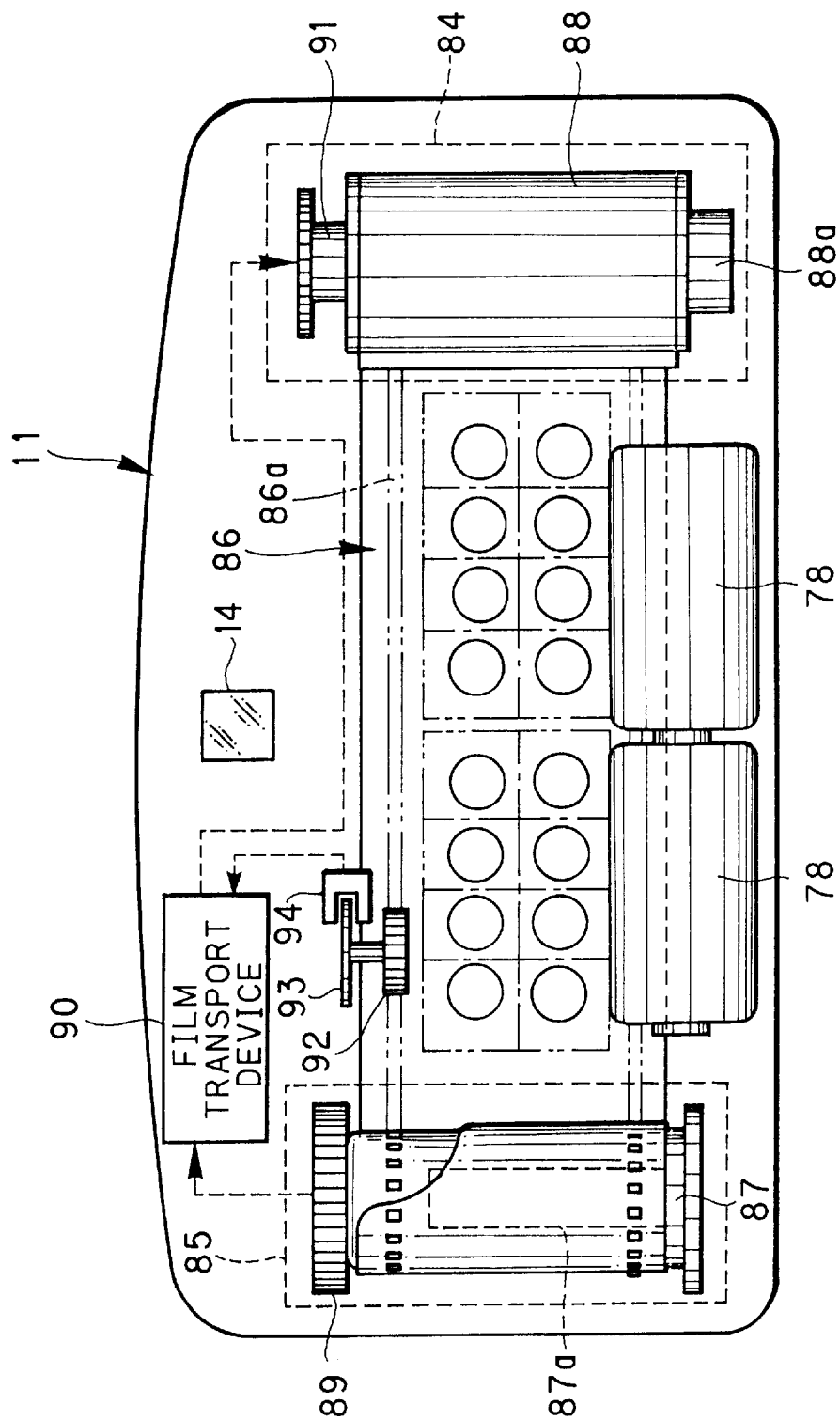
FIG. 10 is an explanatory view in front elevation, illustrating operation of winding photo film.

In FIG. 10, a cassette containing chamber 84 and a film take-up chamber 85 are arranged on both sides of the light-shielded tunnel 80. The take-up chamber 85 has a spool 87, which is rotated to wind a photo film strip 86. The photo film 86 is drawn out of a cassette 88 in the cassette containing chamber 84. A motor 87*a* is incorporated in the spool 87 for the film winding. In winding the photo film 86 forward, the motor 87*a* rotates the spool 87 via gears contained inside. In winding the photo film 86 back, the motor 87*a* causes a fork 91 to rotate backward, by way of a gear 89 and a film transport mechanism 90 for transmission of rotation.

A free sprocket wheel 92 is engaged with film perforations 86*a*, and is rotated by movement of the photo film. On the sprocket wheel 92 is coaxially fixed a slit plate 93, which has a great number of slits formed radially and in through fashion. A PI sensor 94 is disposed to detect the slit plate 93 photoelectrically. When each of the slit plate 93 passes, the PI sensor 94 generates a pulse as signal of detection.

Figure 11:
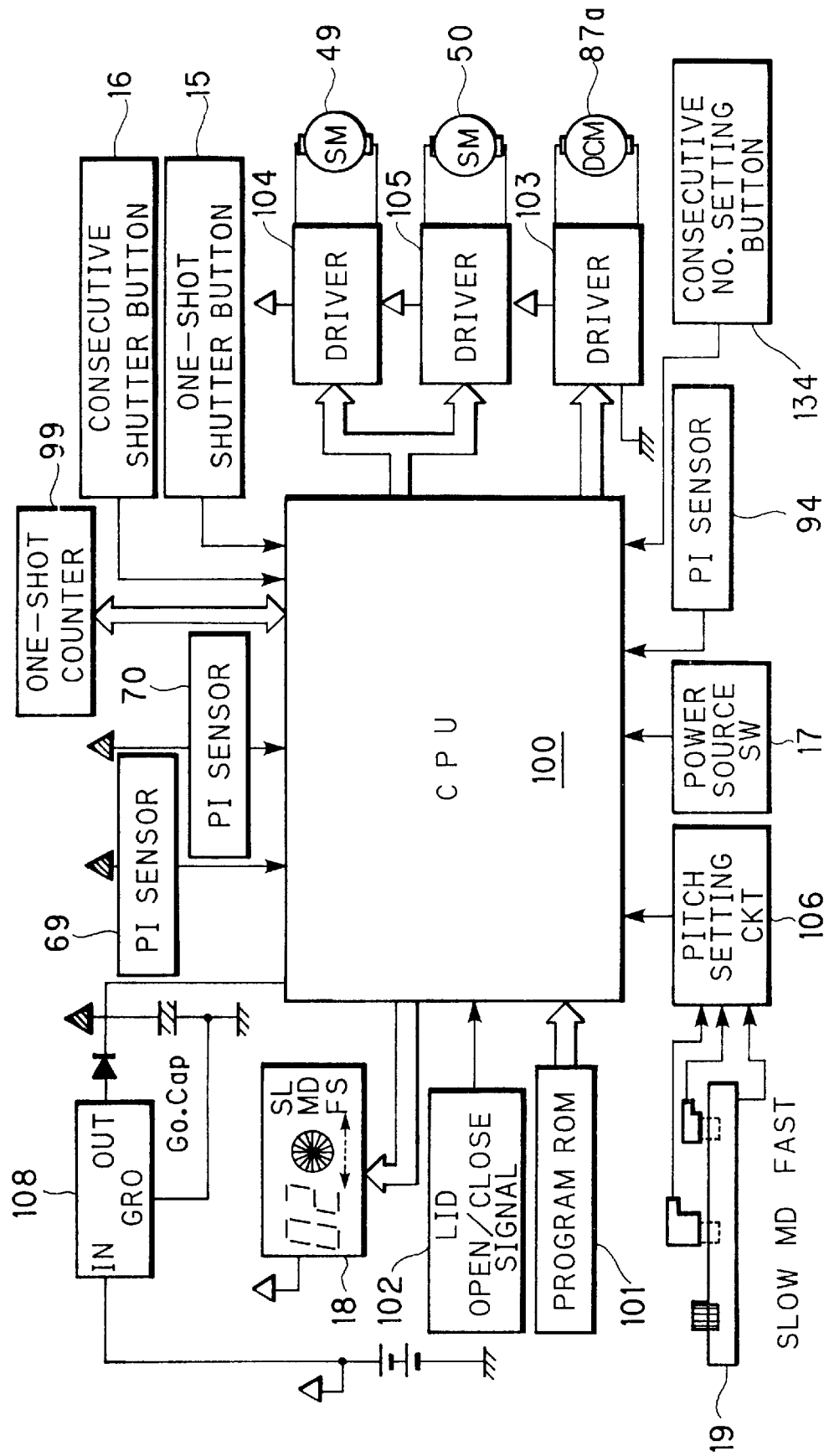
FIG. 11 is a block diagram illustrating electrical arrangement of the camera.

Circuitry of the consecutive taking camera 11 is illustrated in FIG. 11. The shutter unit 22 and the transport of the photo film 86 are controlled by a CPU 100. Sequences of the control are written in a program ROM 101. In the film transport sequence, at first a signal 102 of opening/closing the back lid 21 is generated after the power switch 17 is turned on. The CPU 100, in response to the signal 102, sends a drive signal to a motor driver circuit 103 for the motor 87*a*. At the PI sensor 94, times of passage of the slit are monitored. When the CPU 100 receives a signal of times of the slit to represent a length of two frames, the CPU 100 sends a stop signal to the motor driver circuit 103 to stop the motor 87*a*. The CPU 100 incorporates a driver circuit for driving the LCD panel 18. Each time the photo film strip is wound, the CPU 100 controls the LCD panel 18 to indicate the number of exposures. The LCD panel 18 further includes indicating segments, which are adapted to indicating the number of one-shot exposures as taken.

Motor driver circuits 104 and 105 receive a control signal and clock pulses from the CPU 100, and supply the stepping motors 49 and 50 with drive pulses. As is well known in the art, the stepping motors 49 and 50 rotate proportionally to the drive pulses supplied therefor. Rotational angles at which the stepping motors 49 and 50 rotate are determined by the numbers of the pulses. With the frequency of the pulses changed, their rotational speed can be controlled.

The numbers of drive pulses supplied for the stepping motors 49 and 50 by the motor driver circuits 104 and 105 are counted by counters which are respectively incorporated in the motor driver circuits 104 and 105. The CPU 100 monitors the counts of those counters. Each time the counts come up to a predetermined value, the CPU 100 sends a control signal to the motor driver circuits 104 and 105. The motor driver circuits 104 and 105, in response to the control signal, change polarity and/or frequency of the drive pulses supplied to the stepping motors 49 and 50, to control the speed and/or direction of their rotation. A pitch setting circuit 106 for setting duration of consecutive exposures generates a mode signal in association with setting of the pitch setting switch 19, and sends it to the CPU 100. A counter 99 counts one-shot exposures. Upon each one-shot exposure, the CPU 100 rewrites the count in the counter 99. The CPU 100 reads the count out of the counter 99 when required, and uses the count in determining an interval between consecutive exposures following one or more one-shot exposures. The LCD panel 18 is also controlled to indicate the rewritten count.

The PI sensors 69 and 70 detect the end of two rotations of the shutter disks 32–37, and send a detecting signal to the CPU 100. The CPU 100 monitors the detecting signals from the PI sensors 69 and 70, and in response thereto, causes the stepping motors 49 and 50 to stop. The counters in the motor driver circuits 104 and 105 are reset by the CPU 100, which then enters a step of winding the photo film. The photo film starts being wound, upon the stop of driving the stepping motor 50 causing a final exposure in the sub-frame 75*h*.

Figure 12:
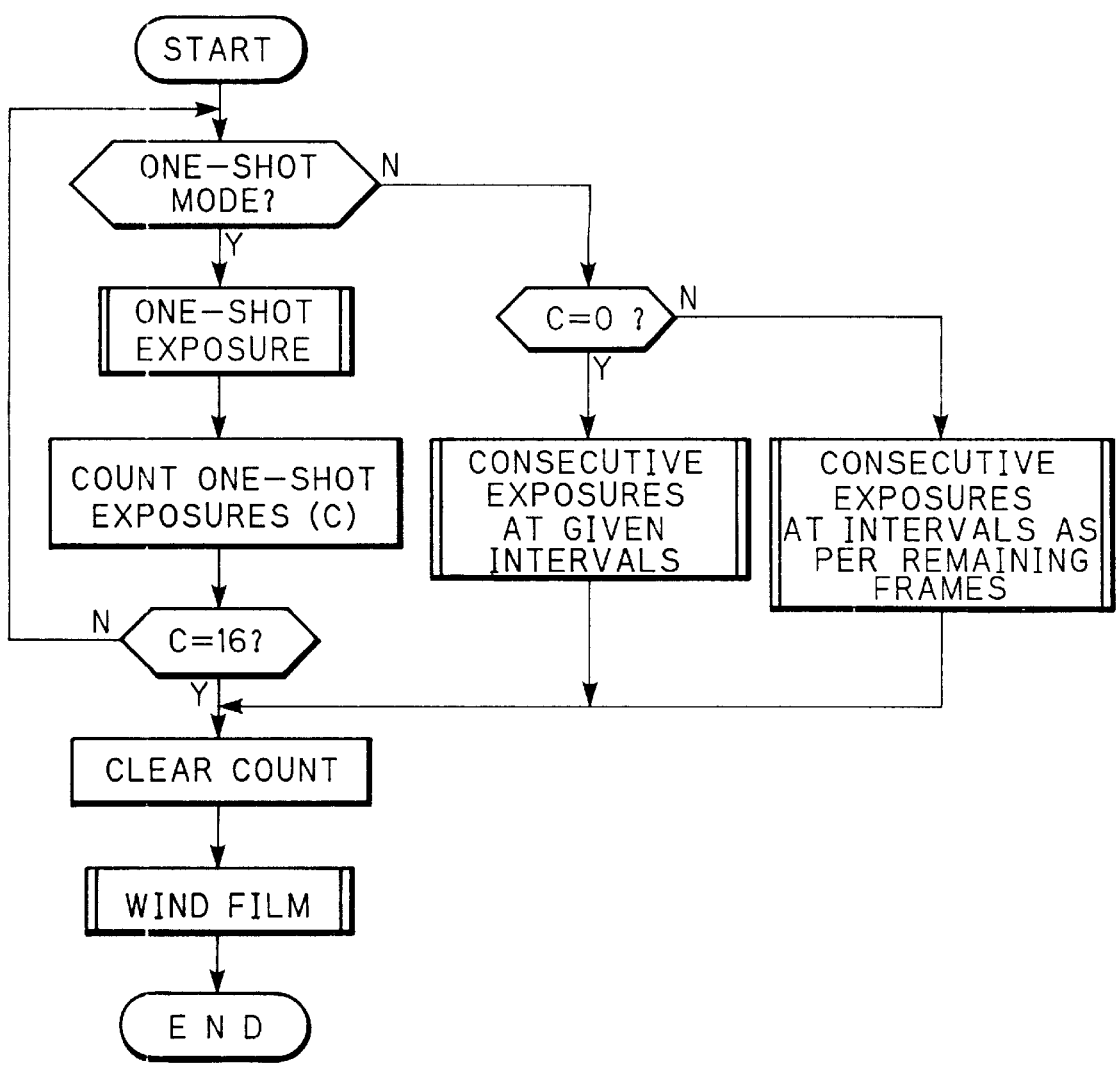
FIG. 12 is a flow chart illustrating a sequence of the camera.

There are exposure sequences different between the consecutive mode and the one-shot mode, as illustrated in FIG. 12. When the consecutive mode is selected at first, images are recorded time-sequentially to sixteen sub-frames by use of the stepping motors 49 and 50 and the shutter disks 32–39. In other words, only the stepping motor 49 is driven first. Only the sub-frames 74*a*–74*d* are exposed while the changeover plate 57 operates for the masking. When the count of the counter for the stepping motor 49 comes up to an amount for one rotation of the shutter disks 32, 33, 36 and 37, the stepping motor 49 is stopped from rotating.

At the same time as the stop of the stepping motor 49, the stepping motor 50 starts being rotated. The changeover plate 58 allows exposures to the sub-frames 75*a*–75*d* successively. When the count of the counter for the stepping motor 50 comes up to an amount of one rotation of the shutter disks 34, 35, 38 and 39, the stepping motor 50 is stopped. At the same time as the stop of the stepping motor 50, the stepping motor 49 starts being rotated. The changeover plate 57 allows exposures to the sub-frames 74*e*–74*h* successively. When a detecting signal is generated by the PI sensor 69, the stepping motor 49 is stopped. At the same time as the stop of the stepping motor 49, the stepping motor 50 starts being rotated. The changeover plate 58 allows exposures to the sub-frames 75*e*–75*h* successively. When a detecting signal is generated by the PI sensor 70, the stepping motor 50 is stopped.

Figure 13:
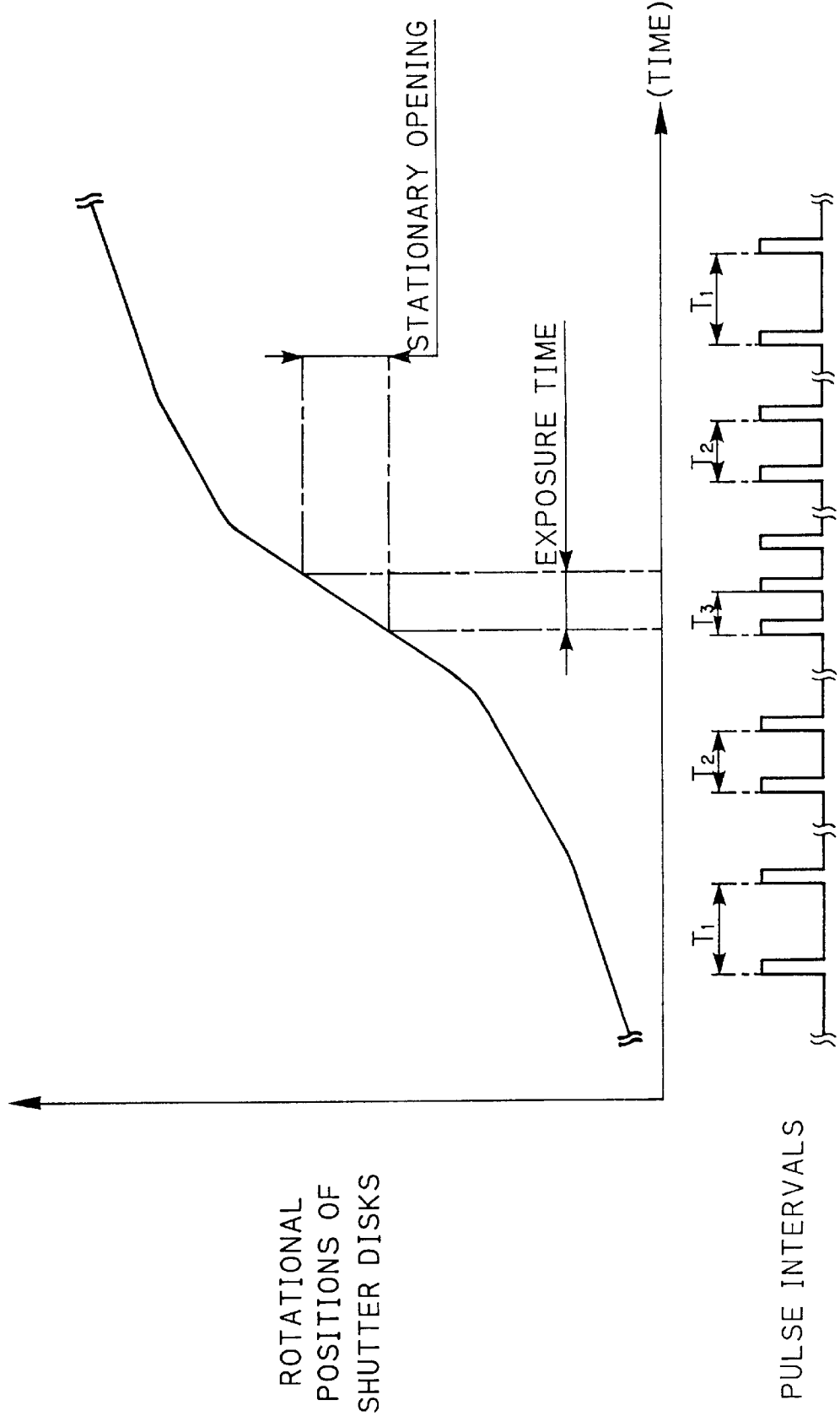
FIG. 13 is a timing chart illustrating partial rotation of the shutter disks in response to drive pulses to motors.

The pulse intervals for the stepping motors 49 and 50 are time-sequentially controlled in such a manner that exposure time is regularly set as $1/250$ second (4 msec) for each sub-frame, in other words, the stepping motors 49 and 50 are rotated relatively fast exclusively in rotational sections for the exposures. Previously, rotational positions of the shutter disks 32–39 of when the shutter slits 32*a*–39*a* pass in front of the stationary openings 31*a*–31*p* are found. Slightly before each of the exposures, pulses as illustrated in FIG. 13 are provided for the stepping motors 49, 50 by the motor driver circuits 104, 105. Those pulses are generated at decreasing intervals T1, T2 and T3, to increase the frequency and also the rotational speed of the stepping motors 49 and 50. Immediately after each of the exposures, pulses generated at increasing intervals T3, T2 and T1 are provided for the stepping motors 49, 50 by the motor driver circuits 104, 105, to decrease the rotational speed of the stepping motors 49 and 50. In section between the exposures, pulses are generated at a considerably long interval which is longer than those during the exposures.

Figure 14:
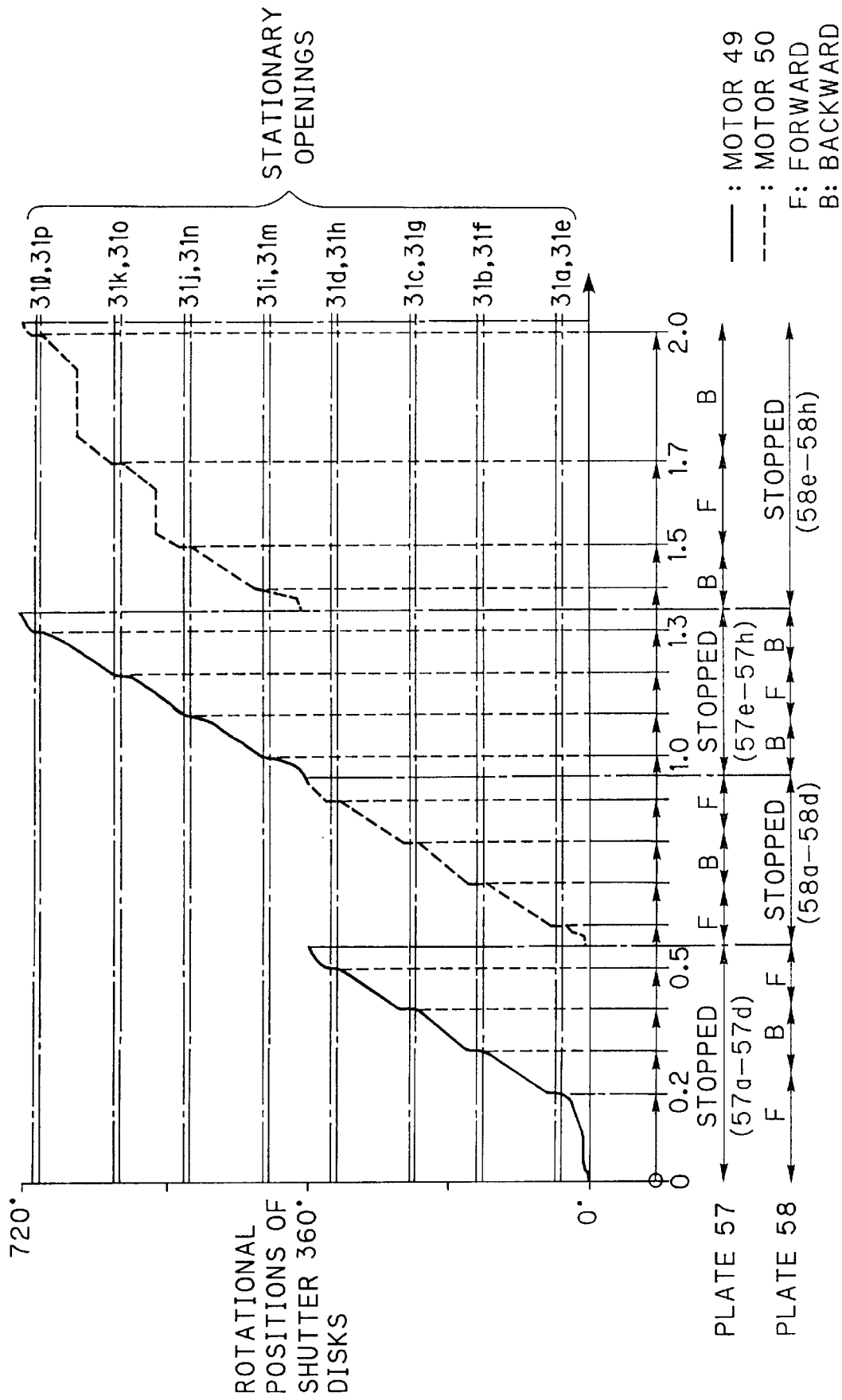
FIG. 14 is a timing chart illustrating all the rotations of the shutter disks during the consecutive taking sequence, and movement of the changeover plates.

The exposure intervals are determined differently between a plurality of consecutive taking pitch, and differently among consecutively taken exposures, as illustrated in Table 1. If the pitch is set Slow, the shutter disks 32–39 are rotated as illustrated in FIG. 14, to record an image in the sixteen sub-frames in time-sequential fashion.

TABLE 1

| Interval (msec) | Consecutive taking pitch | | |
|---|---|---|---|
| | Slow | Medium | Fast |
| Between release & 1st exposure | 200 | 100 | 50 |
| Each between 1st to 14th exposures | 100 | 50 | 25 |
| Between 14th & 15th exposures | 200 | 100 | 50 |
| Between 15th & 16th exposures | 300 | 150 | 75 |

An occasion of taking all the sixteen exposures in one-shot mode is referred to. At each time of the releasing, the stepping motor 49 is rotated at a predetermined angle. First to fourth sub-frames are exposed. For fifth to eighth sub-frames frames to be exposed next, the stepping motor 50 is rotated at the predetermined angle at each time of the releasing. For ninth to twelfth exposures, the stepping motor 49 is rotated at the predetermined angle at each time of the releasing. For thirteenth to sixteenth exposures, the stepping motor 50 is rotated at the predetermined angle at each time of the releasing. The exposure time in every one-shot exposure is predetermined as $1/250$ (4 msec) second by stepwise determination of the intervals between the drive pulses. In rotation of the stepping motors 49 and 50, stop positions of the shutter disks 32–39 are so controlled that each stop position of the shutter slits is a constant angle θ short of a rotational position of a stationary opening for its associated shutter slit to move past next (See FIG. 24). This is for the purpose of regularizing the time lag in the releasing for the exposures.

The consecutive mode may be selected after a one-shot exposure by depression of the consecutive release button 16. For this case of consecutive exposures, the count in the counter 99 is read out to determine an interval between the remaining exposures. The exposure intervals are determined as equal to those illustrated in Table 1. When the consecutive taking pitch is set Slow, the exposure intervals are as illustrated in Table 2:

TABLE 2

| Intervals between exposures (msec) | The Numbers of remaining exposures | | | | | | | | | | | | | | | |
|---|---|---|---|---|---|---|---|---|---|---|---|---|---|---|---|---|
| | 16 | 15 | 14 | 13 | 12 | 11 | 10 | 9 | 8 | 7 | 6 | 5 | 4 | 3 | 2 | 1 |
| rel. & 1st | 200 | — | — | — | — | — | — | — | — | — | — | — | — | — | — | — *1 |
| 1st & 2nd | 100 | 100 | — | — | — | — | — | — | — | — | — | — | — | — | — | — *1 |

TABLE 2-continued

| Intervals between exposures (msec) | \multicolumn{16}{c}{The Numbers of remaining exposures} | |
|---|---|---|---|---|---|---|---|---|---|---|---|---|---|---|---|---|
|  | 16 | 15 | 14 | 13 | 12 | 11 | 10 | 9 | 8 | 7 | 6 | 5 | 4 | 3 | 2 | 1 |
| 2nd & 3rd | 100 | 100 | 100 | — | — | — | — | — | — | — | — | — | — | — | — | — | *1 |
| 3rd & 4th | 100 | 100 | 100 | 100 | — | — | — | — | — | — | — | — | — | — | — | — | *1 |
| 4th & 5th | 100 | 100 | 100 | 100 | 100 | — | — | — | — | — | — | — | — | — | — | — | *2 |
| 5th & 6th | 100 | 100 | 100 | 100 | 100 | 100 | — | — | — | — | — | — | — | — | — | — | *2 |
| 6th & 7th | 100 | 100 | 100 | 100 | 100 | 100 | 100 | — | — | — | — | — | — | — | — | — | *2 |
| 7th & 8th | 100 | 100 | 100 | 100 | 100 | 100 | 100 | 100 | — | — | — | — | — | — | — | — | *2 |
| 8th & 9th | 100 | 100 | 100 | 100 | 100 | 100 | 100 | 100 | 100 | — | — | — | — | — | — | — | *1 |
| 9th & 10th | 100 | 100 | 100 | 100 | 100 | 100 | 100 | 100 | 100 | 100 | — | — | — | — | — | — | *1 |
| 10th & 11th | 100 | 100 | 100 | 100 | 100 | 100 | 100 | 100 | 100 | 100 | 100 | — | — | — | — | — | *1 |
| 11th & 12th | 100 | 100 | 100 | 100 | 100 | 100 | 100 | 100 | 100 | 100 | 100 | 100 | — | — | — | — | *1 |
| 12th & 13th | 100 | 100 | 100 | 100 | 100 | 100 | 100 | 100 | 100 | 100 | 100 | 100 | 100 | — | — | — | *2 |
| 13th & 14th | 100 | 100 | 100 | 100 | 100 | 100 | 100 | 100 | 100 | 100 | 100 | 100 | 100 | 100 | — | — | *2 |
| 14th & 15th | 200 | 200 | 200 | 200 | 200 | 200 | 200 | 200 | 200 | 200 | 200 | 260 | 200 | 200 | 200 | — | *2 |
| 15th & 16th | 300 | 300 | 300 | 300 | 300 | 300 | 300 | 300 | 300 | 300 | 300 | 300 | 300 | 300 | 300 | 300 | *2 |
| Total | 2000 | 1800 | 1700 | 1600 | 1500 | 1400 | 1300 | 1200 | 1100 | 1000 | 900 | 800 | 700 | 600 | 500 | 300 |

*1: while driven by the stepping motor 49;
*2: while driven by the stepping motor 50.

In spite of this, it is possible for the shutter device to set the exposure interval equal for any remaining exposures when the consecutive mode is selected after taking any one-shot exposure. It is desirable with this operation to determine the exposure interval in accordance with the formula:

$$[(16-C)/16 \times V]/(16-C)$$

where C is the number of one-shot exposures, and V is a consecutive taking duration, and is 2 seconds for the Slow pitch, 1 second for the Medium pitch, and 0.5 second for the Fast pitch.

Figure 15:
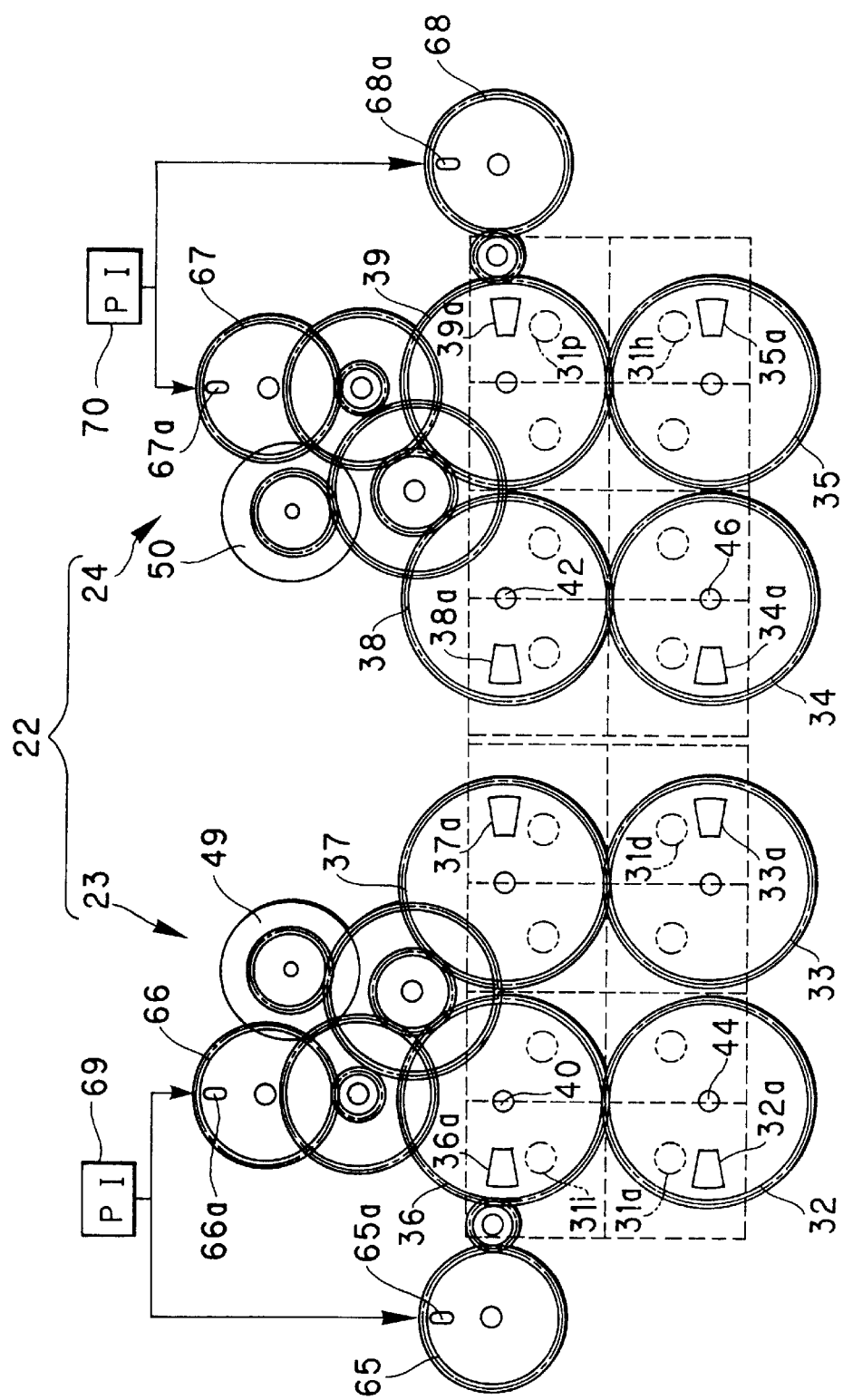
FIG. 15 is an explanatory view illustrating a home position of the mechanisms for rotation and position detection.

Let the consecutive exposures set at the Slow pitch. The exposure intervals are as shown in Table 3:

The operation of the above camera is described now. The shutter unit 22 has the initial state of FIG. 15, where the shutter slits 32*a*, 36*a*, 34*a* and 38*a* in the shutter disks 32, 36, 34 and 38 are located in the left of the disk shafts 44, 40, 46 and 42 and oriented horizontally. The shutter slits 33*a*, 37*a*, 35*a* and 39*a* in the shutter disks 33, 37, 35 and 39 are located in the right of the disk shafts 41, 45, 43 and 47 and oriented horizontally. The stationary openings 31*a*–31*p* stand masked by the shutter disks 32–39. In the shutter mechanism 23, the slits 65*a* and 66*a* in the slit gears 65 and 66 are superposed on one another in a position vertically above their rotational axis. Similarly in the shutter mechanism 24, the slits 67*a* and 68*a* in the slit gears 67 and 68 are superposed above their rotational axis.

In the home position of the changeover plate 57, as illustrated in FIG. 8, the movable openings 57*a*–57*d* are

TABLE 3

| Intervals between exposures (msec) | \multicolumn{16}{c}{The Numbers of remaining exposures} | |
|---|---|---|---|---|---|---|---|---|---|---|---|---|---|---|---|---|
|  | 16 | 15 | 14 | 13 | 12 | 11 | 10 | 9 | 8 | 7 | 6 | 5 | 4 | 3 | 2 | 1 |
| rel. & 1st | 200 | — | — | — | — | — | — | — | — | — | — | — | — | — | — | — | *1 |
| 1st & 2nd | 100 | 125 | — | — | — | — | — | — | — | — | — | — | — | — | — | — | *1 |
| 2nd & 3rd | 100 | 125 | 125 | — | — | — | — | — | — | — | — | — | — | — | — | — | *1 |
| 3rd & 4th | 100 | 125 | 125 | 125 | — | — | — | — | — | — | — | — | — | — | — | — | *1 |
| 4th & 5th | 100 | 125 | 125 | 125 | 125 | — | — | — | — | — | — | — | — | — | — | — | *2 |
| 5th & 6th | 100 | 125 | 125 | 125 | 125 | 125 | — | — | — | — | — | — | — | — | — | — | *2 |
| 6th & 7th | 100 | 125 | 125 | 125 | 125 | 125 | 125 | — | — | — | — | — | — | — | — | — | *2 |
| 7th & 8th | 100 | 125 | 125 | 125 | 125 | 125 | 125 | 125 | — | — | — | — | — | — | — | — | *2 |
| 8th & 9th | 100 | 125 | 125 | 125 | 125 | 125 | 125 | 125 | 125 | — | — | — | — | — | — | — | *1 |
| 9th & 10th | 100 | 125 | 125 | 125 | 125 | 125 | 125 | 125 | 125 | 125 | — | — | — | — | — | — | *1 |
| 10th & 11th | 100 | 125 | 125 | 125 | 125 | 125 | 125 | 125 | 125 | 125 | 125 | — | — | — | — | — | *1 |
| 11th & 12th | 100 | 125 | 125 | 125 | 125 | 125 | 125 | 125 | 125 | 125 | 125 | 125 | — | — | — | — | *1 |
| 12th & 13th | 100 | 125 | 125 | 125 | 125 | 125 | 125 | 125 | 125 | 125 | 125 | 125 | 125 | — | — | — | *2 |
| 13th & 14th | 100 | 125 | 125 | 125 | 125 | 125 | 125 | 125 | 125 | 125 | 125 | 125 | 125 | 125 | — | — | *2 |
| 14th & 15th | 200 | 125 | 125 | 125 | 125 | 125 | 125 | 125 | 125 | 125 | 125 | 125 | 125 | 125 | 125 | — | *2 |
| 15th & 15th | 300 | 125 | 125 | 125 | 125 | 125 | 125 | 125 | 125 | 125 | 125 | 125 | 125 | 125 | 125 | 125 | *2 |
| Total | 2000 | 1875 | 1700 | 1625 | 1500 | 1375 | 1250 | 1125 | 1000 | 875 | 750 | 625 | 500 | 375 | 250 | 125 |

*1: while driven by the stepping motor 49;
*2: while driven by the stepping motor 50.

superposed on the stationary openings 31a–31d. The changeover plate 57 masks the stationary openings 31i–31l, with the movable openings 57e–57h deviated. In the home position of the changeover plate 58, the changeover plate 58 masks the stationary openings 31e–31h, with the movable openings 58a–58d deviated. The movable openings 58e–58h are superposed on the stationary openings 31m–31p.

Figure 16:
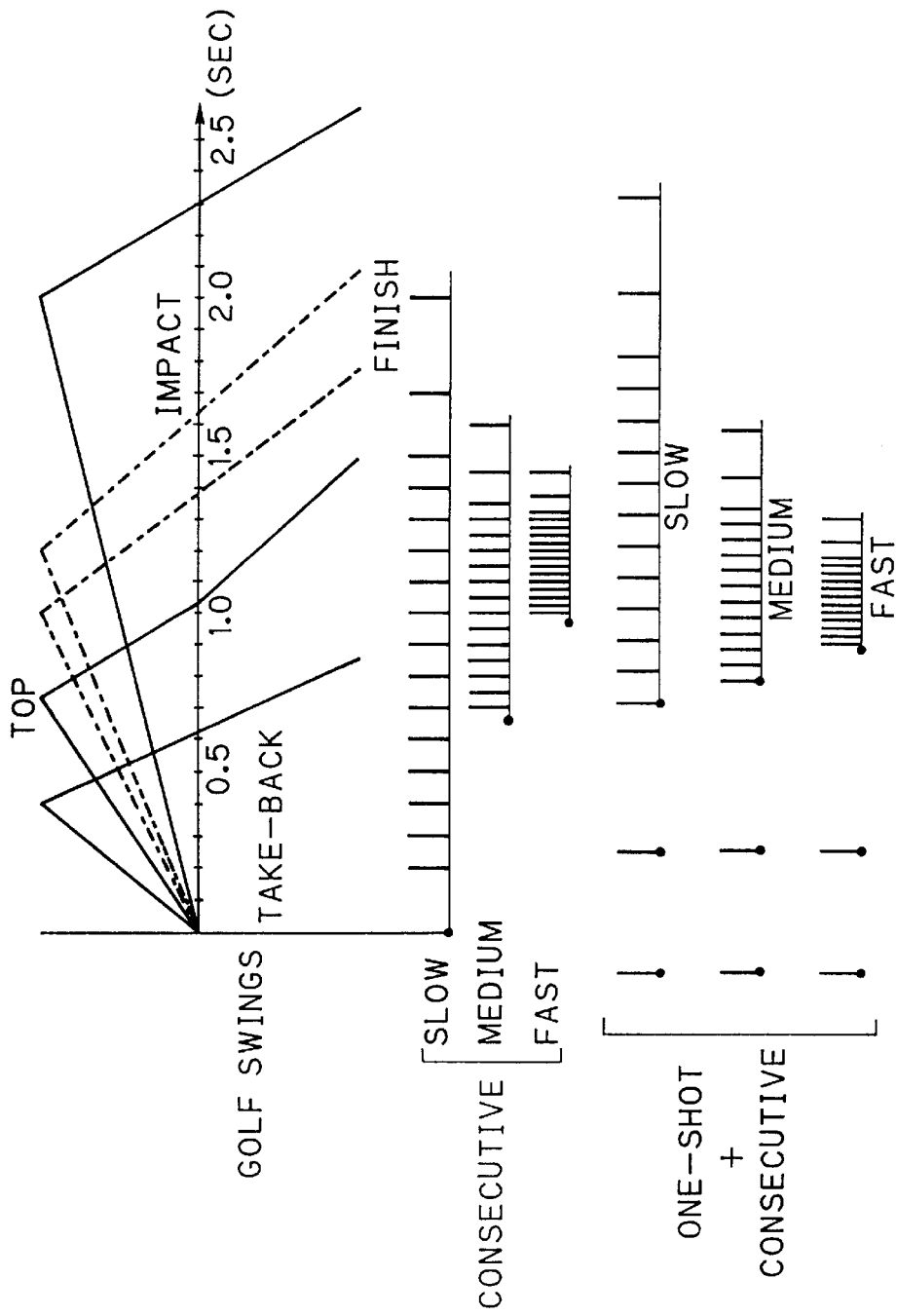
FIG. 16 is a timing chart illustrating relationships between a golf swing and exposure intervals.
Figure 17:
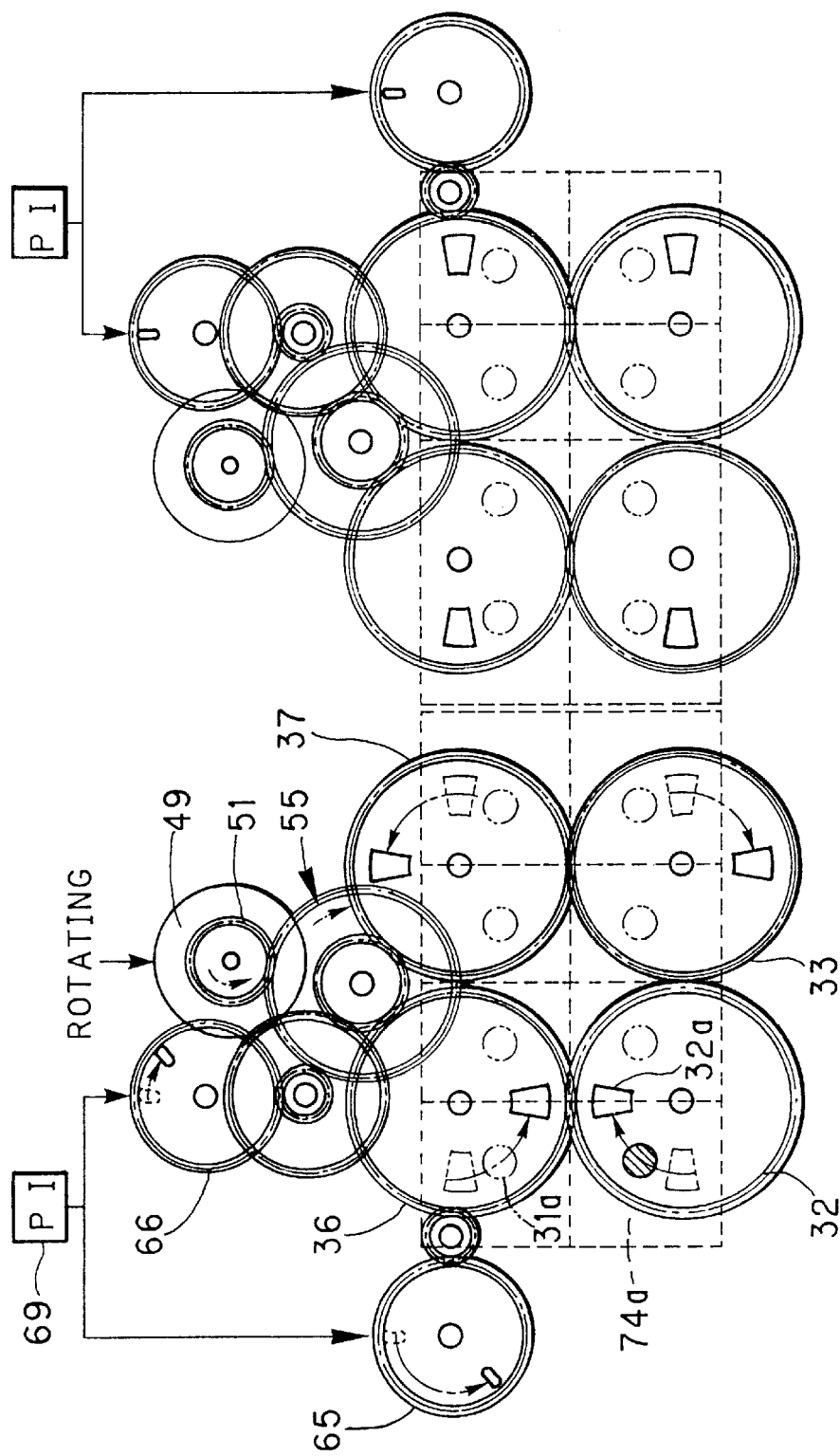
FIG. 17 is an explanatory view illustrating a state where the shutter unit has exposed a first sub-frame.

The pitch setting switch 19 is set at the Slow pitch. As illustrated in FIG. 16, the consecutive release button 16 is depressed at the same time as a golfer as principal object begins take-back. The stepping motor 49 starts rotating. In FIG. 17, the motor gear 51 is rotated counterclockwise. The shutter disks 32 and 33 are caused by the double gear 55 to rotate clockwise, at the same time as the shutter disks 34 and 35 are caused to rotate counterclockwise. The rotation of the stepping motor 49 is so controlled that rotational speed between the exposures is different from that during each of the exposures. The movable openings 57a–57d in the changeover plate 57 remain superposed on the stationary openings 31a–31d. At the lapse of 200 msec following the releasing operation, the shutter slit 32a in the shutter disk 32 passes in front of the stationary openings 31a, to take the first exposure in the sub-frame 74a.

Figure 18:
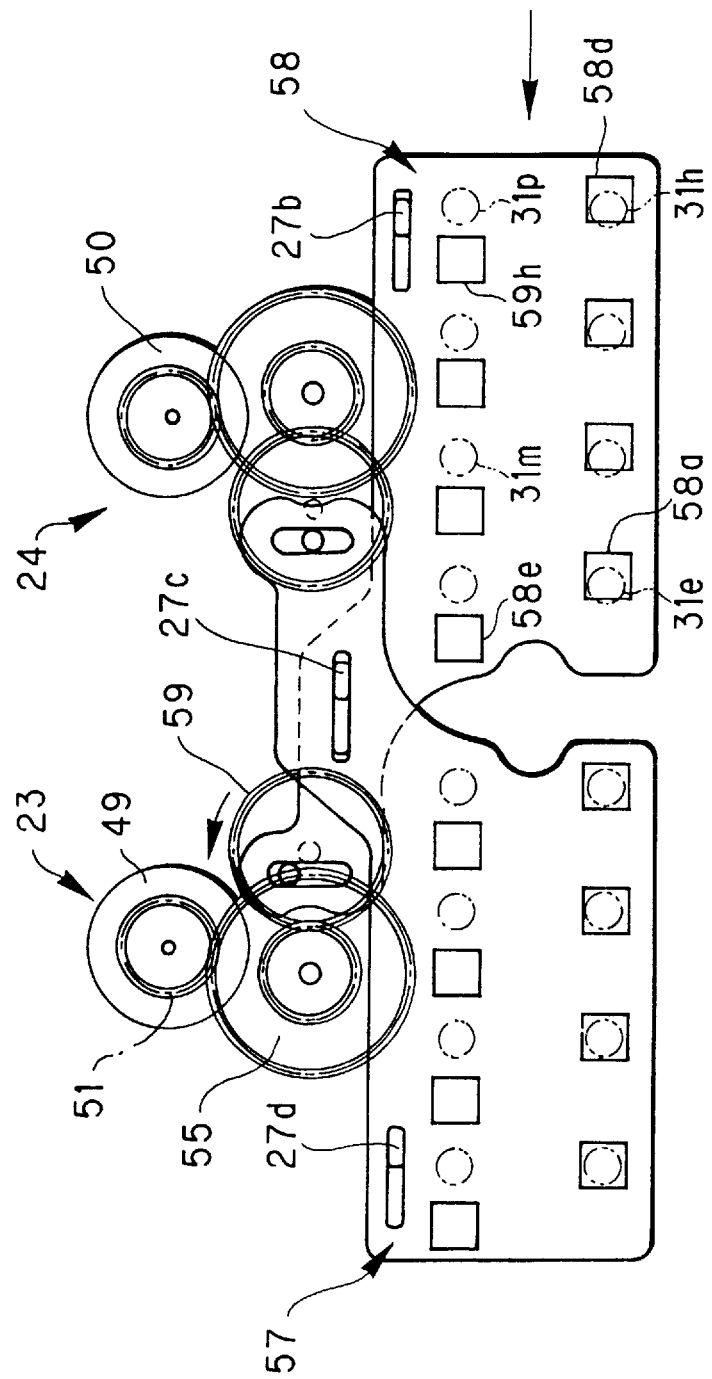
FIG. 18 is an explanatory view illustrating the same state of the mechanism for driving the changeover plates.

The changeover plate 57 is masking the stationary openings 31i–31l, which do not allow any light to pass. As illustrated in FIG. 18, the crank gear 59 is rotating in the counterclockwise direction. The changeover plate 58 is shifted to the left to superpose the movable openings 58a–58d on the stationary openings 31e–31h for a short time. However the stepping motor 50 is kept from rotating, to cause the shutter disks 34, 35, 38 and 39 to mask the stationary openings 31e–31h and 31m–31p, through which no light is passed. The slit gear 66 has been rotated at a rotational angle which is half as great as an angle at which the shutter disks 32, 33, 36 and 37 have been rotated. The slit gear 65 has been rotated at a rotational angle which is 1.5 times as great as the angle at which the shutter disks 32, 33, 36 and 37 have been rotated.

At the lapse of 100 msec following the first exposure, the shutter slit 32a passes in front of the stationary opening 31b, to take the second exposure in the sub-frame 74b. At the lapse of further 100 msec, the shutter slit 33a in the shutter disk 33 passes in front of the stationary opening 31c, to take the third exposure in the sub-frame 74c. At the lapse of other 100 msec, the shutter slit 33a passes in front of the stationary opening 31d, to take the fourth exposure in the sub-frame 74d.

Figure 19:
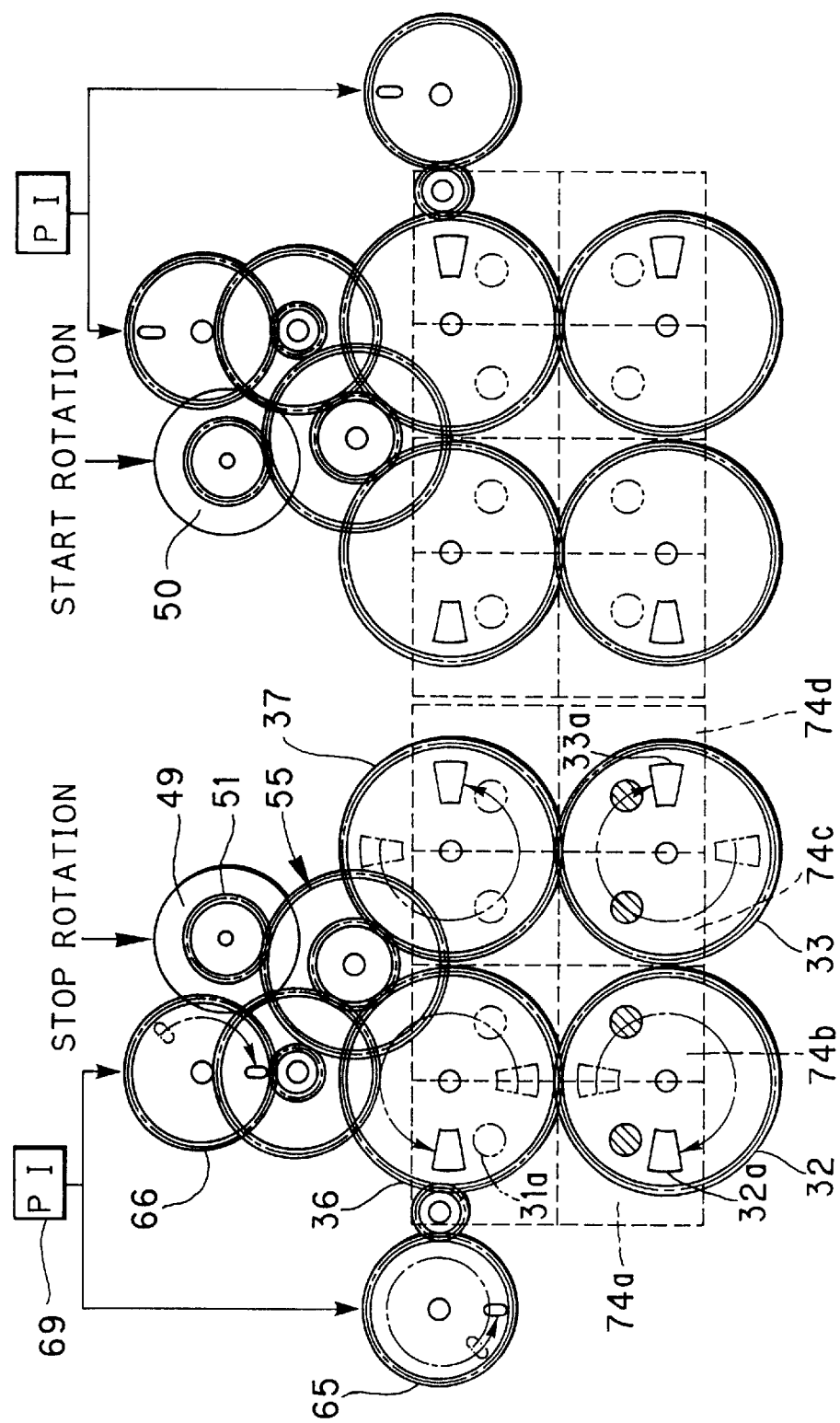
FIG. 19 is an explanatory view illustrating a state where the shutter unit has exposed a fourth sub-frame.
Figure 20:
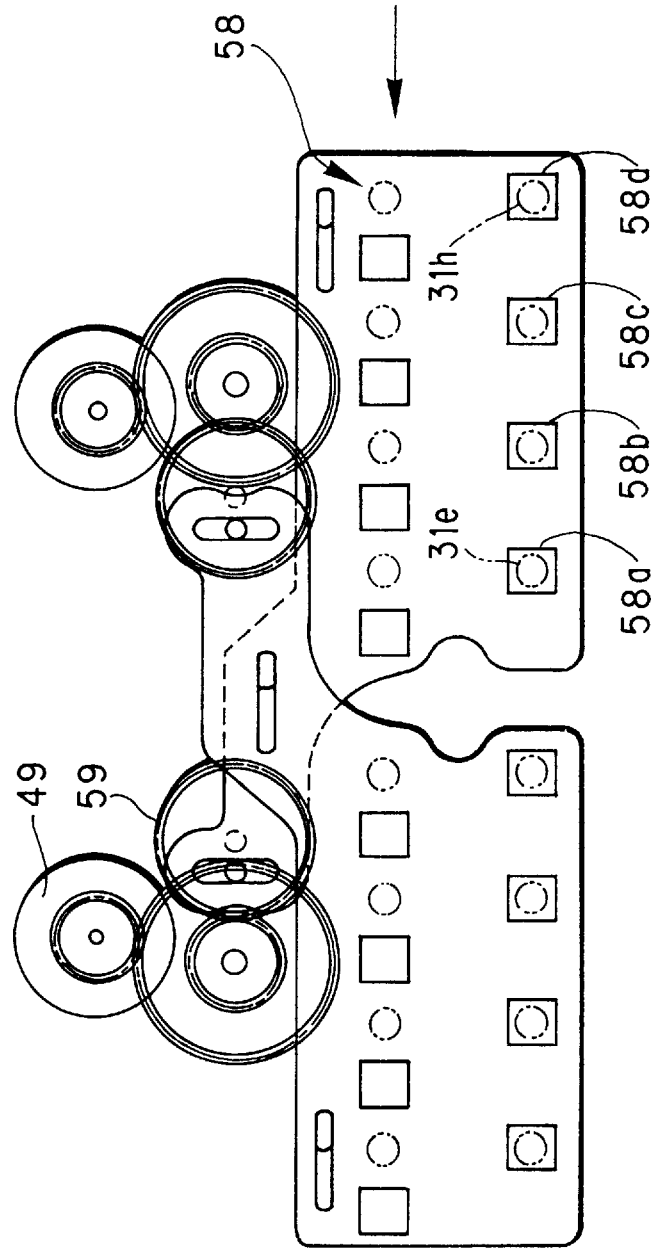
FIG. 20 is an explanatory view illustrating the same state of the mechanism for the plate driving.

The count of the counter comes up to an amount for one rotation of the shutter disks 32, 33, 36 and 37. In FIG. 19, the stepping motor 49 is stopped. The slit gear 66 has made half a rotation from its home position. The slit gear 65 has made one and a half rotation from its home position. As illustrated in FIG. 20, the crank gear 59 has made one and a half rotation from its home position. The movable openings 58a–58d are exactly superposed on the stationary openings 31e–31h. The changeover plate 58 masks the stationary openings 31m–31p, with the movable openings 58e–58h deviated completely.

Figure 21:
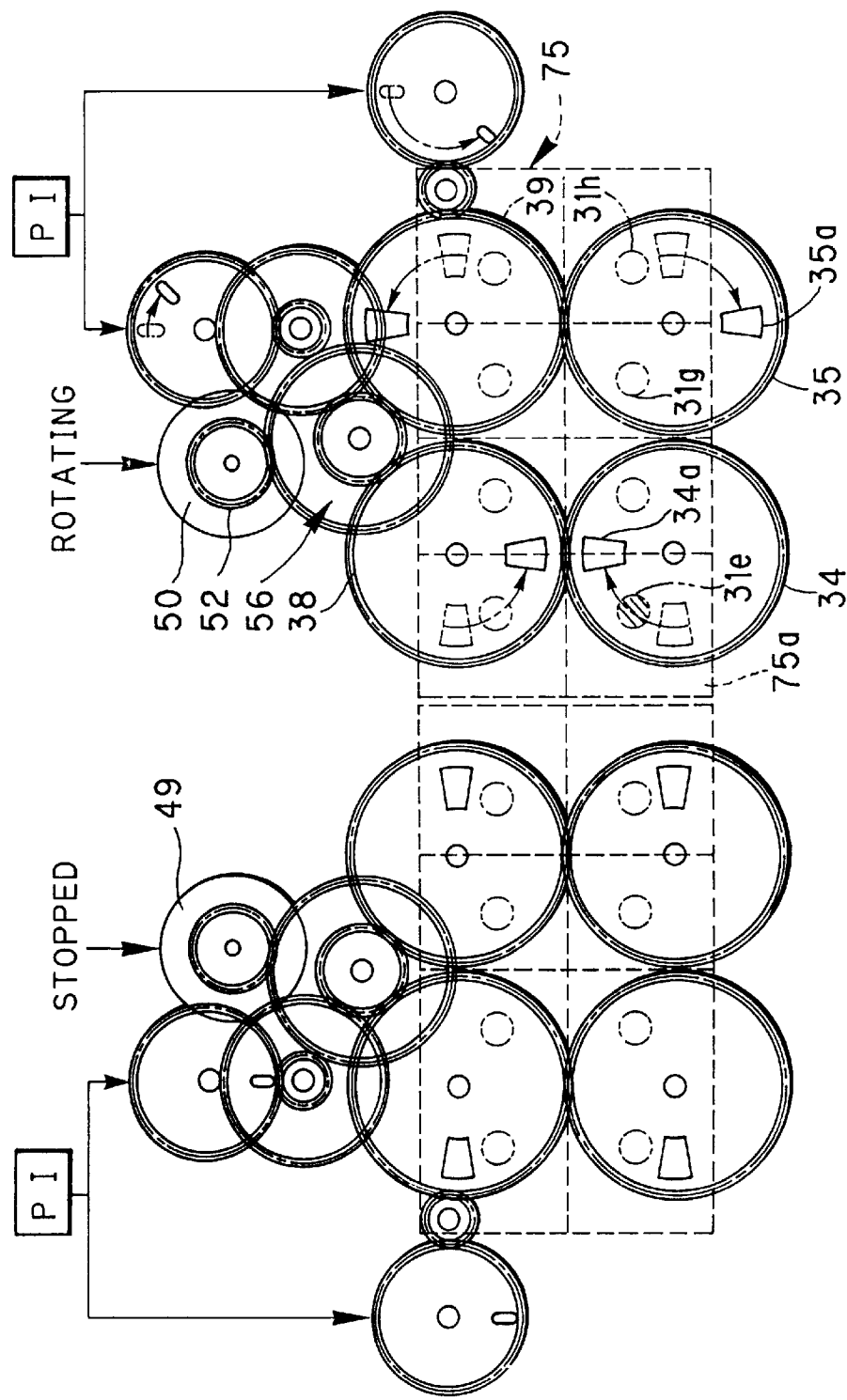
FIG. 21 is an explanatory view illustrating a state where the shutter unit has exposed a fifth sub-frame.

Nearly at the same time as the stepping motor 49 is stopped, the stepping motor 50 is started rotating. As illustrated in FIG. 21, the motor gear 52 rotates counterclockwise. The shutter disks 34 and 35 are rotated clockwise by use of the double gear 56, at the same time as the shutter disks 38 and 39 are rotated counterclockwise. The rotation of the stepping motor 50 is so controlled that rotational speed between the exposures is different from that during each of the exposures. The movable openings 58a–58d in the changeover plate 58 remain superposed on the stationary openings 31e–31h. At the lapse of 100 msec following the fourth exposure, the shutter slit 34a in the shutter disk 34 passes in front of the stationary opening 31e, to take the fifth exposure in the sub-frame 75a.

At the lapse of 100 msec following the fifth exposure, the shutter slit 34a is passed in front of the stationary opening 31f, to take the sixth exposure in the sub-frame 74b. At the lapse of further 100 msec, the shutter slit 33a is passed in front of the stationary opening 31c, to take the seventh exposure in the sub-frame 74c. At the lapse of further 100 msec, the shutter slit 33a is passed in front of the stationary opening 31d, to take the eighth exposure in the sub-frame 74d.

Figure 22:
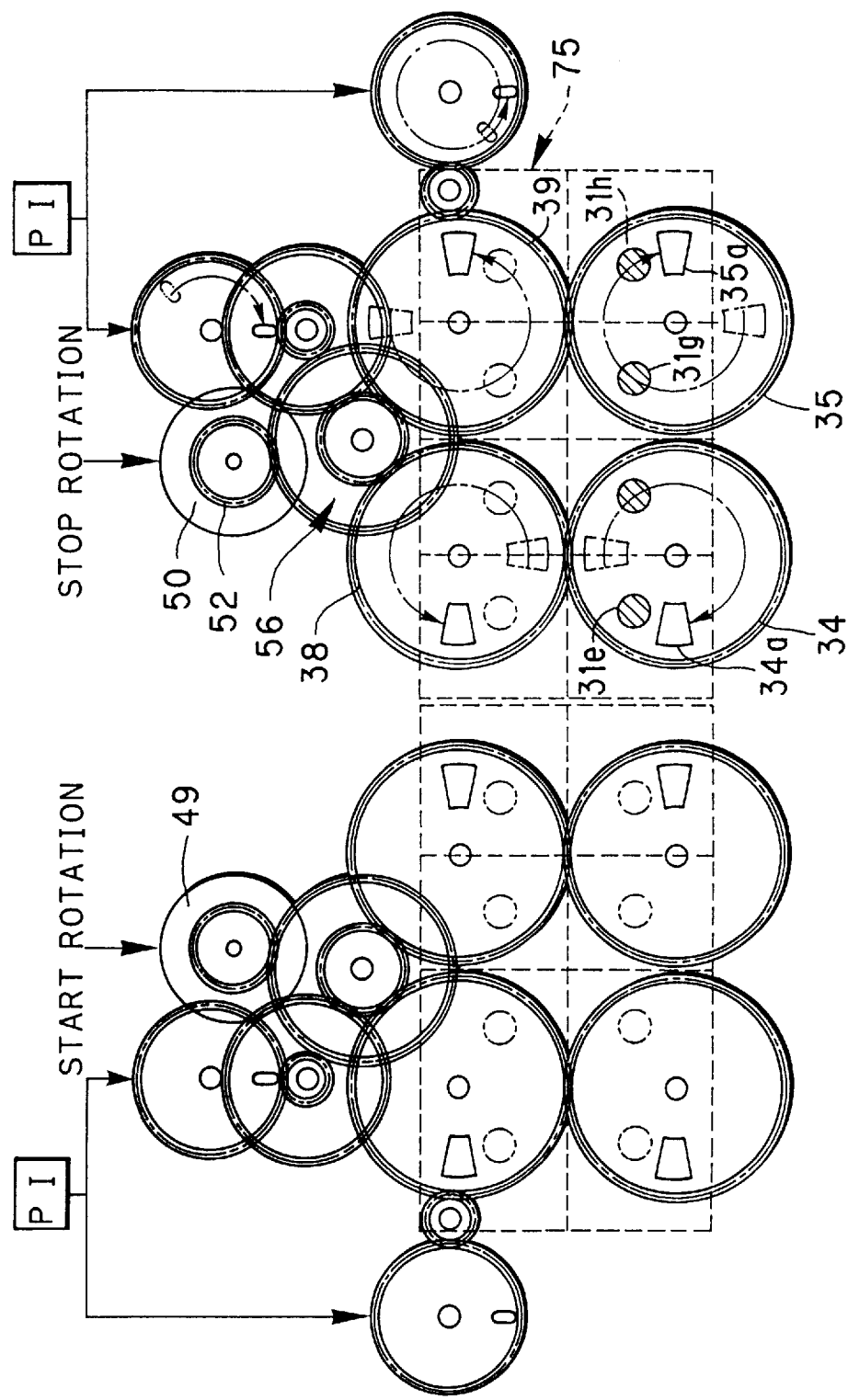
FIG. 22 is an explanatory view illustrating a state where the shutter unit has exposed an eighth sub-frame.
Figure 23:
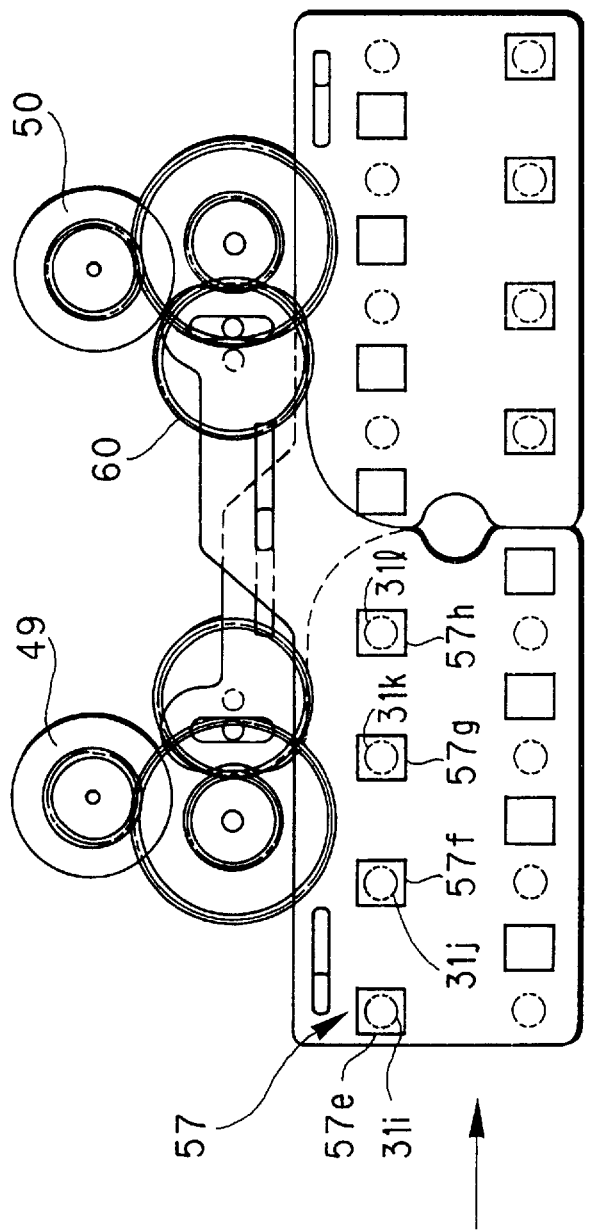
FIG. 23 is an explanatory view illustrating the same state of the mechanism for the plate driving.

When the count of the counter comes up to an amount for one rotation of the shutter disks 34, 35, 38 and 39, the stepping motor 50 is stopped as illustrated in FIG. 22. The slit gear 66 has made half a rotation from its home position. The slit gear 65 has made one and a half rotation from its home position. As illustrated in FIG. 23, the crank gear 60 has made one and a half rotation from its home position. The movable openings 57e–57h in the changeover plate 57 are completely superposed on the stationary openings 31i–31l. The movable openings 57a–57d are deviated from the stationary openings 31a–31d, which stand masked.

At the same time as the stop of the stepping motor 50, the stepping motor 49 is started rotating. At the lapse of 100 msec following the eighth exposure, the shutter slit 36a in the shutter disk 36 is passed in front of the stationary opening 31i. The movable openings 57e–57h are still superposed on the stationary openings 31i–31l. The ninth exposure is taken in the sub-frame 74e.

At the lapse of 100 msec following the ninth exposure, the shutter slit 36a passes in front of the stationary opening 31j to take the tenth exposure in the sub-frame 74f. At the lapse of further 100 msec, the shutter slit 37a in the shutter disk 37 passes in front of the stationary opening 31k to take the eleventh exposure in the sub-frame 74g. At the lapse of further 100 msec, the shutter slit 37a passed in front of the stationary opening 31l to take the twelfth exposure in the sub-frame 74h. Then the shutter disks 32, 33, 36 and 37 finish two rotations. The slit gear 65 has made three rotations. The slit gear 66 has made one rotation. Therefore the slits 65a and 66a are superposed on one another in their home position. A detecting signal is obtained from the PI sensor 69. In response, the stepping motor 49 is stopped rotating.

The crank gear 59 has made three rotations from its home position. The movable openings 58e–58h are exactly superposed on the stationary openings 31m–31p. The changeover plate 58 completely masks the stationary openings 31e–31h, with the movable openings 58a–58d in deviation.

Nearly at the same time as the stop of the stepping motor 49, the stepping motor 50 is started rotating. The movable openings 58e–58h in the changeover plate 58 are superposed on the stationary openings 31m–31p. At the lapse of 100 msec following the twelfth exposure, the shutter slit 38a in the shutter disk 38 passes in front of the stationary opening 31m, to take the thirteenth exposure in the sub-frame 75e.

At the lapse of 100 msec following the thirteenth exposure, the shutter slit 38a is passed in front of the stationary opening 31n, to take the fourteenth exposure in the sub-frame 75f. At the lapse of further 200 msec, the shutter slit 39a in the shutter disk 39 is passed in front of the stationary opening 31o, to take the fifteenth exposure in the sub-frame 74g. At the lapse of further 300 msec, the shutter slit 39a is passed in front of the stationary opening 31p, to take the sixteen exposure in the sub-frame 74h. The shutter disks 34, 35, 38 and 39 finish the two rotations. The slit gear 68 has made three rotations, and the slit gear 67 one rotation. The slits 67a and 68a are superposed in their home position, so that the PI sensor 70 generates a detecting signal. In response to this, the stepping motor 50 is stopped. The crank gear 60 has made three rotations from the home position. The movable openings 57a–57d in the changeover plate 57 are exactly superposed on the stationary openings 31a–31d. Now the shutter unit 22 has the initial state of FIG. 15.

In response to detecting signals from the PI sensors 69 and 70, the CPU 100 drives the motor 87a to wind the photo film 86, and counts times of passage of the slit in accordance with an output from the PI sensor 94. As soon as the count comes up to an amount for the length of two frames, the motor 87a is stopped. Then unexposed two frames are set on the exposure chambers 81.

Operation of the one-shot mode is described now. To set the one-shot mode, at first the one-shot release button 15 is depressed. The order of exposing the sub-frames in the one-shot mode is the same as that in the consecutive mode. An image of each time of the releasing is recorded, by use of rotation of the stepping motors 49, 50 in intermittent fashion with respect to a predetermined angle. This is advantageous for example in photographing an initial orientation of a golfer at the point of swinging his club. It is easy for the user to take each photograph at a moment as he desires.

Figure 24:
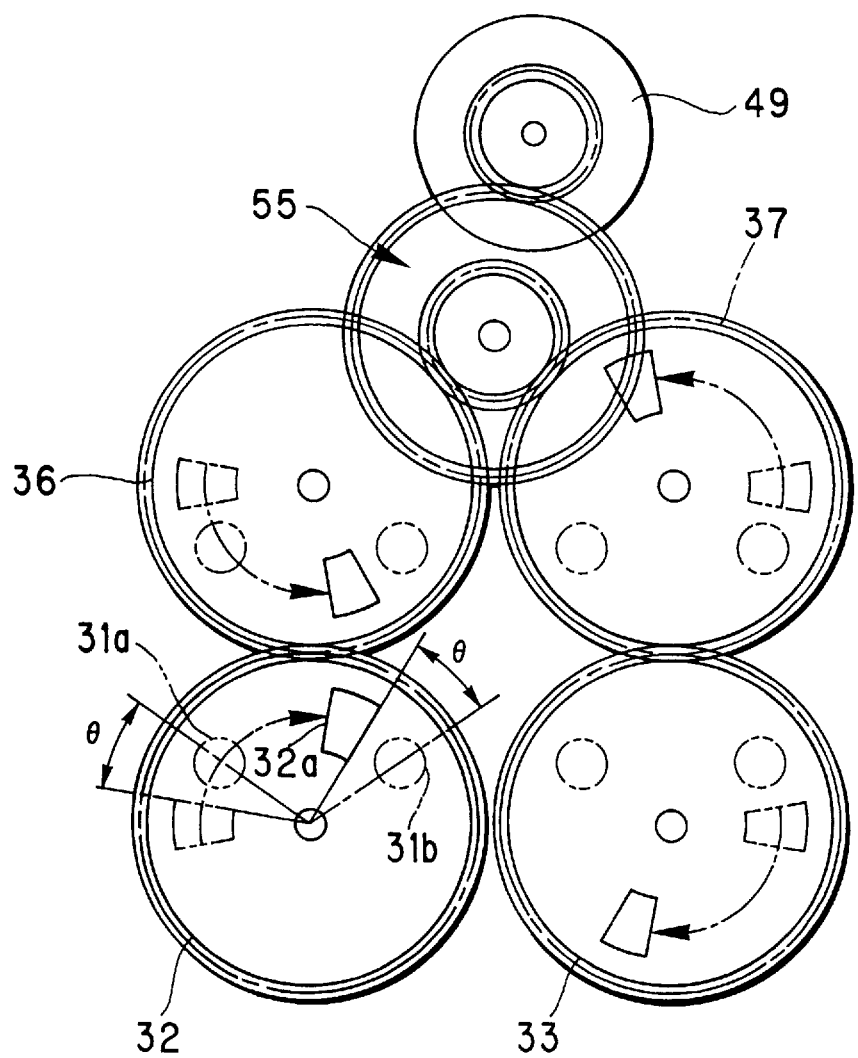
FIG. 24 is an explanatory view illustrating stop positions of the shutter disks in the one-shot mode.

To expose sixteen sub-frames all in the one-shot mode, the stepping motor 49 is rotated at a predetermined angle upon a first releasing operation. Then the shutter slit 32a passes in front of the stationary opening 31a, to expose the sub-frame 74a in the frame 74. In controlling the stop of the stepping motor 49, it is considered that the shutter slit 32a is stopped in a position an angle $\theta$ short of the stationary opening 31b, as illustrated in FIG. 24, in the same as the home position of the shutter slit 32a is $\theta$ short of the stationary openings 31a. Similarly stop positions are regularly determined, to set time lags equal.

For the first to fourth times of the releasing, the stepping motor 49 is driven at the predetermined angle. For the fifth to eighth times of the releasing, the stepping motor 50 is driven. For the ninth to twelfth times of the releasing, the stepping motor 49 is driven. For the thirteenth to sixteenth times of the releasing, the stepping motor 50 is driven. Respective images are recorded in the sub-frames 74a–74h and 75a–75h.

Figure 25:
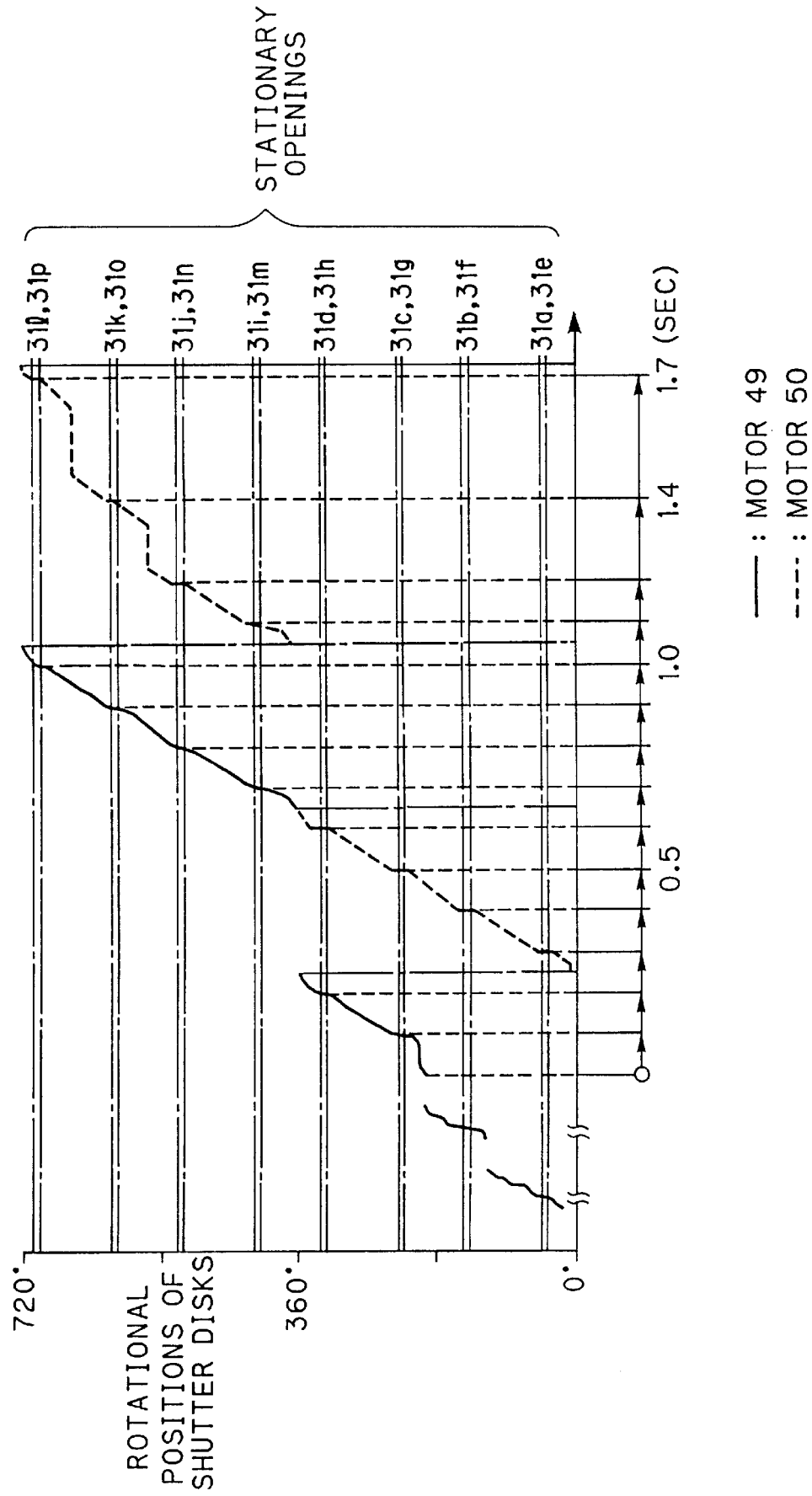
FIG. 25 is a timing chart illustrating all the rotations of the shutter disks while two one-shot, and 14 consecutive exposures are taken.

Operation of combination of one or more one-shot exposures and following consecutive exposures is now described. FIG. 16 illustrates an example of two one-shot exposures and fourteen consecutive exposures, taken by depressing the one-shot release button 15 for two times and the consecutive release button 16 for one time. The one-shot exposures are counted by the counter 99. The count of the counter 99 is used for determining the intervals between consecutive exposures with remaining sub-frames. The exposure intervals are determined equal to intervals of exposures taken in the consecutive mode. When the consecutive taking pitch is set Slow for example, the shutter disks are rotated as illustrated in FIG. 25 for exposures.

The count of the counter 99 is indicated in the LCD panel 18 each time it is stepped. The LCD panel 18 has a circular indicia including sixteen sectors as illustrated in FIG. 11. The circular indicia is so shown that the number of actuated sectors represents the number of one-shot exposures as taken. Note that it is alternatively possible for the LCD panel 18 to have sixteen rectangular areas instead of the sectors, for indicating the number of times.

When load is applied to the motor 87a in winding of two frames of the film, the load is detected, so that the motor 87a is controlled to wind back the whole of the photo film 86. The photo film 86 after exposures is contained in the cassette 88. Then the back lid 21 is opened, to unload the cassette 88, which is forwarded to a photo laboratory. In the photo laboratory, the photo film 86 is developed in a way the same as is conventional. The imaging frames 74 and 75 of the photo film 86 are printed one by one, to produce photographic prints of a wide-vision size, namely 89×158 mm. Then two prints can be juxtaposed to show sixteen images of the principal object as if its movement were stopped in them.

In the above-described embodiment, the one-shot and consecutive release buttons 15 and 16 are arranged for designation of the one-shot and consecutive modes. Note that it is possible to arrange one of them on the left of the top of the camera, with the other on the right. The present invention is also applicable to a camera having a single release button, which can be halfway depressed to take a one-shot exposure, and can be fully depressed to take consecutive exposure. The camera may preferably execute a process to check whether the release button is halfway depressed or not, for the purpose of distinguishing the half depression from the full depression involved with a state of passing a half depressed position. It is preferable to monitor the time of a stop of the release button in the half depressed position, to detect the half depression and the full depression. With the camera of this type, it is possible to take consecutive exposures immediately after the one-shot exposure, only with a finger of a user pushing the release button at the small stroke to a full depressed position from the half depressed position. The user can enjoy easiness in releasing the shutter device quickly upon he finds a chance for taking a photograph.

It is further possible for a camera to have a single release button and an externally operable selector switch, and to select the one-shot mode and the consecutive mode in association with operation of changing over the selector switch. It is also possible for a camera to have a single release button and a shifting button, so that an exposure in the one-shot mode can be taken by depressing the release button, and that exposures in the consecutive mode can be taken by keeping depression of the shifting button and depressing the release button. With such a camera, it is preferable to dispose the release button in a position easily tangible to an index finger of a user's right hand supporting the camera, and to dispose the shifting button in a position easily tangible to a finger of the user's left hand supporting the camera.

In the camera of the above embodiment, the initial designation of the consecutive mode automatically causes the shutter to take no less than sixteen exposures consecutively. The present invention is applicable to a consecutive camera provided with an external operable device such as a button 134 for setting the number of consecutive exposures to be taken as a user desires (See FIG. 11). It is possible first to take a number of consecutive exposures less than sixteen, and subsequently to take one or more one-shot exposures in the remaining sub-frames.

Figure 26:
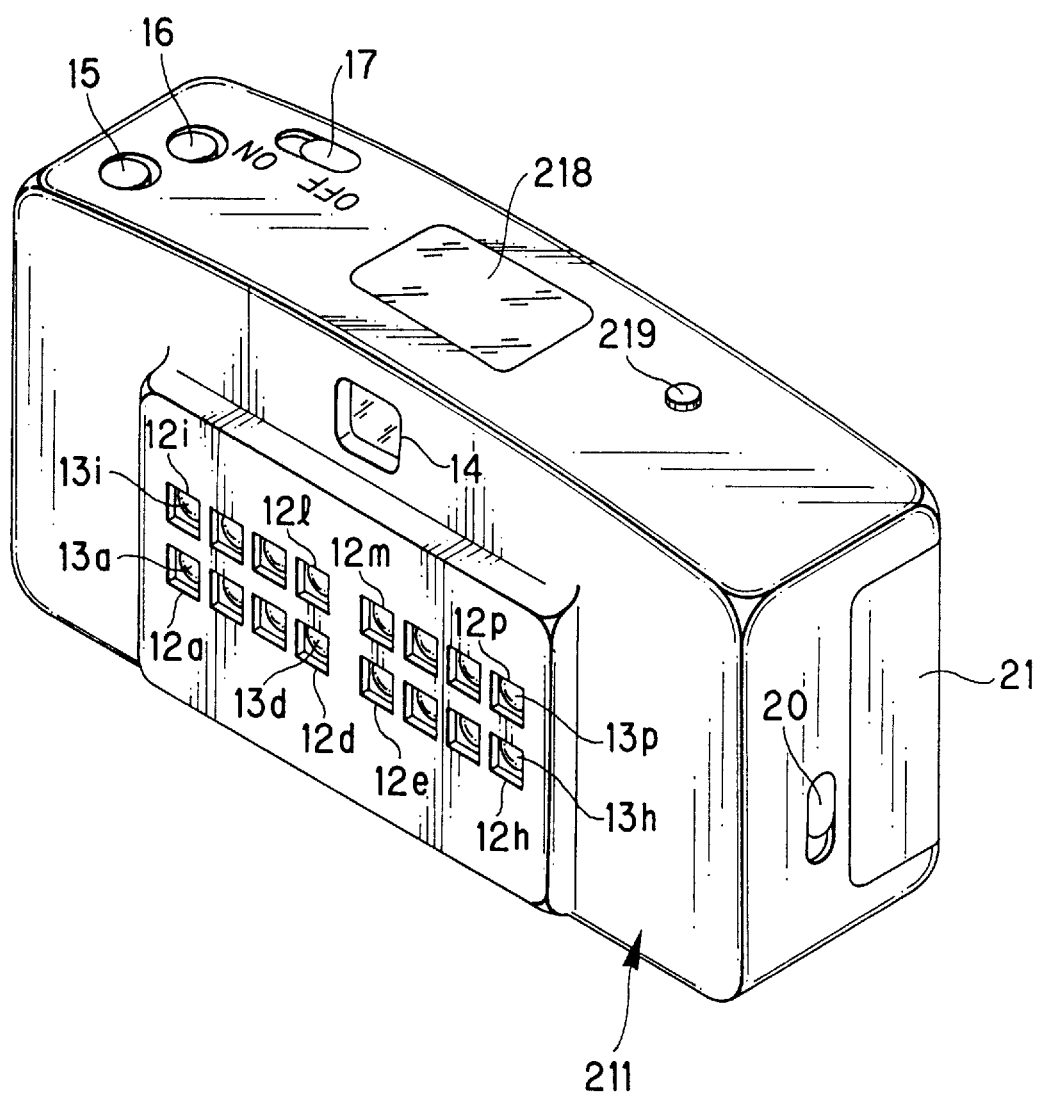
FIG. 26 is a perspective view illustrating another preferred consecutive taking camera.

Another preferred embodiment with a variant liquid crystal display panel 218 is described now. Elements similar to those of the above embodiment are designated with identical reference numerals. In FIG. 26, a consecutive taking camera 211 has a pitch setting button 219, which is operable in the consecutive mode for selecting one of three total durations for consecutive taking sequences, which are started upon a release of the shutter device and ended by an exposure in a final sub-frame. The three durations are Slow pitch (2 seconds), Medium pitch (1 second) and Fast pitch (0.5 second). The pitch setting button 219 is operated in a cyclic manner by one or more times of depression: it is set at the Slow pitch when depressed one time, set at the Medium pitch when depressed two times, and set at the Fast pitch when depressed three times.

Figure 27:
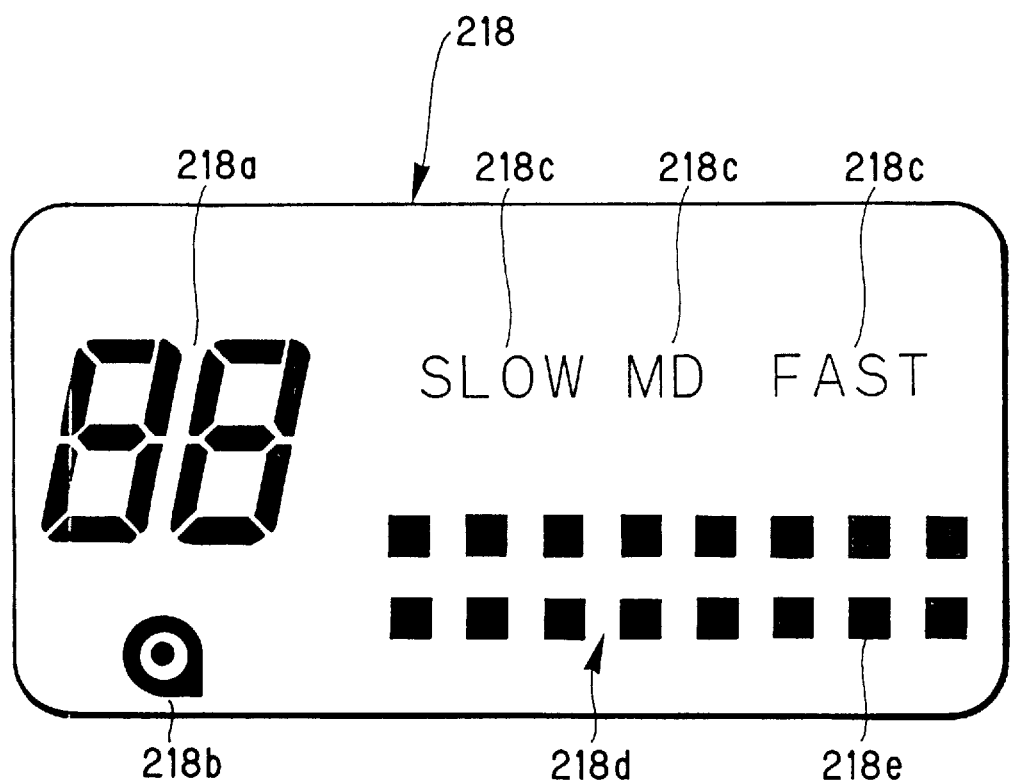
FIG. 27 is a plan view illustrating all segments of a liquid crystal display panel of the camera of FIG. 26.

In FIG. 27, an LCD panel 218 includes TN liquid crystal elements of a reflection type, and has segment electrodes, which include numerical segments 218a for indicating a count of using the film, mark segments 218b for indicating loading of the film, pitch indicator segments 218c for indicating selected pitch in consecutive exposures, and a simulating segment group 218d for indicating a situation of exposures. In the pitch indicator segments 218c appear letters of SLOW, MEDIUM and FAST. The simulating segment group 218d includes sixteen square segments 218e in a matrix of 2×8. The square segments 218e are turned on successively in the same periodical manner as the consecutive exposures at the pitch selected through the pitch setting button 219. The simulating segment group 218d also indicates the number of one-shot exposures by turning on ones of the simulating segment group 218d as many as the number.

The camera 211 includes the CPU 100 (See FIG. 11), which reads the count out of the counter 99 when required, and controls the LCD panel 218 so as to indicate the count in representation of the number of turning on the square segments 218e in the simulating segment group 218d.

Figure 28:
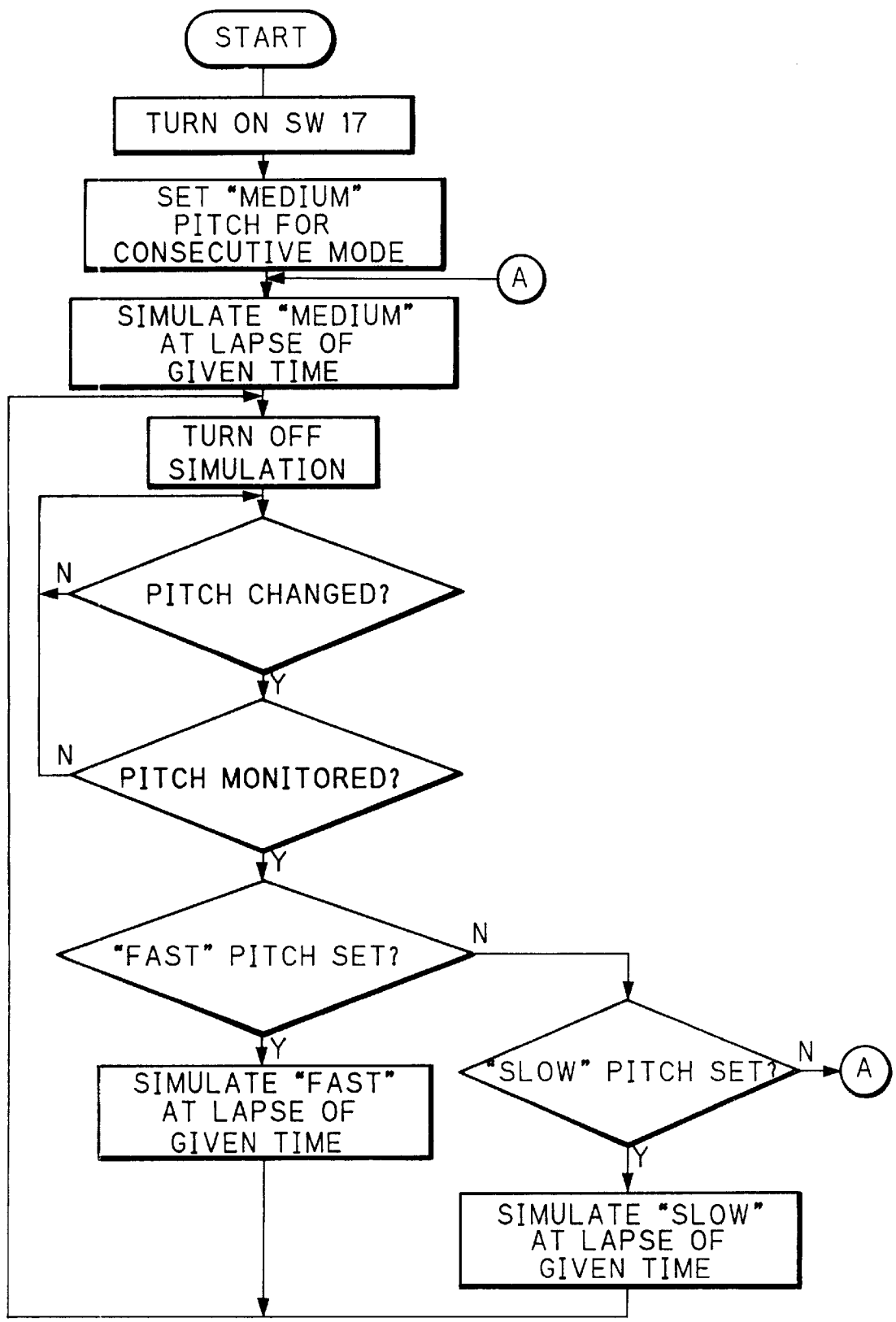
FIG. 28 is a flow chart illustrating a sequence of displaying simulation of consecutive exposures.

The CPU 100 incorporates a driver circuit for driving the LCD panel 218 in a matrix system. In response to loading of the photo film, the driver circuit drives the mark segments 218b in a visible state. Each time the pitch setting button 219 is depressed, indication of the pitch indicator segments 218c is changed in cyclic fashion. The CPU 100, as illustrated in FIG. 28, responds to the turning on of the power switch 17, designates the Medium pitch to cause the pitch indicator segments 218c to indicate letters MEDIUM. At the lapse of a predetermined duration following the turning on of the power switch 17, the CPU 100 controls the simulating segment group 218d to turn on the square segments 218e one after another at the period equal to the interval of the consecutive exposures. The CPU 100 also monitors durations between successive depressions of the pitch setting button 219. If the CPU 100 detects that the pitch setting button 219 is not depressed even at a lapse of a predetermined duration following the latest depression, then the CPU 100 automatically sets the pitch designated previously, in successively turning on the square segments 218e of the simulating segment group 218d.

When the power switch 17 is turned on, the consecutive taking pitch is set as Medium. The pitch indicator segments 218c of the LCD panel 218 are caused literally to indicate MEDIUM. At the lapse of a predetermined duration, the square segments 218e of the simulating segment group 218d are turned on one after another in the same periodical manner as the consecutive exposures at the Medium pitch.

Figure 29:
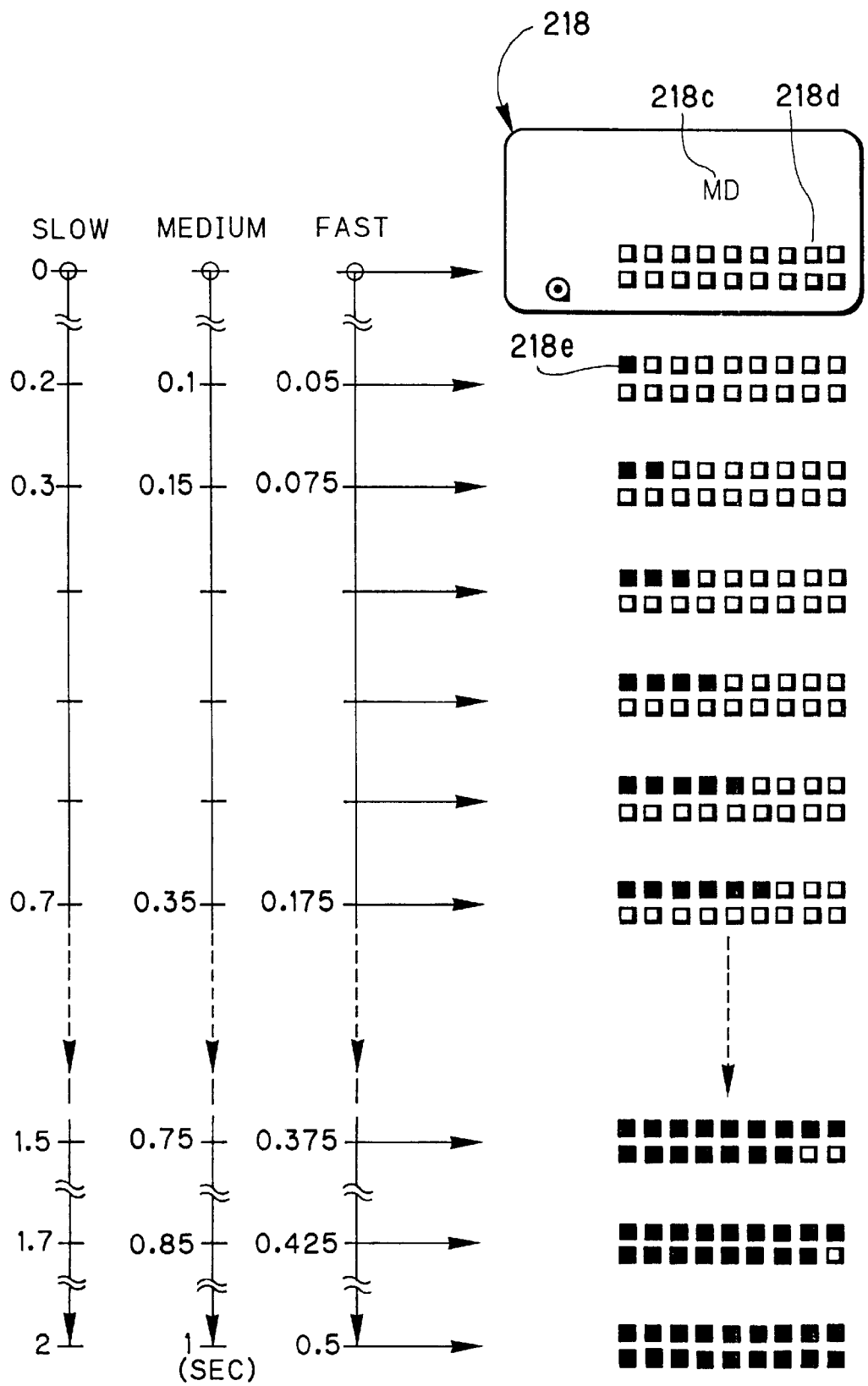
FIG. 29 is an explanatory view illustrating simulation of intervals of 16 consecutive exposures.

This indicating operation is described in detail with reference to FIG. 29. At the lapse of 0.1 second following the setting of the Medium pitch in the CPU 100, a first one of the square segments 218e at the upper left corner in the matrix is turned on. At the lapse of further 0.05 second, a second one of the square segments 218e to the right of the first is turned on. At each lapse of further 0.05 second, other ones of the square segments 218e are turned on with appearance increasing in the direction to the right. At the lapse of 0.55 second following the setting of the Medium pitch, a ninth one of the square segments 218e at the lower left corner is turned on. At the lapse of 1 second, a sixteenth, final one of the square segments 218e at the lower right corner is turned on.

The user of the camera can be given information of the sequential exposures by observing this simulation prior to the exposures. Note that the simulation is turned off at the lapse of a predetermined duration after the turning on of all the square segments 218e.

The user observes features of the movement of the principal object playing a sport, and estimates in what duration it should be photographed and at what time the shutter device should be released in consideration of the movement. If the user does not suppose that the Medium pitch is suitable, then he operates the pitch setting button 219. Each time the pitch setting button 219 is depressed, the pitch indicator segments 218c is changed in indicating the pitch in the cyclic fashion of MEDIUM - FAST - SLOW - MEDIUM. With the pitch setting button 219 checked visually, the pitch as the user desires is selected.

The pitch being set Slow, the CPU 100, at the lapse of 0.2 second after commanding the Slow pitch, turns on a square segment at a left upper corner in the simulating segment group 218d. Then the square segments 218e are turned on successively in the same periodical manner as the consecutive exposures at the Slow pitch, as illustrated in FIG. 29. The simulation of the sequence is turned off at the lapse of a predetermined duration after turning on of all the square segments 218e. If an unskilled user desires to find the simulation two or more times, he can operate the pitch setting button 219 again to set the Slow pitch. The simulation can be indicated as many times as he wishes for standing by for the shutter release in timely condition.

Operation of combination of one or more one-shot exposures and following consecutive exposures is now described. FIG. 16 illustrates the example of two one-shot exposures and fourteen consecutive exposures, taken by depressing the one-shot release button 15 for two times and the consecutive release button 16 for one time. Upon the one-shot exposures, the number of them is displayed at the simulating segment group 218d. The two exposures are represented by the two of the square segments 218e at the upper left corner.

For consecutive exposures, the CPU 100 determines the exposures intervals for the remaining exposures uniquely in accordance with the count of the counter 99. If the consecutive release button 16 is not accompanied with indication for simulation, it is likely that the user cannot grasp the sequence of consecutive exposures following the one-shot exposures. In view of this, the present invention is also constructed to simulate the following consecutive exposures. After taking two one-shot exposures, the pitch setting button 219 is manually operated to set the consecutive duration as desired. At the lapse of a predetermined duration thereafter, the remaining square segments are used for this simulation except for those for the one-shot exposures in the simulating segment group 218d.

Figure 30:
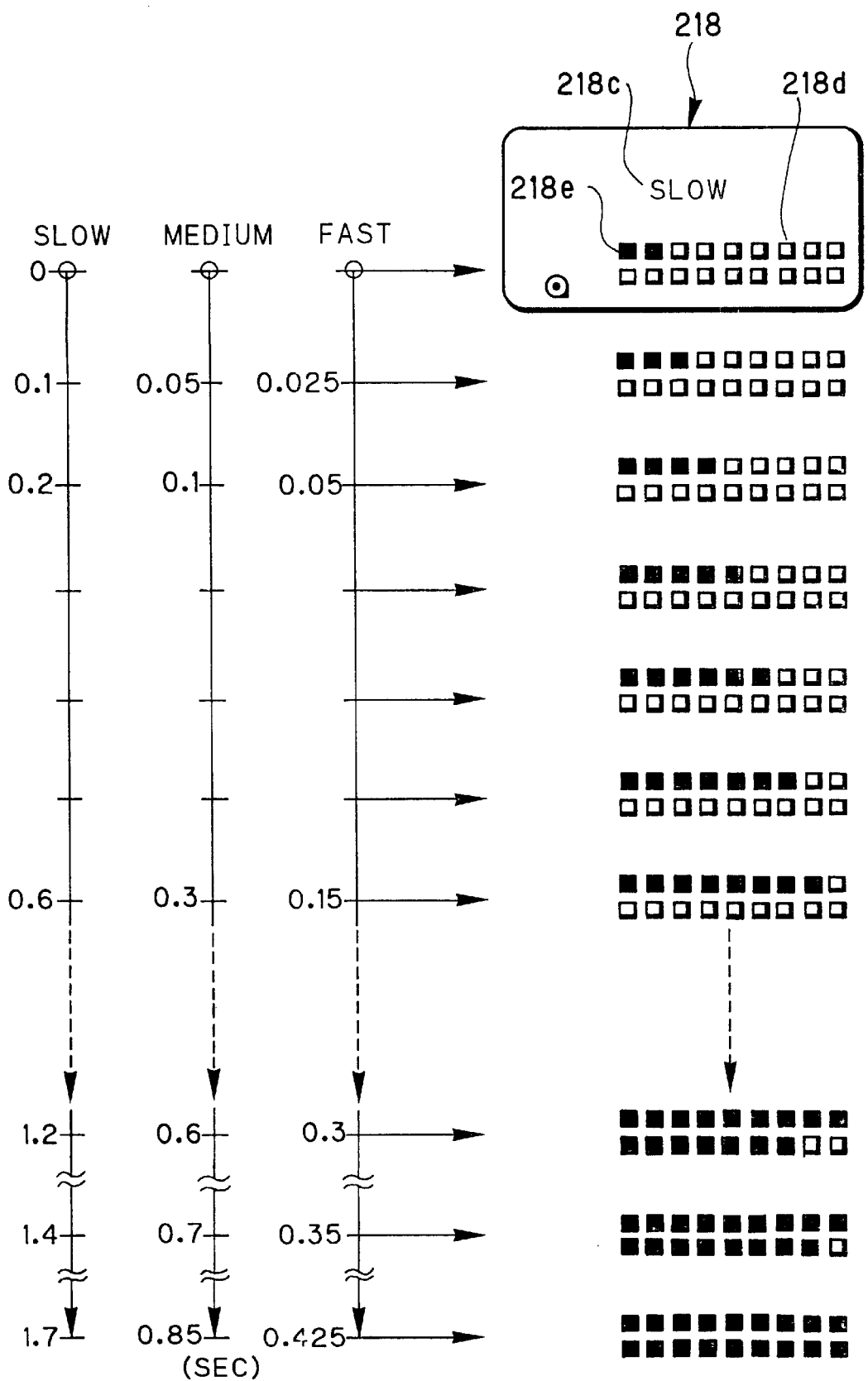
FIG. 30 is an explanatory view illustrating simulation of intervals of 14 consecutive exposures following two one-shot exposures.

While the two of the square segments 218e at the upper left corner are used for indicating the two one-shot exposures, the remaining fourteen of the square segments 218e, as illustrated in FIG. 30, are used for simulating the consecutive exposures in the same periodical manner and illustrated in Table 2.

After checking the simulation, the user depresses the consecutive release button 16. If the Slow pitch is selected, the shutter disks are rotate as illustrated in FIG. 25, to take exposures in the remaining fourteen sub-frames.

In this embodiment, the simulation of consecutive exposures is indicated automatically after the designation of the consecutive taking pitch through the pitch setting button 219. The present invention is applicable to a camera additionally having a simulation indicating button. When a user desires indication of the simulation with such a camera, it is possible for him to operate the simulation indicating button. It is also preferable to modify the pitch setting button 219 in a dial type for the purpose of facilitating the manual designation of the pitch.

Figure 31:
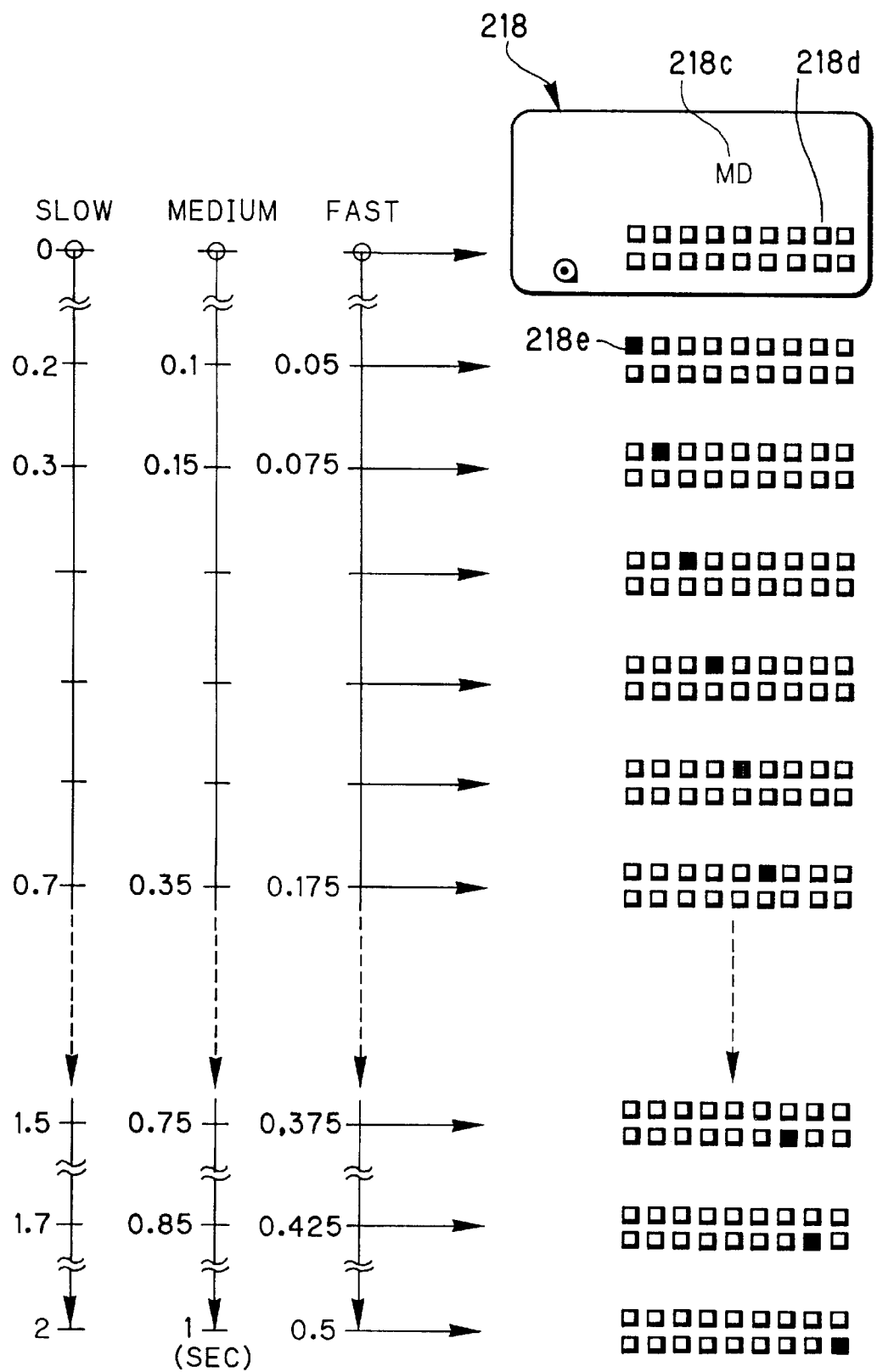
FIG. 31 is an explanatory view illustrating another preferred embodiment in which segments are turned on as if a point were moved.

In the present embodiments, the simulation is indicated by additionally turning on square segments successively in the LCD panel 218. Alternatively the square segments 218e can be so turned on/off that only one segment is turned on at one time and as if it were moved from segment to segment, as illustrated in FIG. 31. It is also possible to use only one segment, and to blink it at time intervals equal to the exposure intervals. This is preferable because only a small number of segment electrodes are required. The cost for the LCD panel can be reduced.

To indicate the simulation instead of the LCD panel 218, an LCD panel may provided with a circular indicia including sixteen sector segments, which may be turned on sequentially. The embodiment above includes the LCD in which the segments appear grey without emitting any light. Of course the LCD can be provided with a light source for back light. The present invention is further applicable to a camera with solid-state elements for emitting light, such as light-emitting diodes (LED) and electroluminescence (EL), as a display device for indicating the simulation.

In the present embodiment, the simulation is indicated visually. Alternatively simulation can be signaled acoustically. It is possible for a camera to have a buzzer, which can be driven to generate buzzes intermittently at intervals the same as those between the exposures. It is also effective to combine the visual indication (with LCD or light-emitting diodes) and the sonic signs. The camera of the type with a buzzer may be provided with a changeover button for a simulating mode without any exposure taken. In the simulating mode the consecutive release button 16 can be so depressed as to drive the buzzer. This enables the user to practice the timely releasing operation during observation through the viewfinder.

Figure 32:
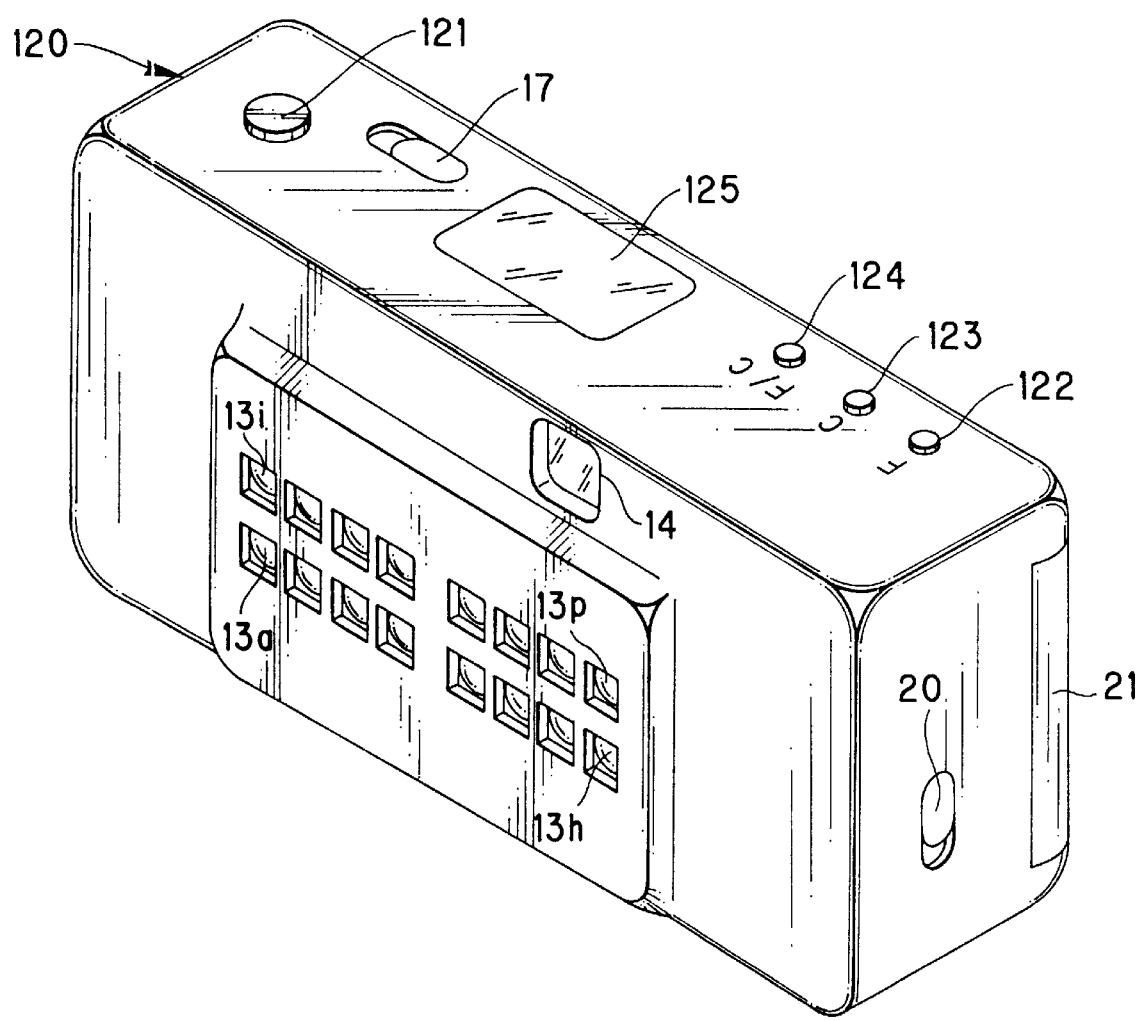
FIG. 32 is a perspective view illustrating another preferred camera operable in a combination mode to take 15 consecutive and one one-shot exposures.

Another preferred embodiment is described now, which includes a mode of a final single one-shot exposure following fifteen consecutive exposures. In FIG. 32, a camera 120 has a shutter release button 121, a one-shot mode button 122 with a sign F for designating the one-shot mode, a consecutive mode button 123 with a sign C for designating the consecutive mode, and a combination mode button 124 with a sign F/C for designating the combination mode of one-shot and consecutive exposures. The mode buttons 122 to 124 are depressed for mode designation before taking exposures.

Figure 33C:
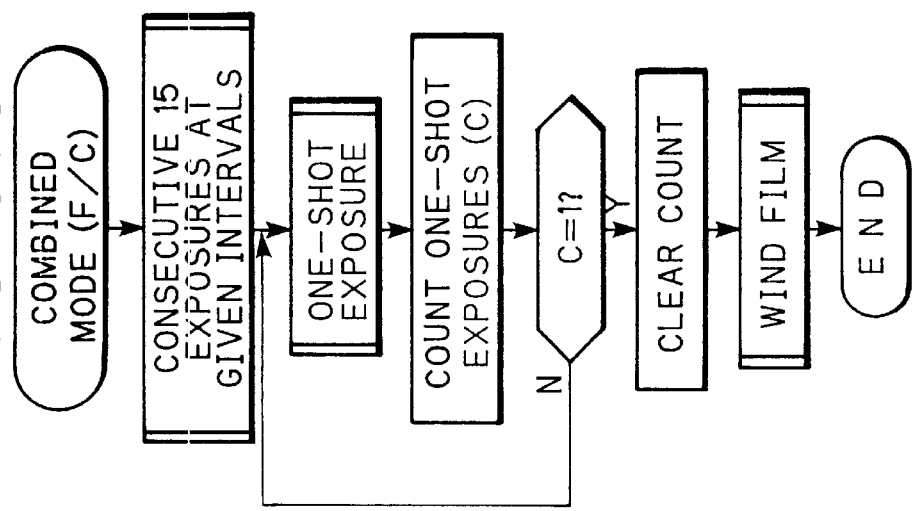
FIGS. 33A–33C are flow charts illustrating operation in respective three modes of the camera of FIG. 32.
Figure 33B:
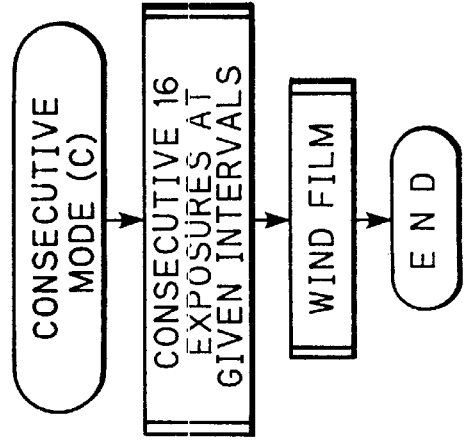
Figure 33A:
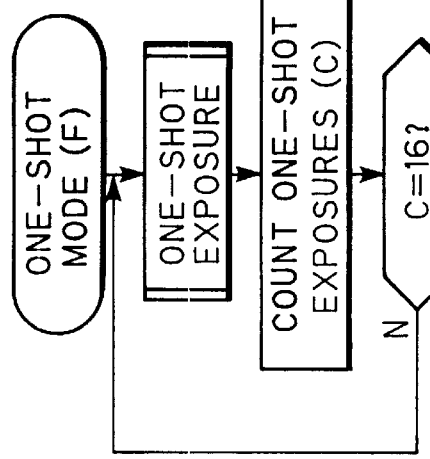

When the one-shot mode button 122 is depressed before an exposure, the one-shot mode is designated as illustrated in FIG. 33A. Each time the shutter release button 121 is depressed, an image is recorded in one sub-frame, to take exposures in the sixteen sub-frames. Then the film is wound. The film starts being wound at the same time as the stop of the stepping motor 50 which has rotated to expose the sub-frame 75h finally.

When the consecutive mode button 123 is depressed, the consecutive mode is designated. As illustrated in FIG. 33B, the shutter release button 121 is depressed for the release, upon which the sixteen sub-frames are exposed time-sequentially within a range of two frames. Then the photo film is wound.

When the combination mode button 124 is depressed, the combination mode is designated for both consecutive and one-shot exposures in combination, as illustrated in FIG. 33C. The shutter release button 121 is depressed one time, to record time-sequential images on fifteen of the sixteen sub-frames. Then the camera stands by for the following operation. Then the shutter release button 121 is depressed again, to take a single one-shot exposure in the final one of the sub-frames. The film is wound.

Figure 34:
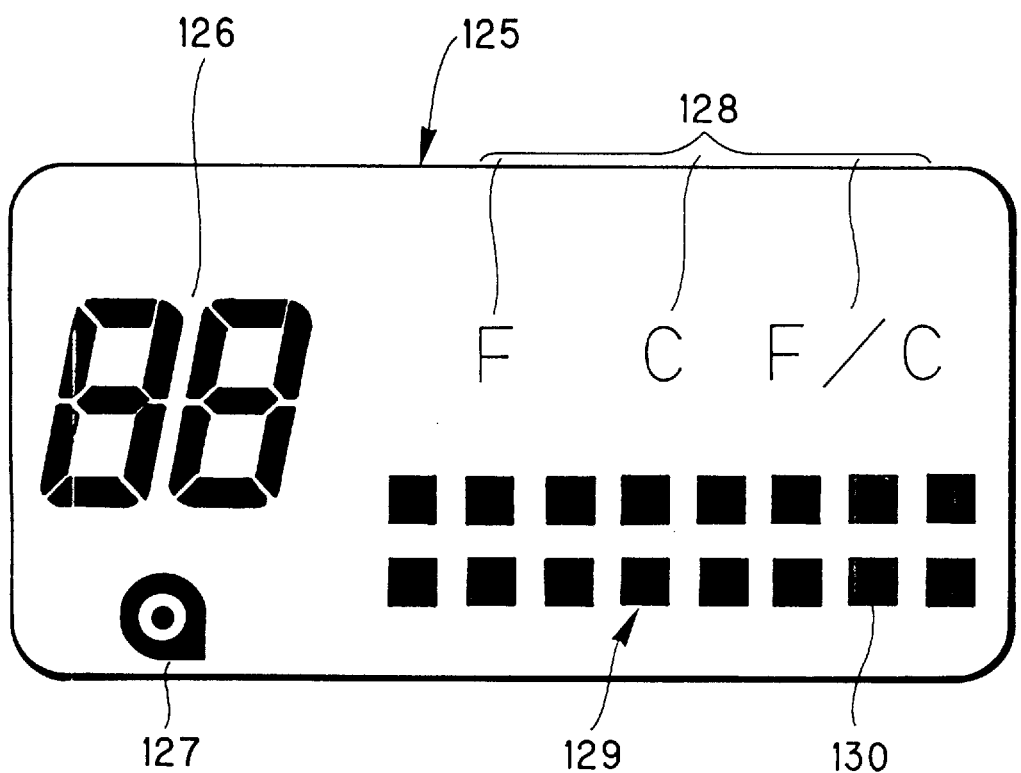
FIG. 34 is an explanatory view illustrating all segments of a liquid crystal display panel.

A liquid crystal display (LCD) panel 125 is disposed on the top of the camera 120, and as illustrated in FIG. 34, has segment electrodes, which include numerical segments 126 for indicating a count of using the film, mark segments 127 for indicating loading of the film, mode segments 128 for indicating selected modes, and a simulating segment group 129 for indicating a situation of exposures.

In the mode segments 128, segments for letters of "F", "C" or "F/C" are turned on, to indicate the mode presently designated for exposures. The simulating segment group 129 includes sixteen square segments 130 in a matrix of 2×8. The square segments 130 are turned on in various manners suitably determined for the consecutive, one-shot, and combination modes as selected.

Figure 35:
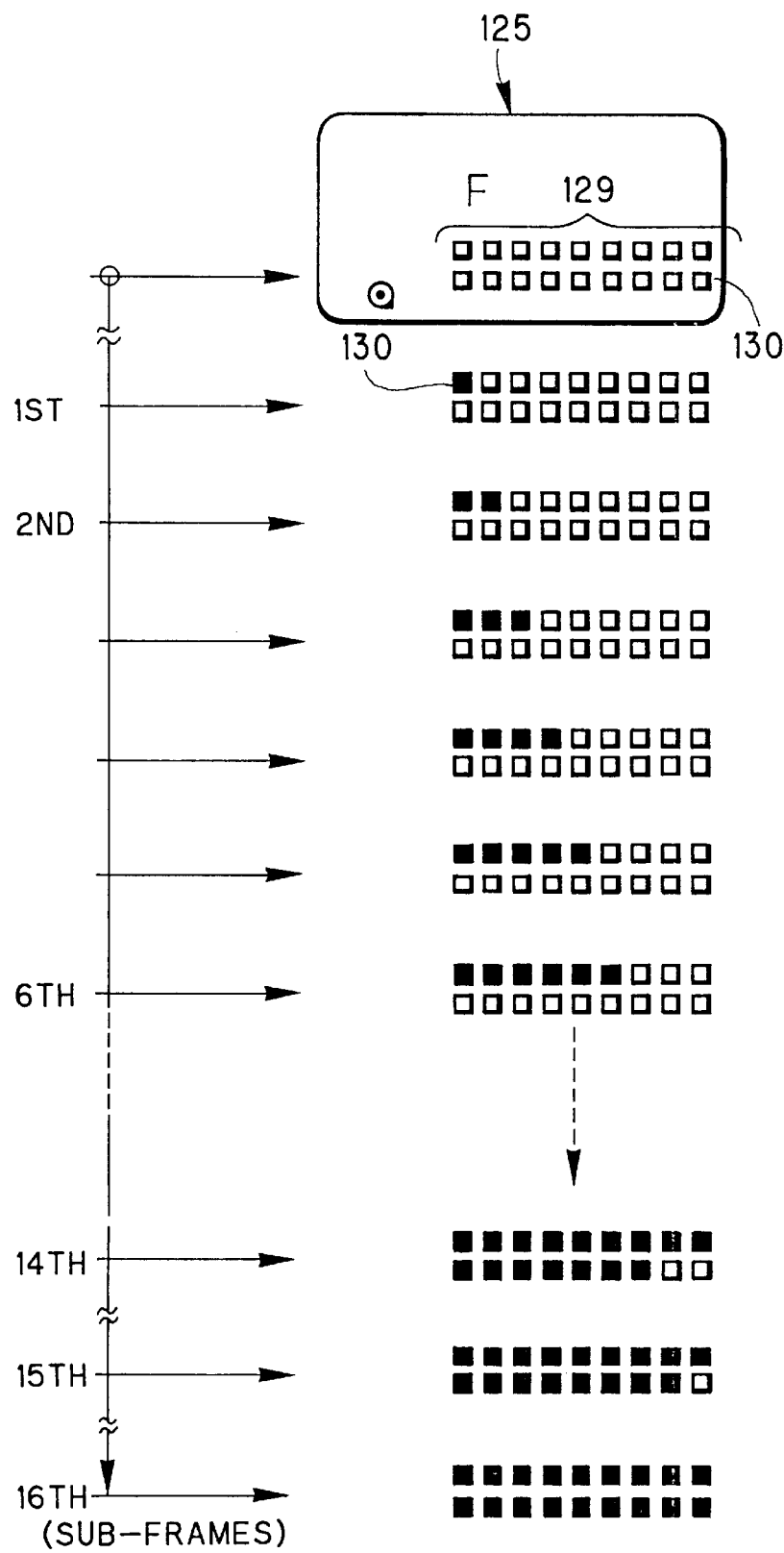
FIG. 35 is an explanatory view illustrating indication of one-shot exposures.

When the one-shot mode is selected, the square segments 130 are all turned off as illustrated in FIG. 35. Upon each operation of the releasing, the square segments 130 are turned on one after another in accordance with increment of the counter 99. The order of the turning on the square segments 130 begins at the left upper corner for the first exposure, is directed toward the right up to the eighth exposures, and after using the upper line, comes to the left lower corner for the ninth exposure, and is directed toward the right again for the remaining exposures. After the square segments 130 are turned on, the photo film is wound. Then all the square segments 130 are turned off.

When the consecutive mode is selected, the square segments 130 are turned on one after another in the same periodical manner as the consecutive exposures at the pitch selected through the pitch setting switch 19. After the film is wound, all the square segments 130 are turned off.

Figure 37:
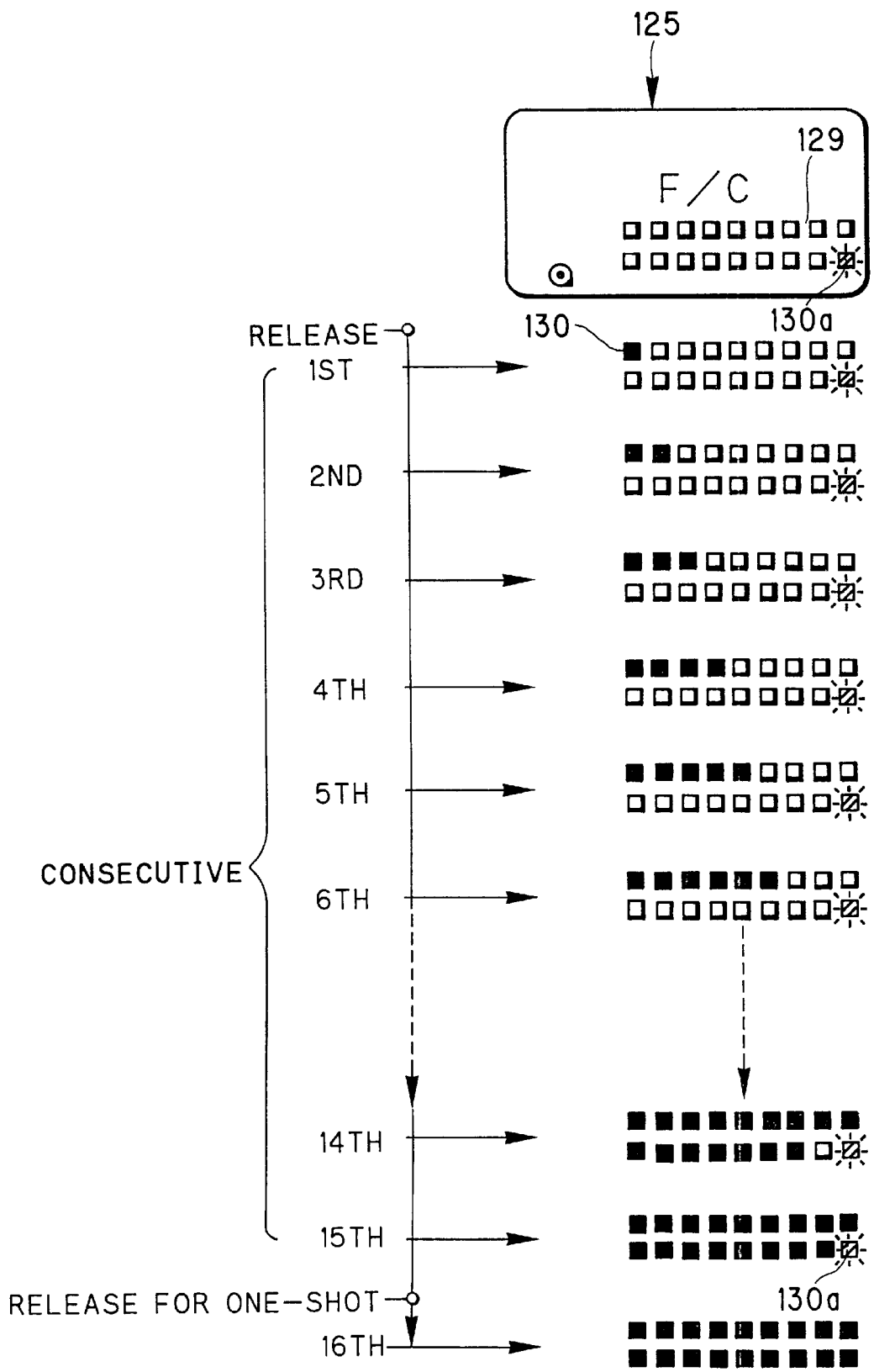
FIG. 37 is an explanatory view illustrating indication of the 15 consecutive and one one-shot exposures in the combination mode.

When the combination mode is selected, fifteen of the square segments 130 are turned off as illustrated in FIG. 37, to leave a final square segment 130a turned on. Upon a first operation of the releasing, the square segments 130 start being turned on one after another at the interval associated with the taking pitch designated through the pitch setting switch 19.

After the consecutive exposures are taken, the fifteen of the square segments 130 are turned on. Only the final square segment 130a of the square segments 130 is blinking, for the purpose of signaling the state of possibility of a single one-shot exposure to be taken. Note that the term "to blink" is used for being turned on and off in repetition for periodical appearance of an LCD segment. The shutter device is released for the second time. The final square segment 130a comes to be turned on continuously, no longer blinking. After winding the film, all the square segments 130 are turned off.

Figure 38:
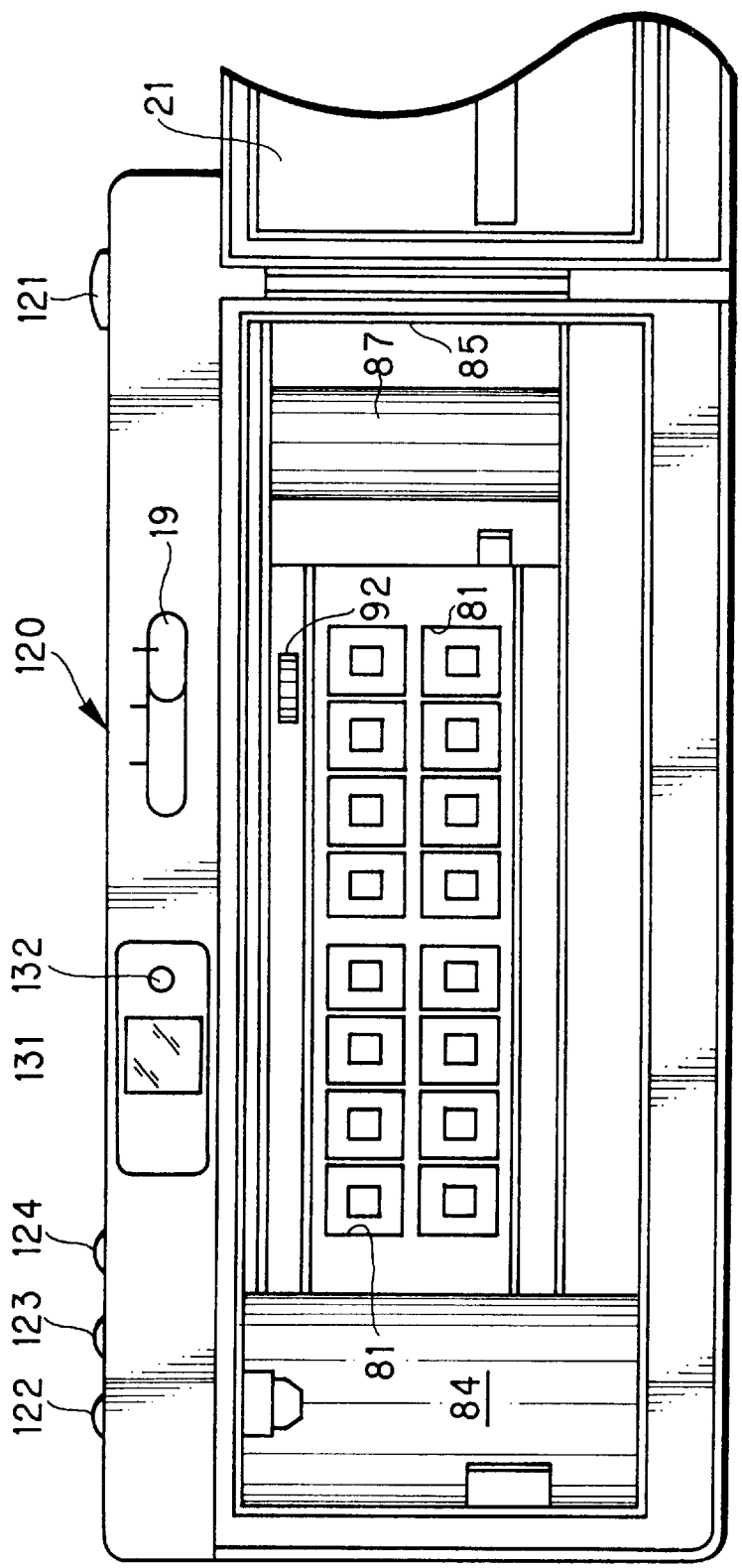
FIG. 38 is an explanatory view in rear elevation, illustrating the inside of the camera.
Figure 39:
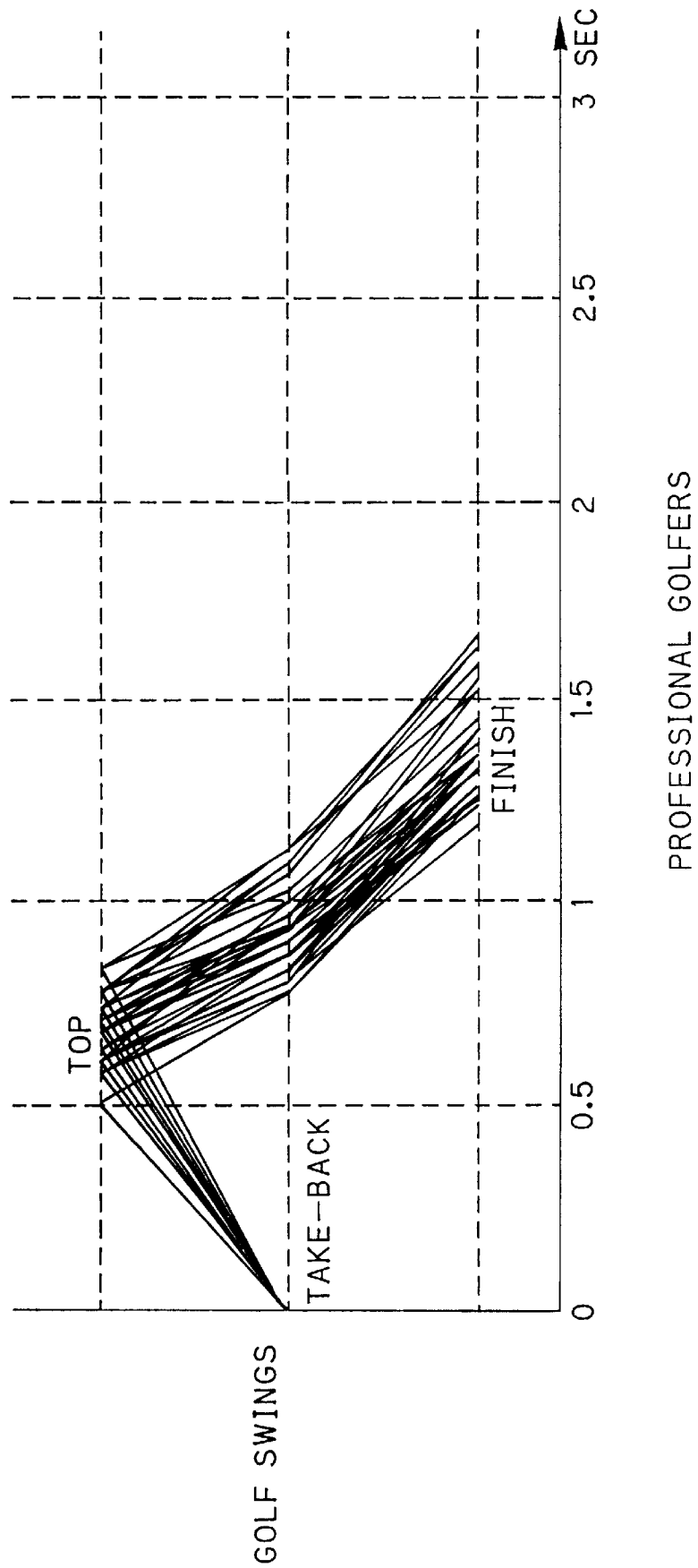
FIG. 39 is a timing chart illustrating durations of golf swings of professional golfers.
Figure 40:
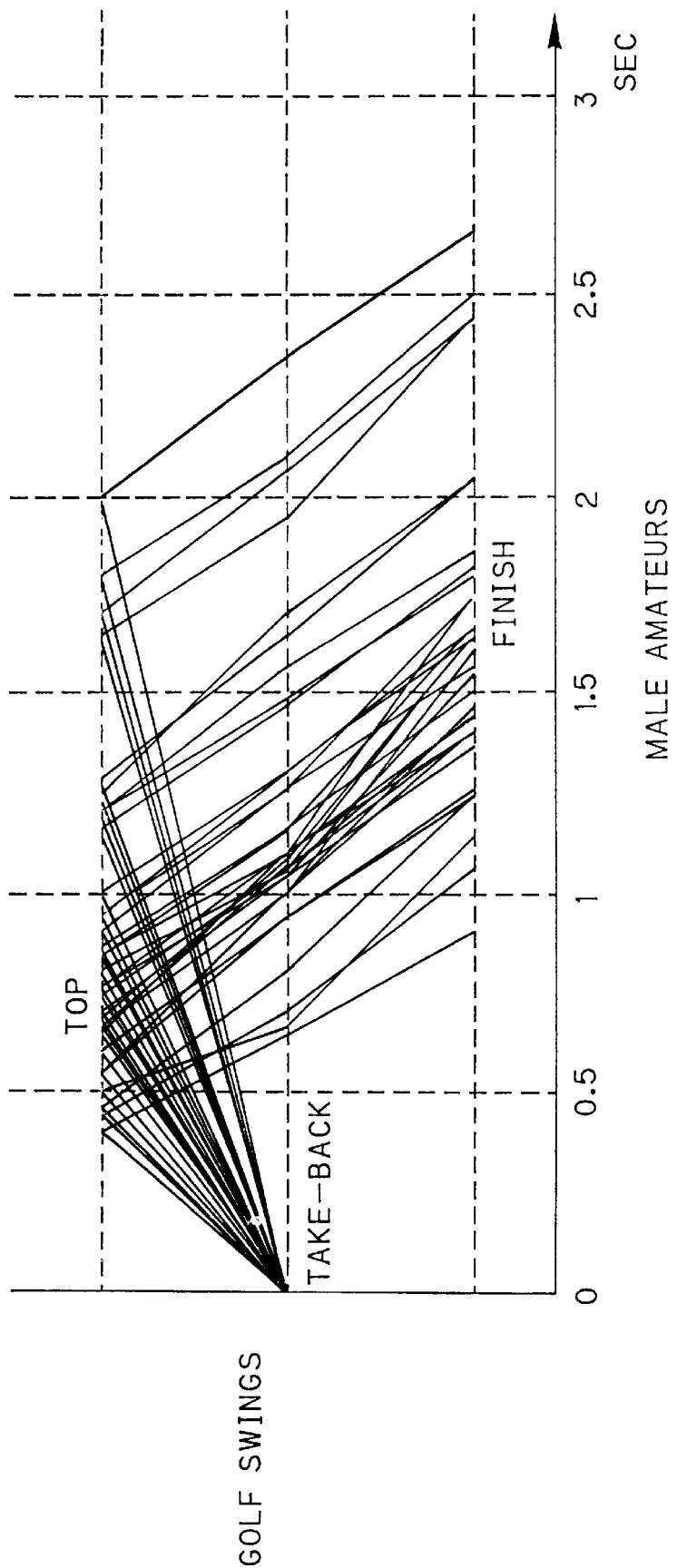
FIG. 40 is a timing chart illustrating durations of golf swings of male amateurs.
Figure 41:
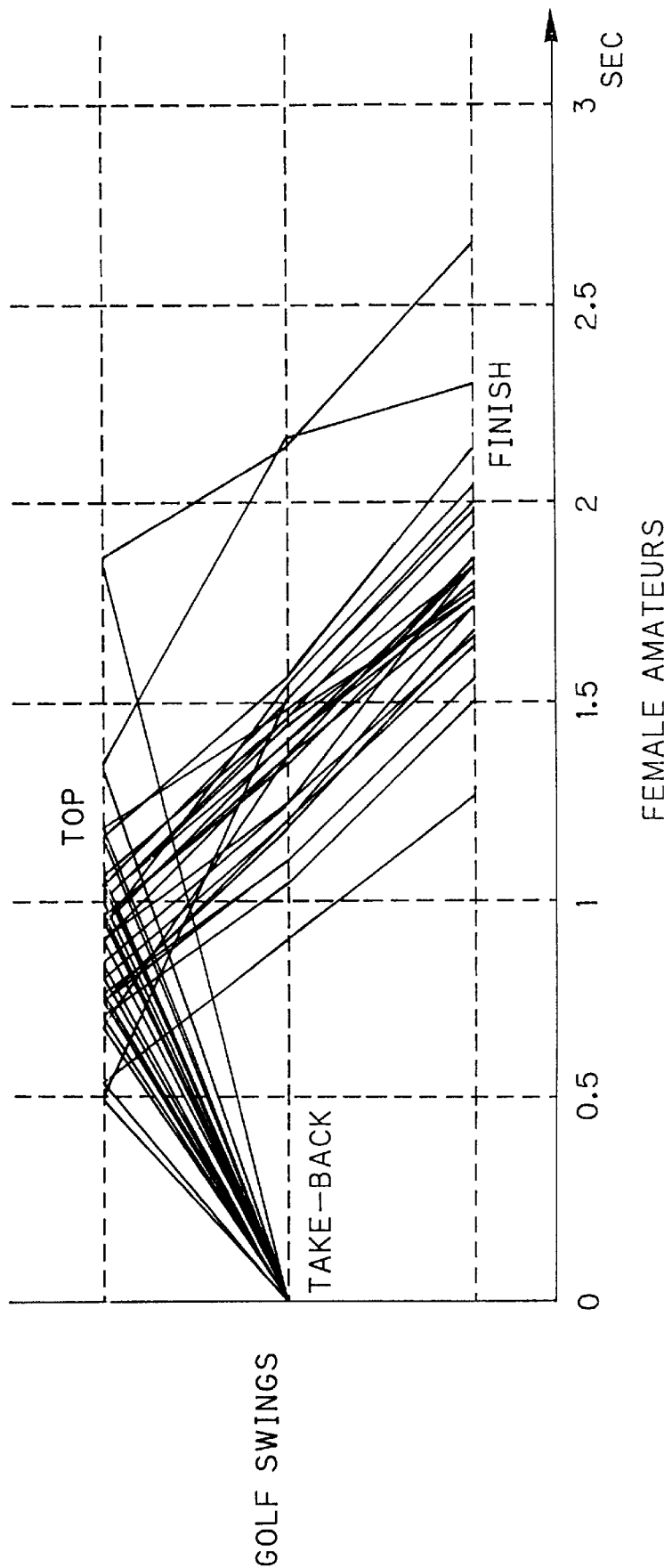
FIG. 41 is a timing chart illustrating durations of golf swings of female amateurs.

The pitch setting switch 19, as illustrated in FIG. 38, is disposed on the rear of the camera 120. Beside an eyepiece 131 of the viewfinder is a lamp 132 for indicating actuation of the shutter device. The lamp 132 is turned on or blinks during rotation of the shutter disks 32–39, namely during rotation of the stepping motors 49 and 50. The lamp 132 is operated by control of the CPU 100 as referred to with FIG. 11. The indication at the lamp 132 can be recognized while a principal object is observed through the eyepiece 131. It is possible for the user to prevent camera shakes which would be caused by inadvertent manual movement of the camera 120 during rotation of the shutter disks 32–39. Note that the elements in FIGS. 32 to 38 similar to those of the embodiment of FIGS. 1 to 25 are designated with identical reference numerals.

In the above embodiments, the combination mode causes the camera to take consecutive exposures and subsequently one-shot exposures. The present invention is further applicable to a camera in which consecutive and one-shot exposures are combined in more complicated fashion. It is possible first to take three consecutive exposures, secondly to take a single one-shot exposure, and thirdly to take twelve consecutive exposures, thereby to use up the sixteen sub-frames. It is preferred for the camera necessarily to have the external operable button 134 for setting the number of consecutive exposures (See FIG. 11), and a counter for counting the temporary number of exposed sub-frames. The camera may be also provided with a display device as desired, for indicating the temporary number counted by the counter. The mode for taking two to fifteen exposures consecutively is referred to as a "mini-consecutive" mode.

In the above embodiments, the eight shutter disks are rotated by the two stepping motors. The shutter slits in the respective shutter disks are passed in front of the respective sixteen stationary openings, to record the sixteen sub-frames in a range of two frames. The camera is operable also in the one-shot mode. The present invention is also applicable to a consecutive taking camera as disclosed in JP-A 4-269729, in which two shutter disks are rotated by a stepping motor, and in which pair of shutter slits in the respective shutter disks are caused to pass respective eight stationary openings, to record eight sub-frames in a range of two frames. This camera also can have a one-shot mode. Furthermore, the present invention is applicable to a consecutive taking camera as disclosed in JP-A 2-105132, in which a single shutter disk is rotated by a stepping motor, and in which a single shutter slit in the shutter disk is caused to pass four stationary openings arranged in 2×2, to record four sub-frames in a range of one frame. This camera also can have a one-shot mode.

The above embodiments has two shutter mechanisms 23 and 24 which respectively include four shutter disks, and are arranged horizontally. The present invention is further applicable to a consecutive taking camera with three or more shutter mechanisms capable of taking 24 or more consecutive exposures. If a camera has N shutter mechanisms, then 8N consecutive exposures can be taken.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A consecutive taking camera, having M taking lenses for forming respective images in M sub-frames arranged on photo film in a direction of transport of said photo film, said photo film being advanced for next new M sub-frames after said images are formed in all of said M sub-frames, said consecutive taking camera comprising:

a stationary plate disposed behind said taking lenses, and having M stationary openings through which light entered into respective said taking lenses is passed;

one or more shutter disks, disposed behind said taking lenses, each of said one or more shutter disks having only one shutter slit, said one or more shutter disks rotatable to move said shutter slits past said M stationary openings;

at least one motor for rotating said one or more shutter disks;

an externally operable mode selector device for selectively designating a consecutive mode for taking time-sequential exposures in 2 to M sub-frames of said M sub-frames, without said film advance, and a one-shot mode for taking one exposure in one of said sub-frames; and a motor control device for controlling a rotation of said at least one motor in accordance with said mode designated by said mode selector device; wherein said motor control device, when said consecutive mode is designated, controls said motor so as to rotate said one or more shutter disks to move said shutter slit or slits sequentially past between 2 and M said stationary openings; wherein said motor control device, when said one-shot mode is designated, controls said motor so as to rotate said one or more shutter disks at a predetermined angle to move one said shutter slit past one of said M stationary openings, and stop said one or more shutter disks.

2. A consecutive taking camera as defined in claim 1, wherein said mode selector device is constituted by only a first shutter release button, externally operable, for designating said one shot-mode, and a second shutter release button, externally operable, for designating said consecutive mode.

3. A consecutive taking camera as defined in claim 1, wherein said mode selector device is constituted by a shutter release button, pressed externally, for causing said motor control device to drive said shutter disk, said shutter release button being pressable to a halfway position and a fully depressed position, said halfway position adapted to designating said one-shot mode, and said fully depressed position adapted to designating said consecutive mode.

4. A consecutive taking camera as defined in claim 1, further comprising:

a one-shot counter for counting sub-frames with said exposure taken in said one-shot mode; and a display device for externally indicating a count counted by said one-shot counter.

5. A consecutive taking camera as defined in claim 1, wherein when said consecutive mode is designated through said mode selector device with said M sub-frames unexposed, then said shutter releasing allows taking said time-sequential exposures in said M sub-frames; and when said consecutive mode is designated through said mode selector device with first to Kth ones of said M sub-frames exposed in said one-shot mode, then said shutter releasing allows taking said time-sequential exposures in (K+1)th to Mth ones of said M sub-frames.

6. A consecutive taking camera as defined in claim 1, there being a mini-consecutive mode for taking time-sequential exposures in plural ones of said M sub-frames determined through a consecutive number setting device.

7. A consecutive taking camera as defined in claim 6, further comprising:

an exposure counter for counting exposed ones of said M sub-frames; and a display device for externally indicating a number of said sub-frames counted by said exposure counter, said indicated number adapted to estimating a number of remaining unexposed ones of said M sub-frames.

8. A consecutive taking camera as defined in claim 1, wherein said motor control device in said one-shot mode causes said shutter disk to expose said M sub-frames in a predetermined order upon said shutter releasing at M times;

there being a combination mode designated through said mode selector device, and constituted by combination of taking time-sequential exposures in first to (M−1)th ones of said M sub-frames upon shutter releasing for a first time, and taking one exposure in an Mth one of said sub-frames upon shutter releasing for a second time; and wherein said motor control device in said combination mode, upon said first time of said shutter releasing, rotates said shutter disk to move said shutter slit sequentially past first to (M−1)th ones of said M stationary openings; and upon said second time of said shutter releasing, rotates said shutter disk at said predetermined angle to move said shutter slit past an Mth one of said M stationary openings, and stops said shutter disk.

9. A consecutive taking camera as defined in claim 8, wherein each of said at least one motor is a stepping motor, and said motor control device includes:

a driver circuit, connected to said stepping motor, for supplying drive pulses thereto; and a drive pulse controller, connected to said driver circuit and said mode selector device, for determining numbers and time points of generating said drive pulses, to control rotation of said stepping motor.

10. A consecutive taking camera as defined in claim 8, further comprising:

an external display device;

a display controller, connected to said display device and said motor control device, for driving said display device in synchronism with said taking of said time-sequential exposures, to indicate time intervals between successive said sub-frames; and a film winding device, for winding said photo film when said shutter disk is stopped by said motor control device after finally exposing an Mth one of said M sub-frame.

11. A consecutive taking camera as defined in claim 1, further comprising:

an external display device;

an external switch which can be set to an on position and an off position; and a display controller, connected to said display device and said switch, for driving said display device in time-sequential fashion simulating said taking of said time-sequential exposures in said sub-frames while said switch is turned on, to indicate time intervals between successive said sub-frames.

12. A consecutive taking camera as defined in claim 11, wherein said display controller drives said display device synchronously with said taking of said time-sequential exposures.

13. A consecutive taking camera as defined in claim 11, wherein said display controller drives said display device before said taking of said time-sequential exposures.

14. A consecutive taking camera as defined in claim 11, wherein said external switch can be further set to select one of plural total durations of taking said exposures in said consecutive mode, each said total duration representing an interval between said single shutter release and exposure of a final one of said sub-frames;

said display controller further causes said display device to indicate said selected total duration in response to operation of said external switch.

15. A consecutive taking camera as defined in claim 11, wherein said display device includes plural indicia segments controlled by said display controller, said indicia segments being turned on consecutively according to the time intervals between successive said sub-frames.

16. A consecutive taking camera as defined in claim 11, wherein said display device includes plural indicia segments controlled by said display controller in order to be turned on selectively; and said display controller, when said one-shot mode is designated through said selector device, drives said display device so that a number of said indicia segments which are turned on represents a number of sub-frames of a current frame taken in said one-shot mode, and when said consecutive mode is designated after said one-shot mode through said selector device, said display controller turns on those of said indicia segments that are not yet turned on, in time-sequential fashion synchronized with said taking of said time-sequential exposures.

* * * * *